(12) United States Patent
Glendenning et al.

(10) Patent No.: US 11,816,493 B2
(45) Date of Patent: *Nov. 14, 2023

(54) METHODS AND SYSTEMS FOR REPRESENTING PROCESSING RESOURCES

(71) Applicant: Micron Technology, Inc., Boise, ID (US)

(72) Inventors: Paul Glendenning, Woodside, CA (US); Jeffery M. Tanner, Boise, ID (US); Michael C. Leventhal, Los Gatos, CA (US); Harold B Noyes, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 261 days.

This patent is subject to a terminal disclaimer.

(21) Appl. No.: 16/951,616

(22) Filed: Nov. 18, 2020

(65) Prior Publication Data

US 2021/0073004 A1 Mar. 11, 2021

Related U.S. Application Data

(63) Continuation of application No. 15/286,311, filed on Oct. 5, 2016, now Pat. No. 10,846,103.

(60) Provisional application No. 62/238,079, filed on Oct. 6, 2015.

(51) Int. Cl.
*G06F 9/448* (2018.01)
*G06F 8/30* (2018.01)

(52) U.S. Cl.
CPC .............. *G06F 9/4498* (2018.02); *G06F 8/31* (2013.01)

(58) Field of Classification Search
CPC ................................. G06F 9/4498; G06F 8/31
See application file for complete search history.

(56) References Cited

U.S. PATENT DOCUMENTS

| | | | |
|---|---|---|---|
| 3,849,762 A | 11/1974 | Fujimoto et al. | |
| 3,921,136 A | 11/1975 | Bar-Lev | |
| 4,011,547 A | 3/1977 | Kimmel | |
| 4,014,000 A | 3/1977 | Uno et al. | |
| 4,123,695 A | 10/1978 | Hale et al. | |
| 4,153,897 A | 5/1979 | Yasuda et al. | |
| 4,204,193 A | 5/1980 | Schroeder | |

(Continued)

FOREIGN PATENT DOCUMENTS

| | | |
|---|---|---|
| EP | 0476159 A1 | 3/1992 |
| EP | 0943995 A2 | 9/1999 |

(Continued)

OTHER PUBLICATIONS

Sabotta, "Advantages and challenges of programming the Micron Automata Processor", 2013, Iowa State University, pp. 1-52. (Year: 2013).*

(Continued)

*Primary Examiner* — Kenneth Tang
(74) *Attorney, Agent, or Firm* — Fletcher Yoder, P.C.

(57) ABSTRACT

A markup language is provided. The markup language describes the composition of automata networks. For example, the markup language uses elements that represent automata processing resources. These resources may include at least one of a state transition element, a counter element, and a Boolean element as respective automata processing resources.

16 Claims, 51 Drawing Sheets

(56) References Cited

U.S. PATENT DOCUMENTS

| | | |
|---|---|---|
| 4,414,685 A | 11/1983 | Sternberg |
| 4,748,674 A | 5/1988 | Freeman |
| 5,014,327 A | 5/1991 | Potter et al. |
| 5,028,821 A | 7/1991 | Kaplinsky |
| 5,216,748 A | 6/1993 | Quenot et al. |
| 5,257,361 A | 10/1993 | Doi et al. |
| 5,287,523 A | 2/1994 | Allison et al. |
| 5,291,482 A | 3/1994 | McHarg et al. |
| 5,300,830 A | 4/1994 | Hawes |
| 5,331,227 A | 7/1994 | Hawes |
| 5,357,512 A | 10/1994 | Khaira et al. |
| 5,371,878 A | 12/1994 | Coker |
| 5,377,129 A | 12/1994 | Molvig et al. |
| 5,459,798 A | 10/1995 | Bailey et al. |
| 5,615,237 A | 3/1997 | Chang et al. |
| 5,659,551 A | 8/1997 | Huott et al. |
| 5,723,984 A | 3/1998 | Sharpe-Geisier |
| 5,754,878 A | 5/1998 | Asghar et al. |
| 5,790,531 A | 8/1998 | Ellebracht et al. |
| 5,881,312 A | 3/1999 | Dulong |
| 5,896,548 A | 4/1999 | Ofek |
| 5,956,741 A | 9/1999 | Jones |
| 6,011,407 A | 1/2000 | New |
| 6,016,361 A | 1/2000 | Hongu et al. |
| 6,034,963 A | 3/2000 | Minami et al. |
| 6,041,405 A | 3/2000 | Green |
| 6,052,766 A | 4/2000 | Betker et al. |
| 6,058,469 A | 5/2000 | Baxter |
| 6,151,644 A | 11/2000 | Wu |
| 6,240,003 B1 | 5/2001 | McElroy |
| 6,279,128 B1 | 8/2001 | Arnold et al. |
| 6,317,427 B1 | 11/2001 | Augusta et al. |
| 6,362,868 B1 | 3/2002 | Silverbrook |
| 6,400,996 B1 | 6/2002 | Hoffberg et al. |
| 6,606,699 B2 | 8/2003 | Pechanek et al. |
| 6,614,703 B2 | 9/2003 | Pitts et al. |
| 6,625,740 B1 | 9/2003 | Datar et al. |
| 6,633,443 B1 | 10/2003 | Watanabe et al. |
| 6,636,483 B1 | 10/2003 | Pannell |
| 6,640,262 B1 | 10/2003 | Uppunda et al. |
| 6,697,979 B1 | 2/2004 | Vorbach et al. |
| 6,700,404 B1 | 3/2004 | Feng et al. |
| 6,880,087 B1 | 4/2005 | Carter |
| 6,906,938 B2 | 6/2005 | Kaginele |
| 6,944,710 B2 | 9/2005 | Regev et al. |
| 6,977,897 B1 | 12/2005 | Nelson et al. |
| 7,010,639 B2 | 3/2006 | Larson et al. |
| 7,089,352 B2 | 8/2006 | Regev et al. |
| 7,146,643 B2 | 12/2006 | Dapp et al. |
| 7,176,717 B2 | 2/2007 | Sunkavalli et al. |
| 7,276,934 B1 | 10/2007 | Young |
| 7,305,047 B1 | 12/2007 | Turner |
| 7,358,761 B1 | 4/2008 | Sunkavalli et al. |
| 7,366,352 B2 | 4/2008 | Kravec et al. |
| 7,392,229 B2 | 6/2008 | Harris et al. |
| 7,428,722 B2 | 9/2008 | Sunkavalli et al. |
| 7,487,131 B2 | 2/2009 | Harris et al. |
| 7,487,542 B2 | 2/2009 | Boulanger et al. |
| 7,499,464 B2 | 3/2009 | Ayrapetian et al. |
| 7,725,510 B2 | 5/2010 | Alicherry et al. |
| 7,774,286 B1 | 8/2010 | Harris |
| 7,804,719 B1 | 9/2010 | Chirania et al. |
| 7,890,923 B2 | 2/2011 | Elaasar |
| 7,899,052 B1 | 3/2011 | Hao et al. |
| 7,917,684 B2 | 3/2011 | Noyes et al. |
| 7,970,964 B2 | 6/2011 | Noyes |
| 8,015,530 B1 | 9/2011 | Sinclair et al. |
| 8,020,131 B1 | 9/2011 | Van Mau et al. |
| 8,065,249 B1 | 11/2011 | Harris et al. |
| 8,140,780 B2 | 3/2012 | Noyes |
| 8,146,040 B1 | 3/2012 | Janneck et al. |
| 8,159,900 B2 | 4/2012 | Moore et al. |
| 8,209,521 B2 | 6/2012 | Noyes et al. |
| 8,239,660 B2 | 8/2012 | Cervini |
| 8,281,395 B2 | 10/2012 | Pawlowski |
| 8,294,490 B1 | 10/2012 | Kaviani |
| 8,402,188 B2 | 3/2013 | Noyes et al. |
| 8,536,896 B1 | 9/2013 | Trimberger |
| 8,593,175 B2 | 11/2013 | Noyes et al. |
| 8,648,621 B2 | 2/2014 | Noyes et al. |
| 8,680,888 B2 | 3/2014 | Brown et al. |
| 8,725,961 B2 | 5/2014 | Noyes |
| 8,782,624 B2 | 7/2014 | Brown et al. |
| 8,938,590 B2 | 1/2015 | Noyes et al. |
| 9,058,465 B2 | 6/2015 | Noyes et al. |
| 9,063,532 B2 | 6/2015 | Brown |
| 9,075,428 B2 | 7/2015 | Brown |
| 9,118,327 B2 | 8/2015 | Noyes et al. |
| 9,235,798 B2 | 1/2016 | Brown et al. |
| 10,846,103 B2 * | 11/2020 | Glendenning ............ G06F 8/31 |
| 2002/0186044 A1 | 12/2002 | Agrawal et al. |
| 2003/0107996 A1 | 6/2003 | Black et al. |
| 2003/0142698 A1 | 7/2003 | Parhl |
| 2003/0163615 A1 | 8/2003 | Yu |
| 2003/0226002 A1 | 12/2003 | Boutaud et al. |
| 2004/0100980 A1 | 5/2004 | Jacobs et al. |
| 2004/0125807 A1 | 7/2004 | Liu et al. |
| 2004/0151211 A1 | 8/2004 | Snider |
| 2004/0184662 A1 | 9/2004 | Kravec et al. |
| 2005/0154916 A1 | 7/2005 | Boulanger et al. |
| 2005/0251638 A1 | 11/2005 | Boutaud et al. |
| 2006/0158219 A1 | 7/2006 | Sunkavalli et al. |
| 2006/0195496 A1 | 8/2006 | Vadi et al. |
| 2006/0206875 A1 | 9/2006 | Ullmann et al. |
| 2006/0242123 A1 | 10/2006 | Williams, Jr. |
| 2006/0257043 A1 | 11/2006 | Chiu |
| 2006/0274001 A1 | 12/2006 | Guttag et al. |
| 2006/0288070 A1 | 12/2006 | Vadi et al. |
| 2007/0005869 A1 | 1/2007 | Balraj et al. |
| 2007/0075878 A1 | 4/2007 | Furodet et al. |
| 2007/0127482 A1 | 6/2007 | Harris et al. |
| 2007/0150623 A1 | 6/2007 | Kravec et al. |
| 2007/0282833 A1 | 12/2007 | McMillen |
| 2007/0283108 A1 | 12/2007 | Isherwood et al. |
| 2008/0126690 A1 | 5/2008 | Rajan et al. |
| 2008/0129334 A1 | 6/2008 | Sunkavalli et al. |
| 2008/0133874 A1 | 6/2008 | Capek et al. |
| 2008/0140661 A1 | 6/2008 | Pandya |
| 2008/0178031 A1 | 7/2008 | Dong-Han |
| 2008/0256347 A1 | 10/2008 | Eickemeyer et al. |
| 2008/0320053 A1 | 12/2008 | Iijima et al. |
| 2009/0198952 A1 | 8/2009 | Khmelnitsky et al. |
| 2009/0204734 A1 | 8/2009 | Strait et al. |
| 2010/0100691 A1 | 4/2010 | Noyes et al. |
| 2010/0100714 A1 | 4/2010 | Noyes et al. |
| 2010/0115173 A1 | 5/2010 | Noyes |
| 2010/0115347 A1 | 5/2010 | Noyes |
| 2010/0118425 A1 | 5/2010 | Rafaelof |
| 2010/0138432 A1 | 6/2010 | Noyes |
| 2010/0138575 A1 | 6/2010 | Noyes |
| 2010/0138634 A1 | 6/2010 | Noyes |
| 2010/0138635 A1 | 6/2010 | Noyes |
| 2010/0175130 A1 | 6/2010 | Pawlowski |
| 2010/0174887 A1 | 7/2010 | Pawlowski |
| 2010/0174929 A1 | 7/2010 | Pawlowski |
| 2010/0185647 A1 | 7/2010 | Noyes |
| 2010/0145182 A1 | 10/2010 | Schmidt et al. |
| 2010/0325352 A1 | 12/2010 | Schuette et al. |
| 2010/0332809 A1 | 12/2010 | Noyes et al. |
| 2011/0004578 A1 | 1/2011 | Momma et al. |
| 2011/0145182 A1 | 6/2011 | Dlugosch |
| 2011/0145271 A1 | 6/2011 | Noyes et al. |
| 2011/0145544 A1 | 6/2011 | Noyes et al. |
| 2011/0161620 A1 | 6/2011 | Kaminski et al. |
| 2011/0208900 A1 | 8/2011 | Schuette et al. |
| 2011/0258360 A1 | 10/2011 | Noyes |
| 2011/0307233 A1 | 12/2011 | Tseng et al. |
| 2011/0307433 A1 | 12/2011 | Dlugosch |
| 2011/0307503 A1 | 12/2011 | Dlugosch |
| 2011/0320759 A1 | 12/2011 | Craddock et al. |
| 2012/0192163 A1 | 6/2012 | Glendenning et al. |
| 2012/0179854 A1 | 7/2012 | Noyes |
| 2012/0192164 A1 | 7/2012 | Xu et al. |
| 2012/0192165 A1 | 7/2012 | Xu et al. |

(56) References Cited

U.S. PATENT DOCUMENTS

| | | |
|---|---|---|
| 2012/0192166 A1 | 7/2012 | Xu et al. |
| 2013/0154685 A1 | 6/2013 | Noyes |
| 2013/0156043 A1 | 6/2013 | Brown et al. |
| 2013/0159239 A1 | 6/2013 | Brown et al. |
| 2013/0159670 A1 | 6/2013 | Noyes |
| 2013/0159671 A1 | 6/2013 | Brown et al. |
| 2013/0275709 A1 | 10/2013 | Gajapathy |
| 2014/0025614 A1 | 1/2014 | Noyes et al. |
| 2014/0025889 A1 | 1/2014 | Brown et al. |
| 2014/0025923 A1 | 1/2014 | Klein |
| 2014/0067736 A1 | 3/2014 | Noyes |
| 2014/0204956 A1 | 7/2014 | Brown et al. |
| 2014/0279776 A1 | 9/2014 | Brown et al. |
| 2014/0325494 A1 | 10/2014 | Brown et al. |
| 2016/0357704 A1 | 12/2016 | Fu |
| 2017/0083288 A1* | 3/2017 | Wadden .................. G06F 7/584 |
| 2017/0091287 A1 | 3/2017 | Wang et al. |
| 2017/0255878 A1* | 9/2017 | Fu ............................ G06N 5/01 |
| 2017/0293670 A1* | 10/2017 | Wang ...................... G06N 7/005 |

FOREIGN PATENT DOCUMENTS

| | | |
|---|---|---|
| JP | 08087462 A | 4/1996 |
| JP | 10069459 A | 3/1998 |
| JP | 10111862 A | 4/1998 |
| JP | 2000231549 A | 8/2000 |
| JP | 2000347708 A | 12/2000 |
| KR | 1020080097573 A | 11/2008 |
| WO | WO0065425 A1 | 11/2000 |
| WO | WO0138978 A1 | 5/2001 |
| WO | WO03039001 A1 | 5/2003 |
| WO | WO2005036750 A1 | 4/2005 |
| WO | WO2011114120 A1 | 9/2011 |

OTHER PUBLICATIONS

Beesley, K. R.; Arabic Morphology Using Only Finite-State Operations; Xerox Research Centre Europe; pp. 50-57; 1998.

Bird, S. et al. .; One-Level Phonology: Autosegmental Representations and Rules as Finite Automata; Association for Computational Linguistics; University of Edinburgh; vol. 20; No. 1; pp. 55-90; 1994.

Bispo, J. et al. .; Regular Expression Matching for Reconfigurable Packet Inspection; IEEE International Conference on Field Programmable Technology; 2006.

Bispo, J. et al. .; Synthesis of Regular Expressions Targeting FPGAs: Current Status and Open Issues; IST/INESC-ID, Libson, Portugal; pp. 1-12; 2007.

Brodie, B. et al.; A scalable Architecture for High-Throughput Regular-Expression Pattern Matching; Exegy Inc .; pp. 1-12; 2006.

Clark, C.; Design of Efficient FPGA Circuits for Matching Complex Patterns in Network Intrusion Detection Systems (Master of Science Thesis); Georgia Institute of Technology; pp. 1-56; Dec. 2003.

Clark, C.; A Unified Model of Pattern-Matching Circuits for Field-Programmable Gate Arrays [Doctoral Dissertation]; Georgia Institute of Technology; pp. 1-177; 2006.

Clark, C. et al.; Scalable Pattern Matching for High Speed Networks; Proceedings of the 12$^{th}$ Annual IEEE symposium on Field-Programmable Custom Computing Machines (FCCM'04);Georgia Institute of Technology; pp. 1-9; 2004.

Clark, C et al.; A Unified Model of Pattern-Matching Circuit Architectures; Tech Report GIT-CERCS-05-20;Georgia Institute of Technology; pp. 1-17; 2005.

Fide, S.; String Processing in Hardware; Scalable Parallel and Distributed Systems Lab; Proceedings of the 12$^{th}$ Annual IEEE symposium on Field-Programmable Custom Computing Machines (FCCM'04); School of Electrical and Computer Engineering; Georgia Institute of Technology; pp. 1-9; 2004.

Fisk, M. et al.; Applying Fast String Matching to Intrusion Detection; Los Alamos National Laboratory; University of California San Diego; pp. 1-21; 2002.

Korenek, J.; Traffic Scanner-Hardware Accelerated Intrusion Detection System; http://www.liberouter.org/ ; 2006.

Kumar, S. et al.; Curing Regular Expressions matching Algorithms from Insomnia, Amnesia, and Acaluia; Department of Computer Science and Engineering; Washington University in St. Louis; pp. 1-17; Apr. 27, 2007.

Lipovski, G.; Dynamic Systolic Associative Memory Chip; IEEE; Department of Electrical and Computer Engineering; University of Texas at Austin; pp. 481-492; 1990.

Lin, C. et al.; Optimization of Pattern Matching Circuits for Regular Expression on FPGA; IEEE Transactions on Very Large Scale Integrations Systems; vol. 15, No. 12, pp. 1-6; Dec. 2007.

Schultz, K. et al.; Fully Parallel Integrated CAM/RAM Using Preclassification to Enable Large Capacities; IEEE Journal on Solid-State Circuits; vol. 31; No. 5; pp. 689-699; May 1996.

Shafai, F. et al. .; Fully Parallel 30-MHz, 2.5-Mb CAM; IEEE Journal of Solid-State Circuits, vol. 33; No. 11; pp. 1690-1696; Nov. 1998.

Sidhu, R. et al.; Fast Regular Expression Pattern Matching using FPGAs; Department of EE-Systems; University of Southern California; pp. 1-12; 2001.

Wada, T.; Multiobject Behavior Recognition Event Driven Selective Attention Method; IEEE; pp. 1-16; 2000.

Yu, F.; High Speed Deep Packet Inspection with Hardware Support; Electrical Engineering and Computer Sciences; University of California at Berkeley; pp. 1-217; Nov. 22, 2006.

Freescale and Kaspersky ® Accelerated Antivirus Solution Platform for OEM Vendors; Freescale Semiconductors Document; pp. 1-16; 2007.

PCT/US2009/067534 International Search Report and Written Opinion dated Apr. 26, 2010.

PCT/US2009/061649 International Search Report dated Feb. 15, 2010.

Taiwan Application No. 098144804 Office Action dated Nov. 4, 2013.

PCT/US2012/067992 International Search Report dated Mar. 28, 2013.

PCT/US2012/068011 International Search Report dated Apr. 15, 2013.

PCT/US2012/067999 International Search Report dated May 14, 2013.

PCT/US2012/067995 International Search Report dated May 17, 2013.

PCT/US2012/067988 International Search Report (Partial) dated Jun. 24, 2014.

PCT/US2013/049744 International Search Report and Written Opinion dated Oct. 22, 2013.

PCT/US2013/049748 International Search Report and Written Opinion dated Oct. 22, 2013.

PCT/US2013/049755 International Search Report and Written Opinion dated Oct. 24, 2013.

PCT/US2013/049753 International Search Report and Written Opinion dated Nov. 7, 2013.

PCT/US2013/055434 International Search Report and Written Opinion dated Nov. 29, 2013.

PCT/US2013/055438 International Search Report and Written Opinion dated Nov. 29, 2013.

PCT/US2013/055436 International Search Report and Written Opinion dated Dec. 9, 2013.

PCT/US2014/023589 International Search Report and Written Opinion dated Jul. 24, 2014.

Soewito et al., "Self-Addressable Memory-Based FSM: A scalable Intrusion Detection Engine", IEEE Network, pp. 14-21; Feb. 2009.

Hurson A. .; A VLSI Design for the Parallel Finite State Automation and Its Performance Evaluation as a Hardware Scanner; International Journal of Computer and Information Sciences, vol. 13, No. 6; 1984.

Carpenter et al., "A Massively Parallel Architecture for a Self-Organizing Neural Pattern Recognition Machine", Academic Press, Inc.; 1987.

Cong et al., "Application-Specific Instruction Generation for Configurable Processor Architectures", Computer Science Department, University of California, ACM; 2004.

(56) References Cited

OTHER PUBLICATIONS

Glette et al., "An Online EHW Pattern Recognition System Applied to Face Image Recognition", University of Oslo, Norway; 2007.
Kawai et al., "An Adaptive Pattern Recognition Hardware with On-chip Shift Register-based Partial Reconfiguration", IEEE; 2008.
Kutrib et al., "Massively Parallel Pattern Recognition with Link Features", IFIG Research Report 0003; 2000.
Marculescu et al., Power Management of Multi-Core Systems: Challenges, Approaches, and Recent Developments Tutorial at ASPLOS, London, UK [online]; Mar. 4, 2012.
Vitanen et al.; Image Pattern Recognition Using Configurable Logic Cell Array; New Advances in Computer Graphics; pp. 355-368; 1989.
Yasunaga et al., "Kernel-based Pattern Recognition Hardware: Its Design Methodology Using Evolved Truth Tables", IEEE, 2000.
U.S. Appl. No. 60/652,738, filed Feb. 12, 2005, Harris.
U.S. Appl. No. 61/788,364, filed Mar. 15, 2013, Brown et al.
Sabotta, Christopher, "Advantages and challenges of programming the Micron Automata Processor", 2013, Iowa State University Digital Repository, pp. 1-44.

\* cited by examiner

METHODS AND SYSTEMS FOR REPRESENTING PROCESSING RESOURCES

CROSS REFERENCE TO RELATED APPLICATIONS

This application is a continuation of U.S. application Ser. No. 15/286,311, entitled "Methods and Systems for Representing Processing Resources," and filed Oct. 5, 2016, now U.S. Pat. No. 10,846,103 which issued on Nov. 24, 2020, which is a Non-Provisional Application claiming priority to U.S. Provisional Patent Application No. 62/238,079, entitled "Methods and Systems for Representing Processing Resources", filed Oct. 6, 2015, which is herein incorporated by reference.

BACKGROUND

Field of Invention

Embodiments relate generally to electronic devices and, more specifically, in certain embodiments, to electronic devices with parallel devices for data analysis.

Description of Related Art

Complex pattern recognition can be inefficient to perform on a conventional von Neumann based computer. A biological brain, in particular a human brain, however, is adept at performing pattern recognition. Current research suggests that a human brain performs pattern recognition using a series of hierarchically organized neuron layers in the neocortex. Neurons in the lower layers of the hierarchy analyze "raw signals" from, for example, sensory organs, while neurons in higher layers analyze signal outputs from neurons in the lower levels. This hierarchical system in the neocortex, possibly in combination with other areas of the brain, accomplishes the complex pattern recognition that enables humans to perform high level functions such as spatial reasoning, conscious thought, and complex language.

In the field of computing, pattern recognition tasks are increasingly challenging. Ever larger volumes of data are transmitted between computers, and the number of patterns that users wish to identify is increasing. For example, spam or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

Hardware has been designed to search a data stream for patterns, but this hardware often is unable to process adequate amounts of data in an amount of time given. Some devices configured to search a data stream do so by distributing the data stream among a plurality of circuits. The circuits each determine whether the data stream matches a portion of a pattern. Often, a large number of circuits operate in parallel, each searching the data stream at generally the same time. The system may then further process the results from these circuits, to arrive at the final results. These "intermediate results", however, can be larger than the original input data, which may pose issues for the system.

The ability to use a cascaded circuits approach, similar to the human brain, offers one potential solution to this problem. However, there has not been a system that effectively allows for performing pattern recognition in a manner more comparable to that of a biological brain. Development of such a system is desirable.

DETAILED DESCRIPTION

Figure 1:
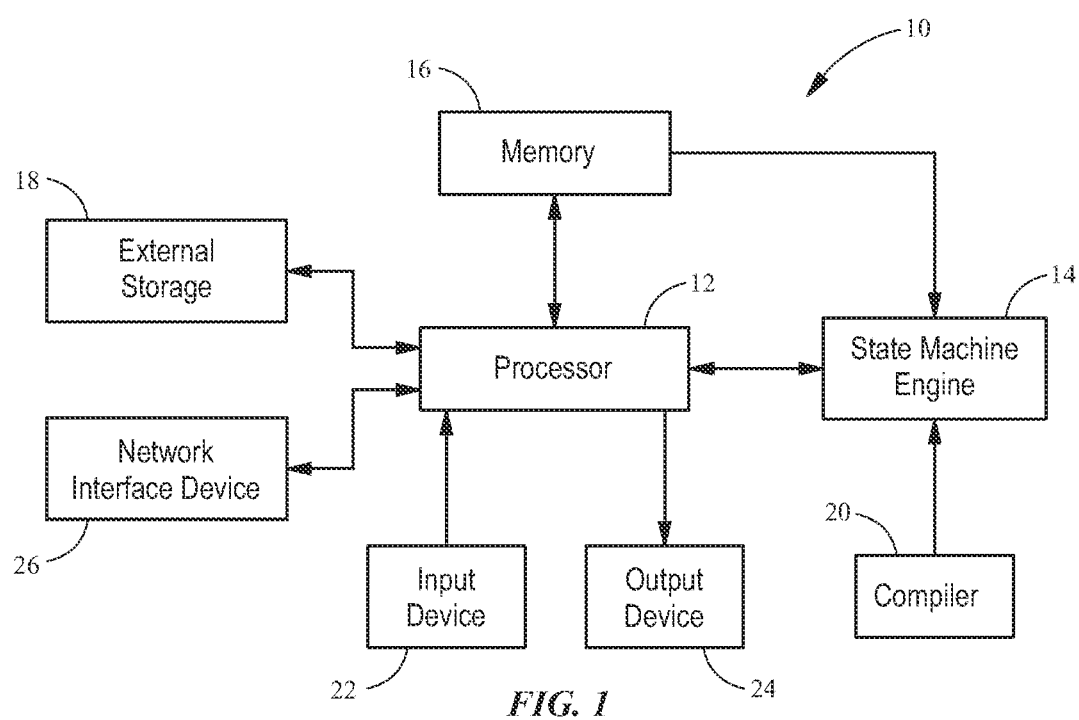
FIG. 1 illustrates an example of system having a state machine engine, according to various embodiments.

Turning now to the figures, FIG. 1 illustrates an embodiment of a processor-based system, generally designated by reference numeral 10. The system 10 may be any of a variety of types such as a desktop computer, laptop computer, pager, cellular phone, personal organizer, portable audio player, control circuit, camera, etc. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

In a typical processor-based device, such as the system 10, a processor 12, such as a microprocessor, controls the processing of system functions and requests in the system 10. Further, the processor 12 may comprise a plurality of processors that share system control. The processor 12 may be coupled directly or indirectly to each of the elements in the system 10, such that the processor 12 controls the system 10 by executing instructions that may be stored within the system 10 or external to the system 10.

In accordance with the embodiments described herein, the system 10 includes a state machine engine 14, which may operate under control of the processor 12. The state machine engine 14 may employ any one of a number of state machine architectures, including, but not limited to Mealy architectures, Moore architectures, Finite State Machines (FSMs), Deterministic FSMs (DFSMs), Bit-Parallel State Machines (BPSMs), etc. Though a variety of architectures may be used, for discussion purposes, the application refers to FSMs. However, those skilled in the art will appreciate that the described techniques may be employed using any one of a variety of state machine architectures.

As discussed further below, the state machine engine 14 may include a number of (e.g., one or more) finite state machine (FSM) lattices (e.g., core of a chip). For purposes of this application the term "lattice" refers to an organized framework (e.g., routing matrix, routing network, frame) of elements (e.g., Boolean cells, counter cells, state machine elements, state transition elements). Furthermore, the "lattice" may have any suitable shape, structure, or hierarchical organization (e.g., grid, cube, spherical, cascading). Each FSM lattice may implement multiple FSMs that each receive and analyze the same data in parallel. Further, the FSM lattices may be arranged in groups (e.g., clusters), such that clusters of FSM lattices may analyze the same input data in parallel. Further, clusters of FSM lattices of the state machine engine 14 may be arranged in a hierarchical structure wherein outputs from state machine lattices on a lower level of the hierarchical structure may be used as inputs to state machine lattices on a higher level. By cascading clusters of parallel FSM lattices of the state machine engine 14 in series through the hierarchical structure, increasingly complex patterns may be analyzed (e.g., evaluated, searched, etc.).

Further, based on the hierarchical parallel configuration of the state machine engine 14, the state machine engine 14 can be employed for complex data analysis (e.g., pattern recognition or other processing) in systems that utilize high processing speeds. For instance, embodiments described herein may be incorporated in systems with processing speeds of 1 GByte/sec. Accordingly, utilizing the state machine engine 14, data from high speed memory devices or other external devices may be rapidly analyzed. The state machine engine 14 may analyze a data stream according to several criteria (e.g., search terms), at about the same time, e.g., during a single device cycle. Each of the FSM lattices within a cluster of FSMs on a level of the state machine engine 14 may each receive the same search term from the data stream at about the same time, and each of the parallel FSM lattices may determine whether the term advances the state machine engine 14 to the next state in the processing criterion. The state machine engine 14 may analyze terms according to a relatively large number of criteria, e.g., more than 100, more than 110, or more than 10,000. Because they operate in parallel, they may apply the criteria to a data stream having a relatively high bandwidth, e.g., a data stream of greater than or generally equal to 1 GByte/sec, without slowing the data stream.

In one embodiment, the state machine engine 14 may be configured to recognize (e.g., detect) a great number of patterns in a data stream. For instance, the state machine engine 14 may be utilized to detect a pattern in one or more of a variety of types of data streams that a user or other entity might wish to analyze. For example, the state machine engine 14 may be configured to analyze a stream of data received over a network, such as packets received over the Internet or voice or data received over a cellular network. In one example, the state machine engine 14 may be configured to analyze a data stream for spam or malware. The data stream may be received as a serial data stream, in which the data is received in an order that has meaning, such as in a temporally, lexically, or semantically significant order. Alternatively, the data stream may be received in parallel or out of order and, then, converted into a serial data stream, e.g., by reordering packets received over the Internet. In some embodiments, the data stream may present terms serially, but the bits expressing each of the terms may be received in parallel. The data stream may be received from a source external to the system 10, or may be formed by interrogating a memory device, such as the memory 16, and forming the data stream from data stored in the memory 16. In other examples, the state machine engine 14 may be configured to recognize a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase. The stream of data to be analyzed may include multiple bits of data in a binary format or other formats, e.g., base ten, ASCII, etc. The stream may encode the data with a single digit or multiple digits, e.g., several binary digits.

As will be appreciated, the system 10 may include memory 16. The memory 16 may include volatile memory, such as Dynamic Random Access Memory (DRAM), Static Random Access Memory (SRAM), Synchronous DRAM (SDRAM), Double Data Rate DRAM (DDR SDRAM), DDR2 SDRAM, DDR3 SDRAM, etc. The memory 16 may also include non-volatile memory, such as read-only memory (ROM), PC-RAM, silicon-oxide-nitride-oxide-silicon (SONOS) memory, metal-oxide-nitride-oxide-silicon (MONOS) memory, polysilicon floating gate based memory, and/or other types of flash memory of various architectures (e.g., NAND memory, NOR memory, etc.) to be used in conjunction with the volatile memory. The memory 16 may include one or more memory devices, such as DRAM devices, that may provide data to be analyzed by the state machine engine 14. As used herein, the term "provide" may generically refer to direct, input, insert, issue, route, send, transfer, transmit, generate, give, make available, move, output, pass, place, read out, write, etc. Such devices may be referred to as or include solid state drives (SSD's), MultimediaMediaCards (MMC's), SecureDigital (SD) cards, CompactFlash (CF) cards, or any other suitable device. Further, it should be appreciated that such devices may couple to the system 10 via any suitable interface, such as Universal Serial Bus (USB), Peripheral Component Interconnect (PCI), PCI Express (PCI-E), Small Computer System Interface (SCSI), IEEE 1394 (Firewire), or any other suitable interface. To facilitate operation of the memory 16, such as the flash memory devices, the system 10 may include a memory controller (not illustrated). As will be appreciated, the memory controller may be an independent device or it may be integral with the processor 12. Additionally, the system 10 may include an external storage 18, such as a magnetic storage device. The external storage may also provide input data to the state machine engine 14.

The system 10 may include a number of additional elements. For instance, a compiler 20 may be used to configure (e.g., program) the state machine engine 14, as described in more detail with regard to FIG. 8. An input device 22 may also be coupled to the processor 12 to allow a user to input data into the system 10. For instance, an input device 22 may be used to input data into the memory 16 for later analysis by the state machine engine 14. The input device 22 may include buttons, switching elements, a keyboard, a light pen, a stylus, a mouse, and/or a voice recognition system, for instance. An output device 24, such as a display may also be coupled to the processor 12. The display 24 may include an LCD, a CRT, LEDs, and/or an audio display, for example. They system may also include a network interface device 26, such as a Network Interface Card (NIC), for interfacing with a network, such as the Internet. As will be appreciated, the system 10 may include many other components, depending on the application of the system 10.

FIGS. 2-5 illustrate an example of a FSM lattice 30. In an example, the FSM lattice 30 comprises an array of blocks 32. As will be described, each block 32 may include a plurality of selectively couple-able hardware elements (e.g., configurable elements and/or special purpose elements) that correspond to a plurality of states in a FSM. Similar to a state in a FSM, a hardware element can analyze an input stream and activate a downstream hardware element, based on the input stream.

The configurable elements can be configured (e.g., programmed) to implement many different functions. For instance, the configurable elements may include state transition elements (STEs) 34, 36 (shown in FIG. 5) that are hierarchically organized into rows 38 (shown in FIGS. 3 and 4) and blocks 32 (shown in FIGS. 2 and 3). The STEs each may be considered an automaton, e.g., a machine or control mechanism designed to follow automatically a predetermined sequence of operations or respond to encoded instructions. Taken together, the STEs form an automata processor as state machine engine 14. To route signals between the hierarchically organized STEs 34, 36, a hierarchy of configurable switching elements can be used, including inter-block switching elements 40 (shown in FIGS. 2 and 3), intra-block switching elements 42 (shown in FIGS. 3 and 4) and intra-row switching elements 44 (shown in FIG. 4).

As described below, the switching elements may include routing structures and buffers. A STE 34, 36 can correspond to a state of a FSM implemented by the FSM lattice 30. The STEs 34, 36 can be coupled together by using the configurable switching elements as described below. Accordingly, a FSM can be implemented on the FSM lattice 30 by configuring the STEs 34, 36 to correspond to the functions of states and by selectively coupling together the STEs 34, 36 to correspond to the transitions between states in the FSM.

Figure 2:
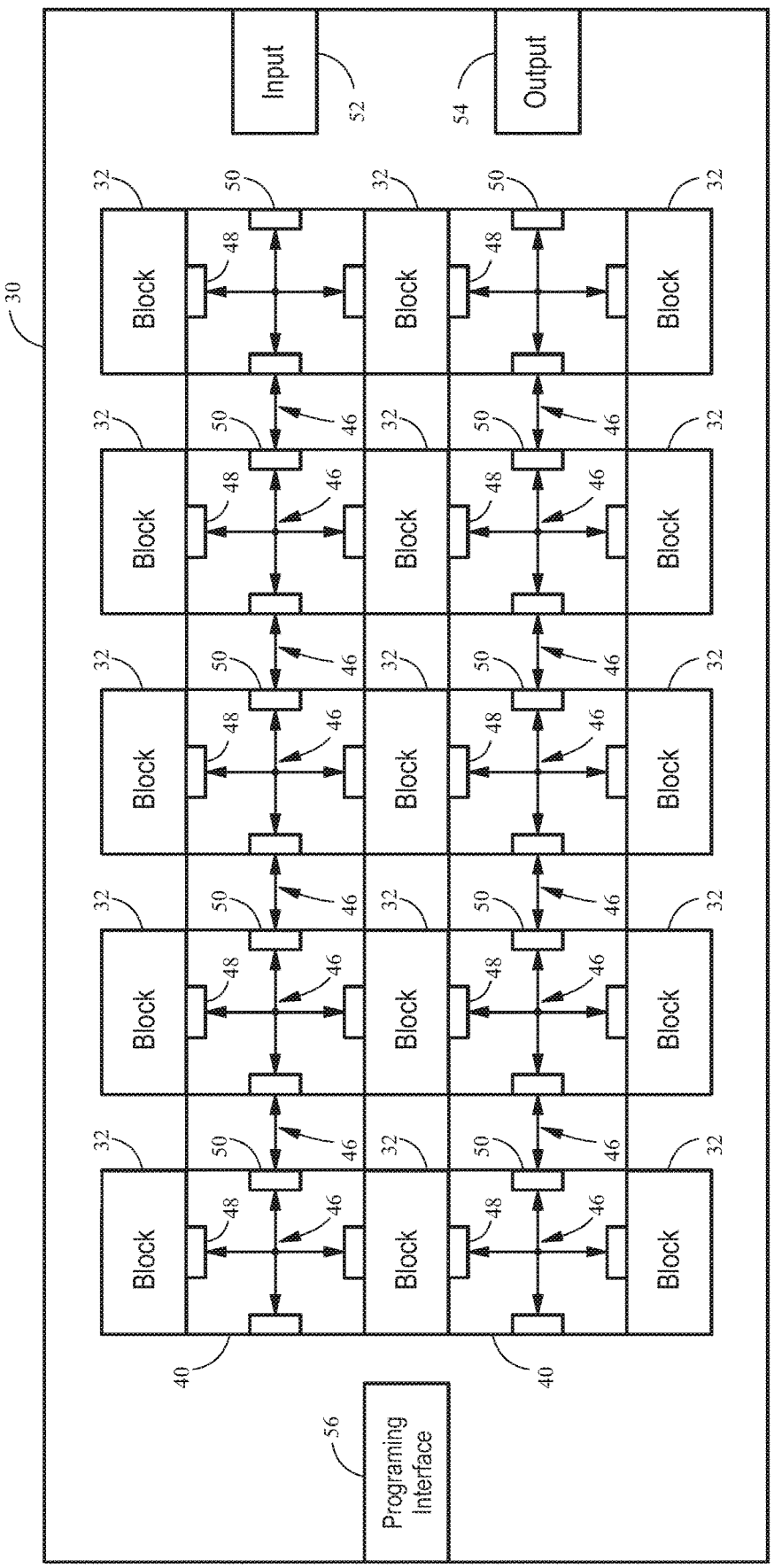
FIG. 2 illustrates an example of an FSM lattice of the state machine engine of FIG. 1, according to various embodiments.

FIG. 2 illustrates an overall view of an example of a FSM lattice 30. The FSM lattice 30 includes a plurality of blocks 32 that can be selectively coupled together with configurable inter-block switching elements 40. The inter-block switching elements 40 may include conductors 46 (e.g., wires, traces, etc.) and buffers 48, 50. In an example, buffers 48 and 50 are included to control the connection and timing of signals to/from the inter-block switching elements 40. As described further below, the buffers 48 may be provided to buffer data being sent between blocks 32, while the buffers 50 may be provided to buffer data being sent between inter-block switching elements 40. Additionally, the blocks 32 can be selectively coupled to an input block 52 (e.g., a data input port) for receiving signals (e.g., data) and providing the data to the blocks 32. The blocks 32 can also be selectively coupled to an output block 54 (e.g., an output port) for providing signals from the blocks 32 to an external device (e.g., another FSM lattice 30). The FSM lattice 30 can also include a programming interface 56 to configure (e.g., via an image, program) the FSM lattice 30. The image can configure (e.g., set) the state of the STEs 34, 36. For example, the image can configure the STEs 34, 36 to react in a certain way to a given input at the input block 52. For example, a STE 34, 36 can be set to output a high signal when the character 'a' is received at the input block 52.

In an example, the input block 52, the output block 54, and/or the programming interface 56 can be implemented as registers such that writing to or reading from the registers provides data to or from the respective elements. Accordingly, bits from the image stored in the registers corresponding to the programming interface 56 can be loaded on the STEs 34, 36. Although FIG. 2 illustrates a certain number of conductors (e.g., wire, trace) between a block 32, input block 52, output block 54, and an inter-block switching element 40, it should be understood that in other examples, fewer or more conductors may be used.

Figure 3:
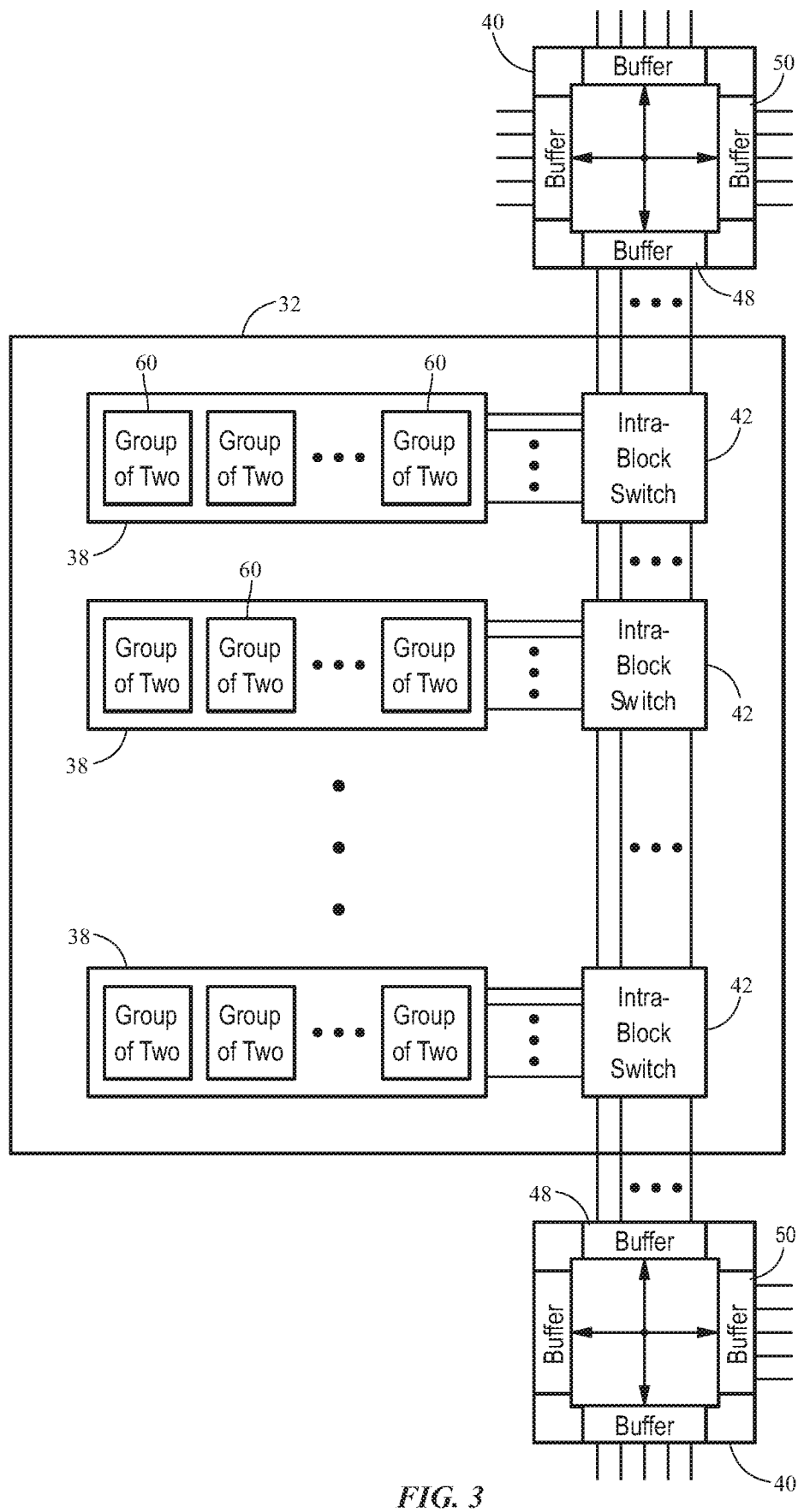
FIG. 3 illustrates an example of a block of the FSM lattice of FIG. 2, according to various embodiments.

FIG. 3 illustrates an example of a block 32. A block 32 can include a plurality of rows 38 that can be selectively coupled together with configurable intra-block switching elements 42. Additionally, a row 38 can be selectively coupled to another row 38 within another block 32 with the inter-block switching elements 40. A row 38 includes a plurality of STEs 34, 36 organized into pairs of elements that are referred to herein as groups of two (GOTs) 60. In an example, a block 32 comprises sixteen (16) rows 38.

Figure 4:
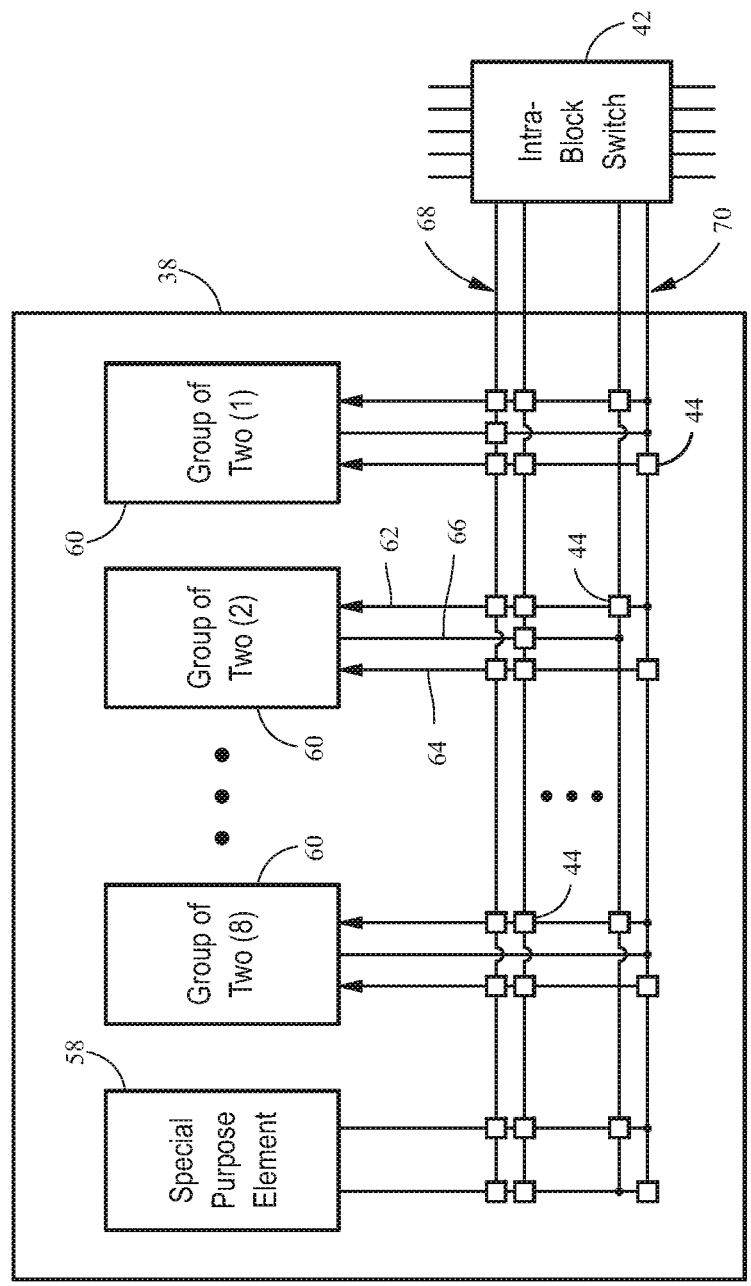
FIG. 4 illustrates an example of a row of the block of FIG. 3, according to various embodiments.

FIG. 4 illustrates an example of a row 38. A GOT 60 can be selectively coupled to other GOTs 60 and any other elements (e.g., a special purpose element 58) within the row 38 by configurable intra-row switching elements 44. A GOT 60 can also be coupled to other GOTs 60 in other rows 38 with the intra-block switching element 42, or other GOTs 60 in other blocks 32 with an inter-block switching element 40. In an example, a GOT 60 has a first and second input 62, 64, and an output 66. The first input 62 is coupled to a first STE 34 of the GOT 60 and the second input 64 is coupled to a second STE 36 of the GOT 60, as will be further illustrated with reference to FIG. 5.

In an example, the row 38 includes a first and second plurality of row interconnection conductors 68, 70. In an example, an input 62, 64 of a GOT 60 can be coupled to one or more row interconnection conductors 68, 70, and an output 66 can be coupled to one or more row interconnection conductor 68, 70. In an example, a first plurality of the row interconnection conductors 68 can be coupled to each STE 34, 36 of each GOT 60 within the row 38. A second plurality of the row interconnection conductors 70 can be coupled to only one STE 34, 36 of each GOT 60 within the row 38, but cannot be coupled to the other STE 34, 36 of the GOT 60. In an example, a first half of the second plurality of row interconnection conductors 70 can couple to first half of the STEs 34, 36 within a row 38 (one STE 34 from each GOT 60) and a second half of the second plurality of row interconnection conductors 70 can couple to a second half of the STEs 34, 36 within a row 38 (the other STE 34, 36 from each GOT 60), as will be better illustrated with respect to FIG. 5. The limited connectivity between the second plurality of row interconnection conductors 70 and the STEs 34, 36 is referred to herein as "parity". In an example, the row 38 can also include a special purpose element 58 such as a counter, a configurable Boolean logic element, look-up table, RAM, a field configurable gate array (FPGA), an application specific integrated circuit (ASIC), a configurable processor (e.g., a microprocessor), or other element for performing a special purpose function.

In an example, the special purpose element 58 comprises a counter (also referred to herein as counter 58). In an example, the counter 58 comprises a 12-bit configurable down counter. The 12-bit configurable counter 58 has a counting input, a reset input, and zero-count output. The counting input, when asserted, decrements the value of the counter 58 by one. The reset input, when asserted, causes the counter 58 to load an initial value from an associated register. For the 12-bit counter 58, up to a 12-bit number can be loaded in as the initial value. When the value of the counter 58 is decremented to zero (0), the zero-count output is asserted. The counter 58 also has at least two modes, pulse and hold. When the counter 58 is set to pulse mode, the zero-count output is asserted when the counter 58 reaches zero. For example, the zero-count output is asserted during the processing of an immediately subsequent next data byte, which results in the counter 58 being offset in time with respect to the input character cycle. After the next character cycle, the zero-count output is no longer asserted. In this manner, for example, in the pulse mode, the zero-count output is asserted for one input character processing cycle. When the counter 58 is set to hold mode the zero-count output is asserted during the clock cycle when the counter 58 decrements to zero, and stays asserted until the counter 58 is reset by the reset input being asserted.

In another example, the special purpose element 58 comprises Boolean logic. For example, the Boolean logic may be used to perform logical functions, such as AND, OR, NAND, NOR, Sum of Products (SoP), Negated-Output Sum of Products (NSoP), Negated-Output Product of Sume (NPoS), and Product of Sums (PoS) functions. This Boolean logic can be used to extract data from terminal state STEs (corresponding to terminal nodes of a FSM, as discussed later herein) in FSM lattice 30. The data extracted can be used to provide state data to other FSM lattices 30 and/or to provide configuring data used to reconfigure FSM lattice 30, or to reconfigure another FSM lattice 30.

Figure 4A:
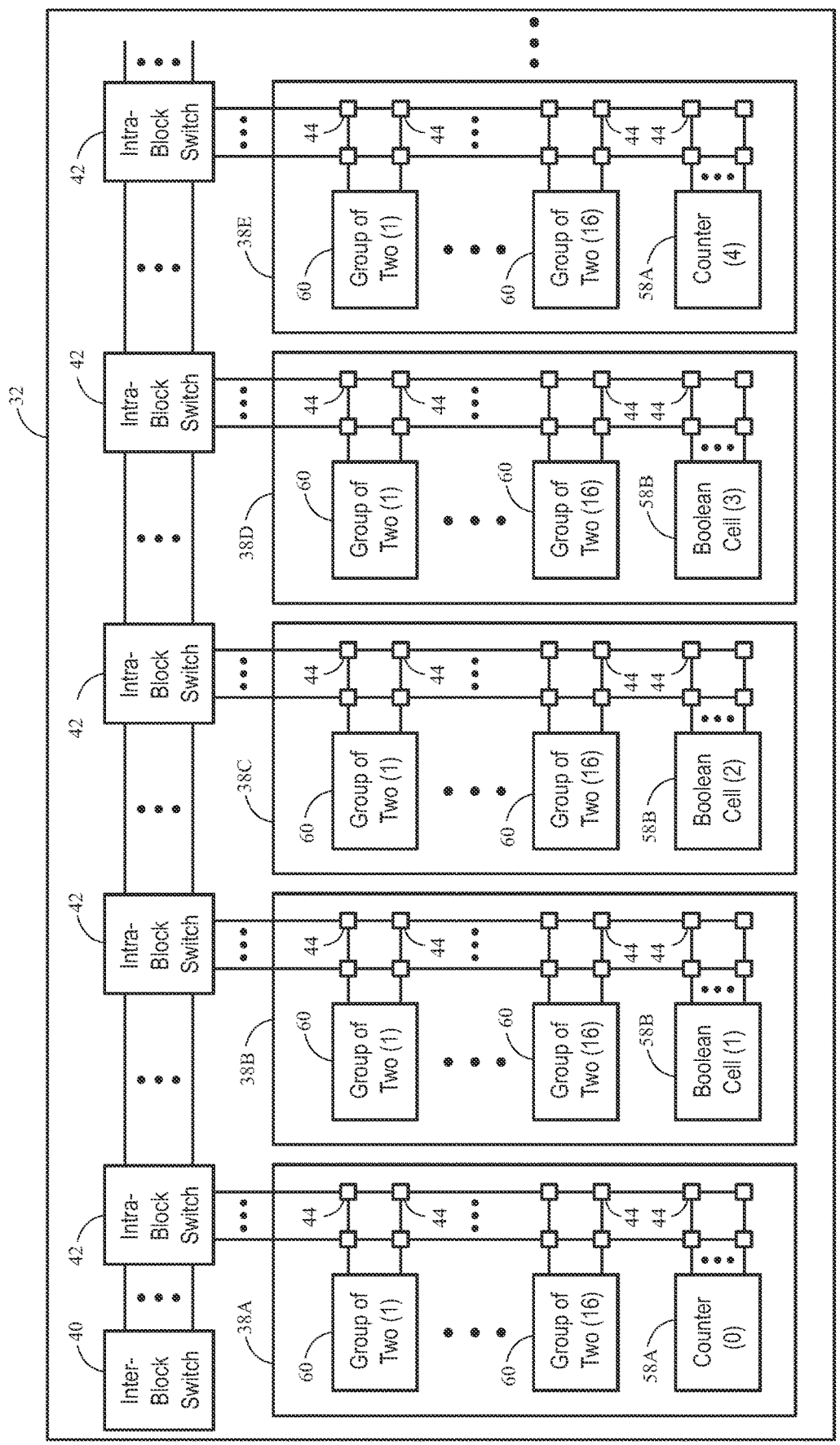
FIG. 4A illustrates a block as in FIG. 3 having counters in rows of the block, according to various embodiments of the invention.

FIG. 4A is an illustration of an example of a block 32 having rows 38 which each include the special purpose element 58. For example, the special purpose elements 58 in the block 32 may include counter cells 58A and Boolean logic cells 58B. While only the rows 38 in row positions 0 through 4 are illustrated in FIG. 4A (e.g., labeled 38A through 38E), each block 32 may have any number of rows 38 (e.g., 16 rows 38), and one or more special purpose elements 58 may be configured in each of the rows 38. For example, in one embodiment, counter cells 58A may be configured in certain rows 38 (e.g., in row positions 0, 4, 8, and 12), while the Boolean logic cells 58B may be configured in the remaining of the 16 rows 38 (e.g., in row positions 1, 2, 3, 5, 6, 7, 9, 10, 11, 13, 14, 15, and 16). The GOT 60 and the special purpose elements 58 may be selectively coupled (e.g., selectively connected) in each row 38 through intra-row switching elements 44, where each row 38 of the block 32 may be selectively coupled with any of the other rows 38 of the block 32 through intra-block switching elements 42.

In some embodiments, each active GOT 60 in each row 38 may output a signal indicating whether one or more conditions are detected (e.g., a search result is detected), and the special purpose element 58 in the row 38 may receive the GOT 60 output to determine whether certain quantifiers of the one or more conditions are met and/or count a number of times a condition is detected. For example, quantifiers of a count operation may include determining whether a condition was detected at least a certain number of times, determining whether a condition was detected no more than a certain number of times, determining whether a condition was detected exactly a certain number of times, and determining whether a condition was detected within a certain range of times.

Outputs from the counter 58A and/or the Boolean logic cell 58B may be communicated through the intra-row switching elements 44 and the intra-block switching elements 42 to perform counting or logic with greater complexity. For example, counters 58A may be configured to implement the quantifiers, such as asserting an output only when a condition is detected an exact number of times. Counters 58A in a block 32 may also be used concurrently, thereby increasing the total bit count of the combined counters to count higher numbers of a detected condition. Furthermore, in some embodiments, different special purpose elements 58 such as counters 58A and Boolean logic cells 58B may be used together. For example, an output of one or more Boolean logic cells 58B may be counted by one or more counters 58A in a block 32.

Figure 5:
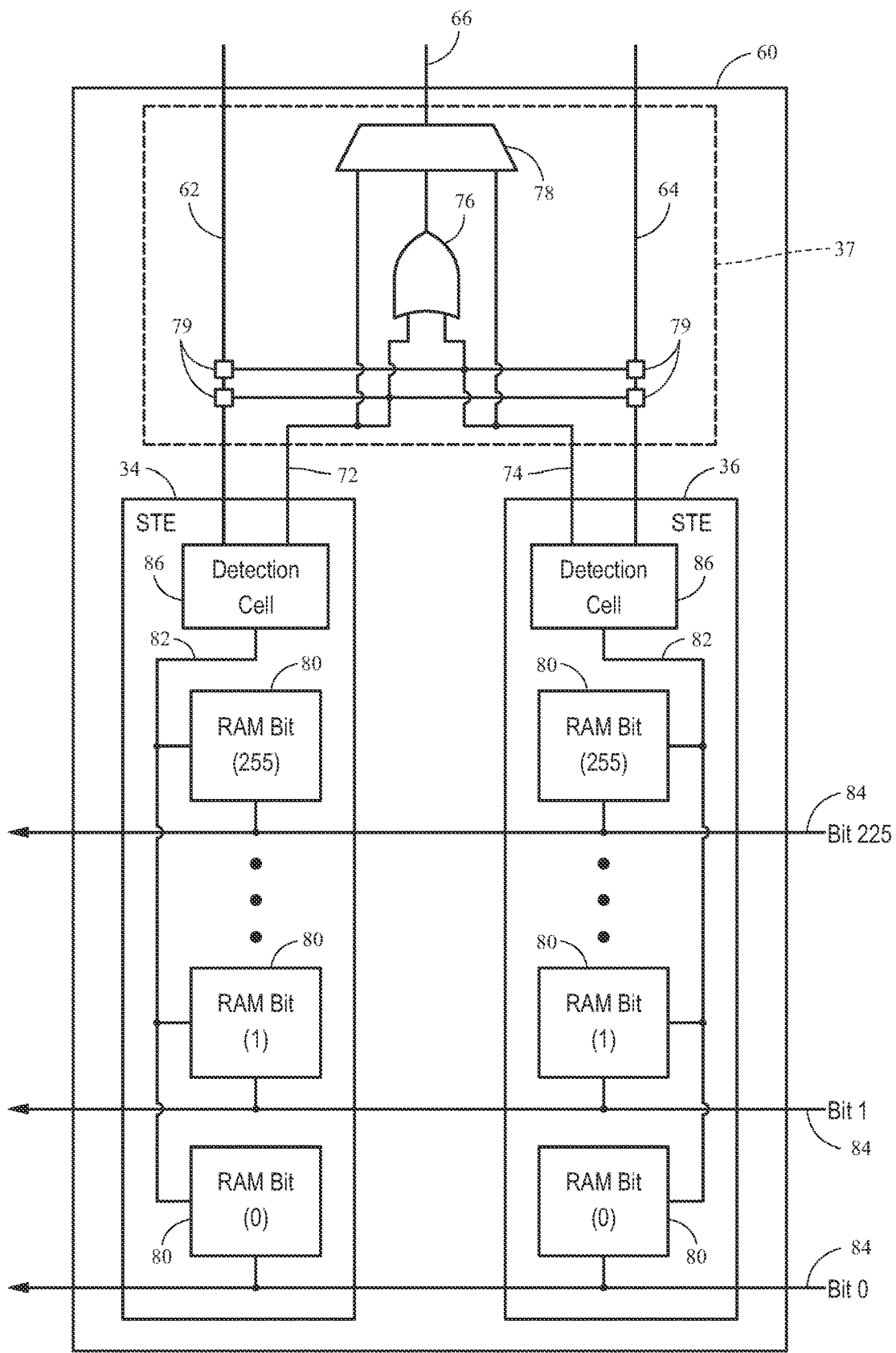
FIG. 5 illustrates an example of a Group of Two of the row of FIG. 4, according to embodiments.

FIG. 5 illustrates an example of a GOT 60. The GOT 60 includes a first STE 34 and a second STE 36 coupled to intra-group circuitry 37. That is, the first STE 34 and a second STE 36 may have inputs 62, 64 and outputs 72, 74 coupled to an OR gate 76 and a 3-to-1 multiplexer 78 of the intra-group circuitry 37. The 3-to-1 multiplexer 78 can be set to couple the output 66 of the GOT 60 to either the first STE 34, the second STE 36, or the OR gate 76. The OR gate 76 can be used to couple together both outputs 72, 74 to form the common output 66 of the GOT 60. In an example, the first and second STE 34, 36 exhibit parity, as discussed above, where the input 62 of the first STE 34 can be coupled to some of the row interconnection conductors 68 and the input 64 of the second STE 36 can be coupled to other row interconnection conductors 70 the common output 66 may be produced which may overcome parity problems. In an example, the two STEs 34, 36 within a GOT 60 can be cascaded and/or looped back to themselves by setting either or both of switching elements 79. The STEs 34, 36 can be cascaded by coupling the output 72, 74 of the STEs 34, 36 to the input 62, 64 of the other STE 34, 36. The STEs 34, 36 can be looped back to themselves by coupling the output 72, 74 to their own input 62, 64. Accordingly, the output 72 of the first STE 34 can be coupled to neither, one, or both of the input 62 of the first STE 34 and the input 64 of the second STE 36. Additionally, as each of the inputs 62, 64 may be coupled to a plurality of row routing lines, an OR gate may be utilized to select any of the inputs from these row routing lines along inputs 62, 64, as well as the outputs 72, 74.

In an example, each state transition element 34, 36 comprises a plurality of memory cells 80, such as those often used in dynamic random access memory (DRAM), coupled in parallel to a detect line 82. One such memory cell 80 comprises a memory cell that can be set to a data state, such as one that corresponds to either a high or a low value (e.g., a 1 or 0). The output of the memory cell 80 is coupled to the detect line 82 and the input to the memory cell 80 receives signals based on data on the data stream line 84. In an example, an input at the input block 52 is decoded to select one or more of the memory cells 80. The selected memory cell 80 provides its stored data state as an output onto the detect line 82. For example, the data received at the input block 52 can be provided to a decoder (not shown) and the decoder can select one or more of the data stream lines 84. In an example, the decoder can convert an 8-bit ACSII character to the corresponding 1 of 256 data stream lines 84.

A memory cell 80, therefore, outputs a high signal to the detect line 82 when the memory cell 80 is set to a high value and the data on the data stream line 84 selects the memory cell 80. When the data on the data stream line 84 selects the memory cell 80 and the memory cell 80 is set to a low value, the memory cell 80 outputs a low signal to the detect line 82. The outputs from the memory cells 80 on the detect line 82 are sensed by a detection cell 86.

In an example, the signal on an input line 62, 64 sets the respective detection cell 86 to either an active or inactive state. When set to the inactive state, the detection cell 86 outputs a low signal on the respective output 72, 74 regardless of the signal on the respective detect line 82. When set to an active state, the detection cell 86 outputs a high signal on the respective output line 72, 74 when a high signal is detected from one of the memory cells 82 of the respective STE 34, 36. When in the active state, the detection cell 86 outputs a low signal on the respective output line 72, 74 when the signals from all of the memory cells 82 of the respective STE 34, 36 are low.

In an example, an STE 34, 36 includes 256 memory cells 80 and each memory cell 80 is coupled to a different data stream line 84. Thus, an STE 34, 36 can be programmed to output a high signal when a selected one or more of the data stream lines 84 have a high signal thereon. For example, the STE 34 can have a first memory cell 80 (e.g., bit 0) set high and all other memory cells 80 (e.g., bits 1-255) set low. When the respective detection cell 86 is in the active state, the STE 34 outputs a high signal on the output 72 when the data stream line 84 corresponding to bit 0 has a high signal thereon. In other examples, the STE 34 can be set to output a high signal when one of multiple data stream lines 84 have a high signal thereon by setting the appropriate memory cells 80 to a high value.

In an example, a memory cell 80 can be set to a high or low value by reading bits from an associated register. Accordingly, the STEs 34 can be configured by storing an image created by the compiler 20 into the registers and loading the bits in the registers into associated memory cells 80. In an example, the image created by the compiler 20 includes a binary image of high and low (e.g., 1 and 0) bits. The image can configure the FSM lattice 30 to implement a FSM by cascading the STEs 34, 36. For example, a first STE 34 can be set to an active state by setting the detection cell 86 to the active state. The first STE 34 can be set to output a high signal when the data stream line 84 corresponding to bit 0 has a high signal thereon. The second STE 36 can be initially set to an inactive state, but can be set to, when active, output a high signal when the data stream line 84 corresponding to bit 1 has a high signal thereon. The first STE 34 and the second STE 36 can be cascaded by setting the output 72 of the first STE 34 to couple to the input 64 of the second STE 36. Thus, when a high signal is sensed on the data stream line 84 corresponding to bit 0, the first STE 34 outputs a high signal on the output 72 and sets the detection cell 86 of the second STE 36 to an active state. When a high signal is sensed on the data stream line 84 corresponding to bit 1, the second STE 36 outputs a high signal on the output 74 to activate another STE 36 or for output from the FSM lattice 30.

In an example, a single FSM lattice 30 is implemented on a single physical device, however, in other examples two or more FSM lattices 30 can be implemented on a single physical device (e.g., physical chip). In an example, each FSM lattice 30 can include a distinct data input block 52, a distinct output block 54, a distinct programming interface 56, and a distinct set of configurable elements. Moreover, each set of configurable elements can react (e.g., output a high or low signal) to data at their corresponding data input block 52. For example, a first set of configurable elements corresponding to a first FSM lattice 30 can react to the data at a first data input block 52 corresponding to the first FSM lattice 30. A second set of configurable elements corresponding to a second FSM lattice 30 can react to a second data input block 52 corresponding to the second FSM lattice 30. Accordingly, each FSM lattice 30 includes a set of configurable elements, wherein different sets of configurable elements can react to different input data. Similarly, each FSM lattice 30, and each corresponding set of configurable elements can provide a distinct output. In some examples, an output block 54 from a first FSM lattice 30 can be coupled to an input block 52 of a second FSM lattice 30, such that input data for the second FSM lattice 30 can include the output data from the first FSM lattice 30 in a hierarchical arrangement of a series of FSM lattices 30.

In an example, an image for loading onto the FSM lattice 30 comprises a plurality of bits of data for configuring the configurable elements, the configurable switching elements, and the special purpose elements within the FSM lattice 30. In an example, the image can be loaded onto the FSM lattice 30 to configure the FSM lattice 30 to provide a desired output based on certain inputs. The output block 54 can provide outputs from the FSM lattice 30 based on the reaction of the configurable elements to data at the data input block 52. An output from the output block 54 can include a single bit indicating a search result of a given pattern, a word comprising a plurality of bits indicating search results and non-search results to a plurality of patterns, and a state vector corresponding to the state of all or certain configurable elements at a given moment. As described, a number of FSM lattices 30 may be included in a state machine engine, such as state machine engine 14, to perform data analysis, such as pattern-recognition (e.g., speech recognition, image recognition, etc.) signal processing, imaging, computer vision, cryptography, and others.

Figure 6:
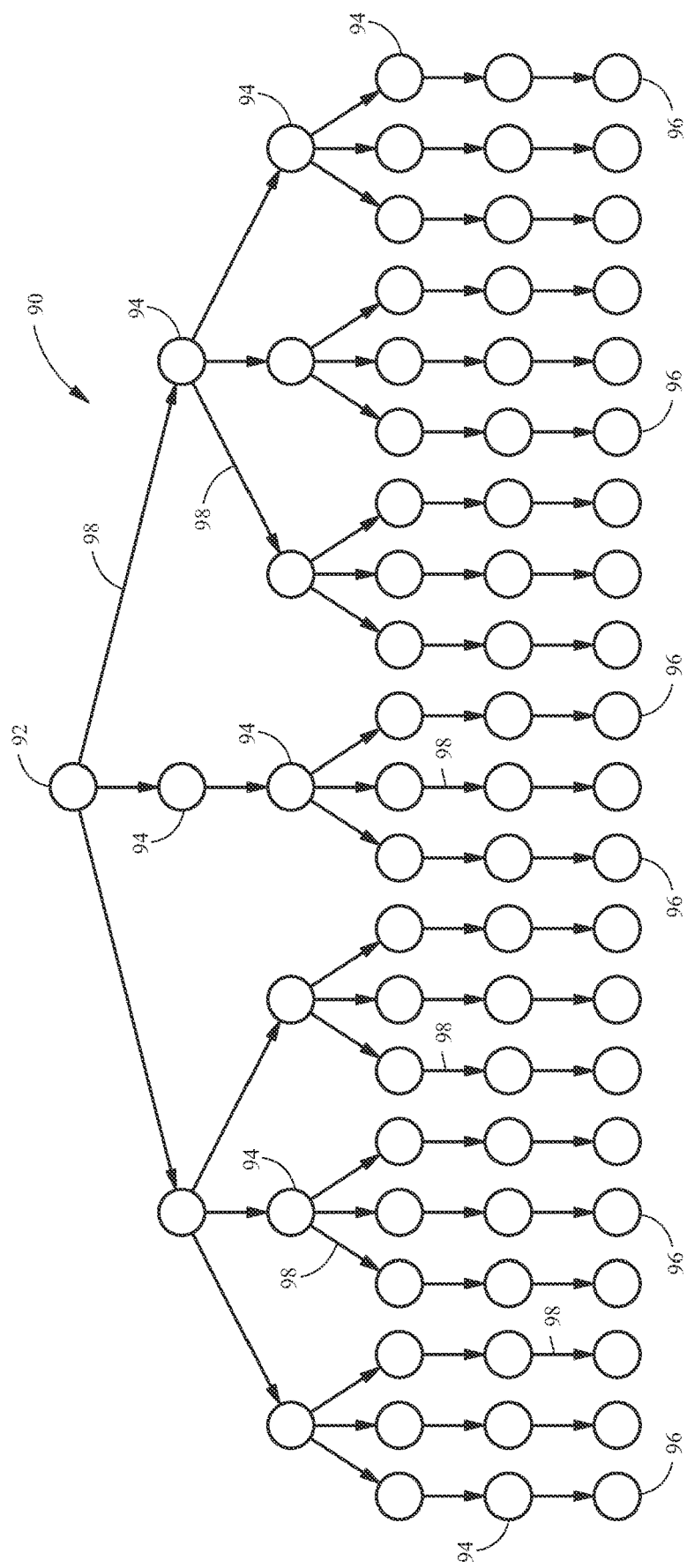
FIG. 6 illustrates an example of a finite state machine graph, according to various embodiments.

FIG. 6 illustrates an example model of a finite state machine (FSM) that can be implemented by the FSM lattice 30. The FSM lattice 30 can be configured (e.g., programmed) as a physical implementation of a FSM. A FSM can be represented as a diagram 90, (e.g., directed graph, undirected graph, pseudograph), which contains one or more root nodes 92. In addition to the root nodes 92, the FSM can be made up of several standard nodes 94 and terminal nodes 96 that are connected to the root nodes 92 and other standard nodes 94 through one or more edges 98. A node 92, 94, 96 corresponds to a state in the FSM. The edges 98 correspond to the transitions between the states.

Each of the nodes 92, 94, 96 can be in either an active or an inactive state. When in the inactive state, a node 92, 94, 96 does not react (e.g., respond) to input data. When in an active state, a node 92, 94, 96 can react to input data. An upstream node 92, 94 can react to the input data by activating a node 94, 96 that is downstream from the node when the input data matches criteria specified by an edge 98 between the upstream node 92, 94 and the downstream node 94, 96. For example, a first node 94 that specifies the character 'b' will activate a second node 94 connected to the first node 94 by an edge 98 when the first node 94 is active and the character 'b' is received as input data. As used herein, "upstream" refers to a relationship between one or more nodes, where a first node that is upstream of one or more other nodes (or upstream of itself in the case of a loop or feedback configuration) refers to the situation in which the first node can activate the one or more other nodes (or can activate itself in the case of a loop). Similarly, "downstream" refers to a relationship where a first node that is downstream of one or more other nodes (or downstream of itself in the case of a loop) can be activated by the one or more other nodes (or can be activated by itself in the case of a loop). Accordingly, the terms "upstream" and "downstream" are used herein to refer to relationships between one or more nodes, but these terms do not preclude the use of loops or other non-linear paths among the nodes.

In the diagram 90, the root node 92 can be initially activated and can activate downstream nodes 94 when the input data matches an edge 98 from the root node 92. Nodes 94 can activate nodes 96 when the input data matches an edge 98 from the node 94. Nodes 94, 96 throughout the diagram 90 can be activated in this manner as the input data is received. A terminal node 96 corresponds to a search result of a sequence of interest in the input data. Accordingly, activation of a terminal node 96 indicates that a sequence of interest has been received as the input data. In the context of the FSM lattice 30 implementing a pattern recognition function, arriving at a terminal node 96 can indicate that a specific pattern of interest has been detected in the input data.

In an example, each root node 92, standard node 94, and terminal node 96 can correspond to a configurable element in the FSM lattice 30. Each edge 98 can correspond to connections between the configurable elements. Thus, a standard node 94 that transitions to (e.g., has an edge 98 connecting to) another standard node 94 or a terminal node 96 corresponds to a configurable element that transitions to (e.g., provides an output to) another configurable element. In some examples, the root node 92 does not have a corresponding configurable element.

As will be appreciated, although the node 92 is described as a root node and nodes 96 are described as terminal nodes, there may not necessarily be a particular "start" or root node and there may not necessarily be a particular "end" or output node. In other words, any node may be a starting point and any node may provide output.

When the FSM lattice 30 is programmed, each of the configurable elements can also be in either an active or inactive state. A given configurable element, when inactive, does not react to the input data at a corresponding data input block 52. An active configurable element can react to the input data at the data input block 52, and can activate a downstream configurable element when the input data matches the setting of the configurable element. When a configurable element corresponds to a terminal node 96, the configurable element can be coupled to the output block 54 to provide an indication of a search result to an external device.

An image loaded onto the FSM lattice 30 via the programming interface 56 can configure the configurable elements and special purpose elements, as well as the connections between the configurable elements and special purpose elements, such that a desired FSM is implemented through the sequential activation of nodes based on reactions to the data at the data input block 52. In an example, a configurable element remains active for a single data cycle (e.g., a single character, a set of characters, a single clock cycle) and then becomes inactive unless re-activated by an upstream configurable element.

A terminal node 96 can be considered to store a compressed history of past search results. For example, the one or more patterns of input data required to reach a terminal node 96 can be represented by the activation of that terminal node 96. In an example, the output provided by a terminal node 96 is binary, for example, the output indicates whether a search result for a pattern of interest has been generated or not. The ratio of terminal nodes 96 to standard nodes 94 in a diagram 90 may be quite small. In other words, although there may be a high complexity in the FSM, the output of the FSM may be small by comparison.

In an example, the output of the FSM lattice 30 can comprise a state vector. The state vector comprises the state (e.g., activated or not activated) of configurable elements of the FSM lattice 30. In another example, the state vector can include the state of all or a subset of the configurable elements whether or not the configurable elements corresponds to a terminal node 96. In an example, the state vector includes the states for the configurable elements corresponding to terminal nodes 96. Thus, the output can include a collection of the indications provided by all terminal nodes 96 of a diagram 90. The state vector can be represented as a word, where the binary indication provided by each terminal node 96 comprises one bit of the word. This encoding of the terminal nodes 96 can provide an effective indication of the detection state (e.g., whether and what sequences of interest have been detected) for the FSM lattice 30.

As mentioned above, the FSM lattice 30 can be programmed to implement a pattern recognition function. For example, the FSM lattice 30 can be configured to recognize one or more data sequences (e.g., signatures, patterns) in the input data. When a data sequence of interest is recognized by the FSM lattice 30, an indication of that recognition can be provided at the output block 54. In an example, the pattern recognition can recognize a string of symbols (e.g., ASCII characters) to, for example, identify malware or other data in network data.

Figure 7:
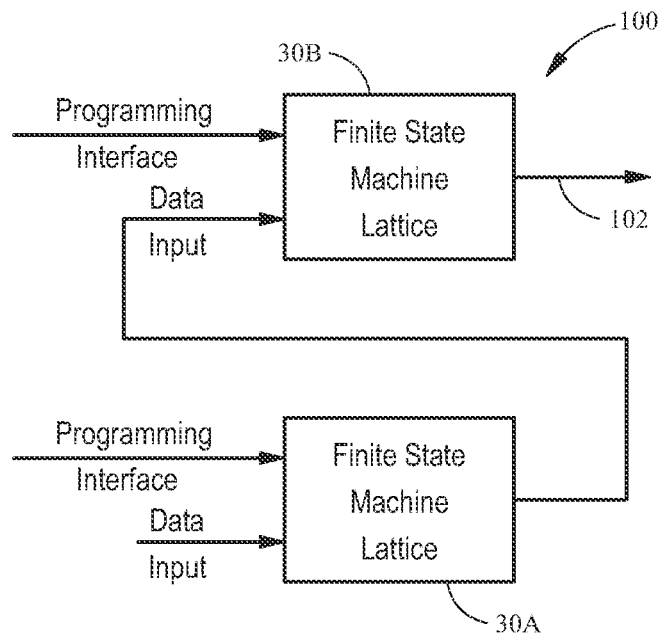
FIG. 7 illustrates an example of two-level hierarchy implemented with FSM lattices, according to various embodiments.

FIG. 7 illustrates an example of hierarchical structure 100, wherein two levels of FSM lattices 30 are coupled in series and used to analyze data. Specifically, in the illustrated embodiment, the hierarchical structure 100 includes a first FSM lattice 30A and a second FSM lattice 30B arranged in series. Each FSM lattice 30 includes a respective data input block 52 to receive data input, a programming interface block 56 to receive configuring signals and an output block 54.

The first FSM lattice 30A is configured to receive input data, for example, raw data at a data input block. The first FSM lattice 30A reacts to the input data as described above and provides an output at an output block. The output from the first FSM lattice 30A is sent to a data input block of the second FSM lattice 30B. The second FSM lattice 30B can then react based on the output provided by the first FSM lattice 30A and provide a corresponding output signal 102 of the hierarchical structure 100. This hierarchical coupling of two FSM lattices 30A and 30B in series provides a means to provide data regarding past search results in a compressed word from a first FSM lattice 30A to a second FSM lattice 30B. The data provided can effectively be a summary of complex matches (e.g., sequences of interest) that were recorded by the first FSM lattice 30A.

Figure 7A:
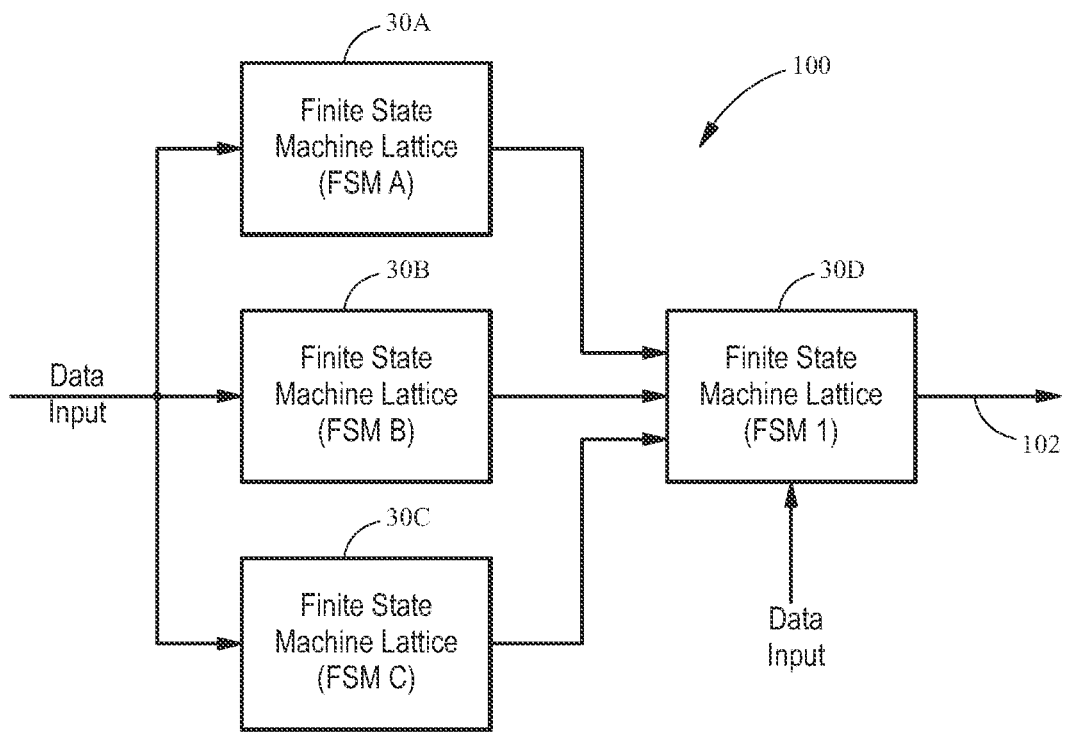
FIG. 7A illustrates a second example of two-level hierarchy implemented with FSM lattices, according to various embodiments.

FIG. 7A illustrates a second two-level hierarchy 100 of FSM lattices 30A, 30B, 30C, and 30D, which allows the overall FSM 100 (inclusive of all or some of FSM lattices 30A, 30B, 30C, and 30D) to perform two independent levels of analysis of the input data. The first level (e.g., FSM lattice 30A, FSM lattice 30B, and/or FSM lattice 30C) analyzes the same data stream, which includes data inputs to the overall FSM 100. The outputs of the first level (e.g., FSM lattice 30A, FSM lattice 30B, and/or FSM lattice 30C) become the inputs to the second level, (e.g., FSM lattice 30D). FSM lattice 30D performs further analysis of the combination the analysis already performed by the first level (e.g., FSM lattice 30A, FSM lattice 30B, and/or FSM lattice 30C). By connecting multiple FSM lattices 30A, 30B, and 30C together, increased knowledge about the data stream input may be obtained by FSM lattice 30D.

The first level of the hierarchy (implemented by one or more of FSM lattice 30A, FSM lattice 30B, and FSM lattice 30C) can, for example, perform processing directly on a raw data stream. For example, a raw data stream can be received at an input block 52 of the first level FSM lattices 30A, 30B, and/or 30C and the configurable elements of the first level FSM lattices 30A, 30B, and/or 30C can react to the raw data stream. The second level (implemented by the FSM lattice 30D) of the hierarchy can process the output from the first level. For example, the second level FSM lattice 30D receives the output from an output block 54 of the first level FSM lattices 30A, 30B, and/or 30C at an input block 52 of the second level FSM lattice 30D and the configurable elements of the second level FSM lattice 30D can react to the output of the first level FSM lattices 30A, 30B, and/or 30C. Accordingly, in this example, the second level FSM lattice 30D does not receive the raw data stream as an input, but rather receives the indications of search results for patterns of interest that are generated from the raw data stream as determined by one or more of the first level FSM lattices 30A, 30B, and/or 30C. Thus, the second level FSM lattice 30D can implement a FSM 100 that recognizes patterns in the output data stream from the one or more of the first level FSM lattices 30A, 30B, and/or 30C. However, it should also be appreciated that the second level FSM lattice 30D can additionally receive the raw data stream as an input, for example, in conjunction with the indications of search results for patterns of interest that are generated from the raw data stream as determined by one or more of the first level FSM lattices 30A, 30B, and/or 30C. It should be appreciated that the second level FSM lattice 30D may receive inputs from multiple other FSM lattices in addition to receiving output from the one or more of the first level FSM lattices 30A, 30B, and/or 30C. Likewise, the second level FSM lattice 30D may receive inputs from other devices. The second level FSM lattice 30D may combine these multiple inputs to produce outputs. Finally, while only two levels of FSM lattices 30A, 30B, 30C, and 30D are illustrated, it is envisioned that additional levels of FSM lattices may be stacked such that there are, for example, three, four, 10, 100, or more levels of FSM lattices.

Figure 8:
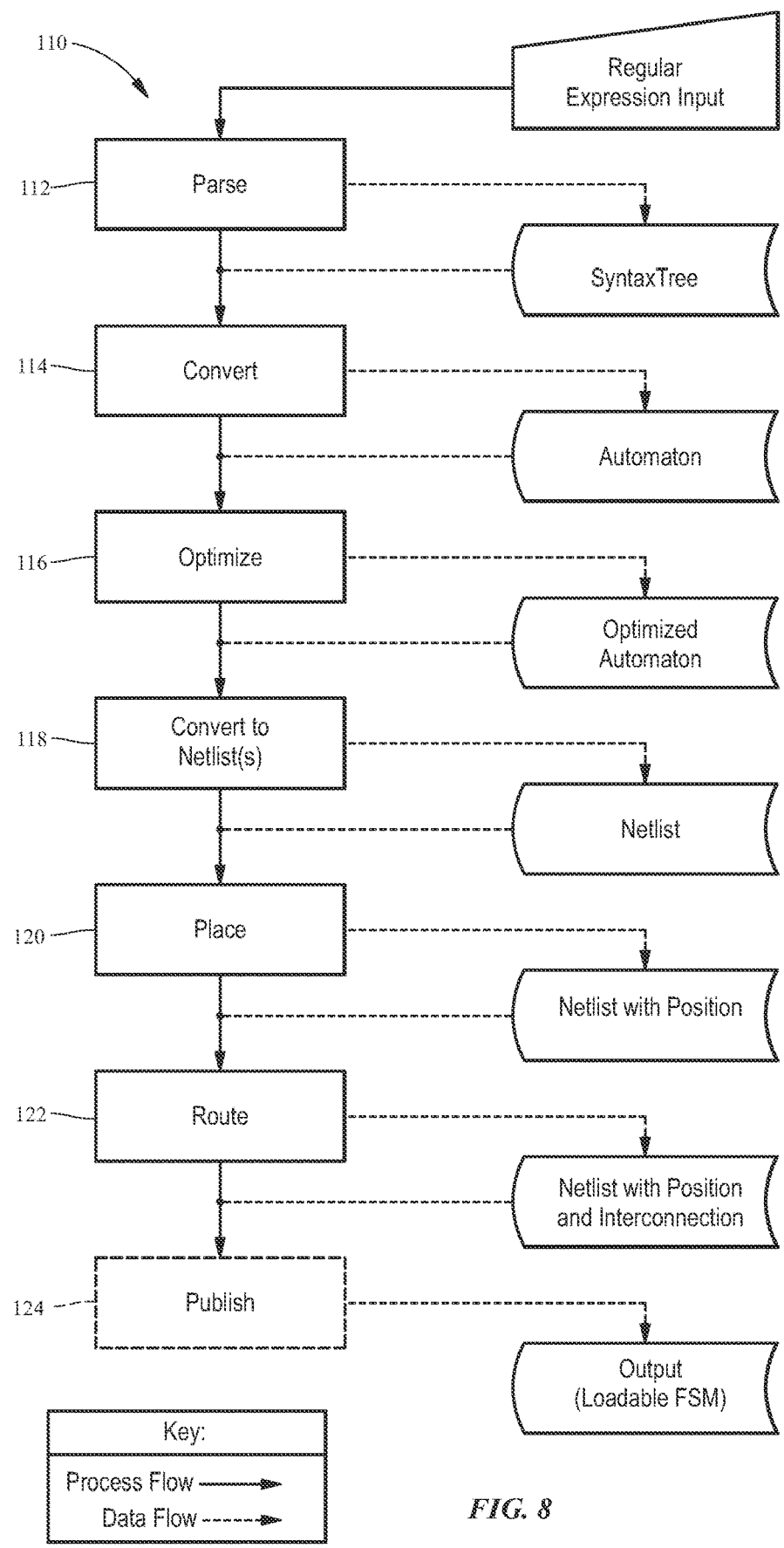
FIG. 8 illustrates an example of a method for a compiler to convert source code into a binary file for programming of the FSM lattice of FIG. 2, according to various embodiments.

FIG. 8 illustrates an example of a method 110 for a compiler to convert source code into an image used to configure a FSM lattice, such as lattice 30, to implement a FSM. Method 110 includes parsing the source code into a syntax tree (block 112), converting the syntax tree into an automaton (block 114), optimizing the automaton (block 116), converting the automaton into a netlist (block 118), placing the netlist on hardware (block 120), routing the netlist (block 122), and publishing the resulting image (block 124).

In an example, the compiler 20 includes an application programming interface (API) that allows software developers to create images for implementing FSMs on the FSM lattice 30. The compiler 20 provides methods to convert an input set of regular expressions in the source code into an image that is configured to configure the FSM lattice 30. The compiler 20 can be implemented by instructions for a computer having a von Neumann architecture. These instructions can cause a processor 12 on the computer to implement the functions of the compiler 20. For example, the instructions, when executed by the processor 12, can cause the processor 12 to perform actions as described in blocks 112, 114, 116, 118, 120, 122, and 124 on source code that is accessible to the processor 12.

In an example, the source code describes search strings for identifying patterns of symbols within a group of symbols. To describe the search strings, the source code can include a plurality of regular expressions (regexes). A regex can be a string for describing a symbol search pattern. Regexes are widely used in various computer domains, such as programming languages, text editors, network security, and others. In an example, the regular expressions supported by the compiler include criteria for the analysis of unstructured data. Unstructured data can include data that is free form and has no indexing applied to words within the data. Words can include any combination of bytes, printable and non-printable, within the data. In an example, the compiler can support multiple different source code languages for implementing regexs including Perl, (e.g., Perl compatible regular expressions (PCRE)), PHP, Java, and .NET languages.

At block 112 the compiler 20 can parse the source code to form an arrangement of relationally connected operators, where different types of operators correspond to different functions implemented by the source code (e.g., different functions implemented by regexes in the source code). Parsing source code can create a generic representation of the source code. In an example, the generic representation comprises an encoded representation of the regexes in the source code in the form of a tree graph known as a syntax tree. The examples described herein refer to the arrangement as a syntax tree (also known as an "abstract syntax tree") in other examples, however, a concrete syntax tree as part of the abstract syntax tree, a concrete syntax tree in place of the abstract syntax tree, or other arrangement can be used.

Since, as mentioned above, the compiler 20 can support multiple languages of source code, parsing converts the source code, regardless of the language, into a non-language specific representation, e.g., a syntax tree. Thus, further processing (blocks 114, 116, 118, 120) by the compiler 20 can work from a common input structure regardless of the language of the source code.

As noted above, the syntax tree includes a plurality of operators that are relationally connected. A syntax tree can include multiple different types of operators. For example, different operators can correspond to different functions implemented by the regexes in the source code.

At block 114, the syntax tree is converted into an automaton. An automaton comprises a software model of a FSM which may, for example, comprise a plurality of states. In order to convert the syntax tree into an automaton, the operators and relationships between the operators in the syntax tree are converted into states with transitions between the states. Moreover, in one embodiment, conversion of the automaton is accomplished based on the hardware of the FSM lattice 30.

In an example, input symbols for the automaton include the symbols of the alphabet, the numerals 0-9, and other printable characters. In an example, the input symbols are represented by the byte values 0 through 255 inclusive. In an example, an automaton can be represented as a directed graph where the nodes of the graph correspond to the set of states. In an example, a transition from state p to state q on an input symbol α, i.e. δ(p,α), is shown by a directed connection from node p to node q. In an example, a reversal of an automaton produces a new automaton where each transition p→q on some symbol α is reversed q→p on the same symbol. In a reversal, start states become final states and the final states become start states. In an example, the language recognized (e.g., matched) by an automaton is the set of all possible character strings which when input sequentially into the automaton will reach a final state. Each string in the language recognized by the automaton traces a path from the start state to one or more final states.

At block 116, after the automaton is constructed, the automaton is optimized to reduce its complexity and size, among other things. The automaton can be optimized by combining redundant states.

At block 118, the optimized automaton is converted into a netlist. Converting the automaton into a netlist maps each state of the automaton to a hardware element (e.g., STEs 34, 36, other elements) on the FSM lattice 30, and determines the connections between the hardware elements.

At block 120, the netlist is placed to select a specific hardware element of the target device (e.g., STEs 34, 36, special purpose elements 58) corresponding to each node of the netlist. In an example, placing selects each specific hardware element based on general input and output constraints for of the FSM lattice 30.

At block 122, the placed netlist is routed to determine the settings for the configurable switching elements (e.g., inter-block switching elements 40, intra-block switching elements 42, and intra-row switching elements 44) in order to couple the selected hardware elements together to achieve the connections describe by the netlist. In an example, the settings for the configurable switching elements are determined by determining specific conductors of the FSM lattice 30 that will be used to connect the selected hardware elements, and the settings for the configurable switching elements. Routing can take into account more specific limitations of the connections between the hardware elements than can be accounted for via the placement at block 120. Accordingly, routing may adjust the location of some of the hardware elements as determined by the global placement in order to make appropriate connections given the actual limitations of the conductors on the FSM lattice 30.

Once the netlist is placed and routed, the placed and routed netlist can be converted into a plurality of bits for configuring a FSM lattice 30. The plurality of bits are referred to herein as an image (e.g., binary image).

At block 124, an image is published by the compiler 20. The image comprises a plurality of bits for configuring specific hardware elements of the FSM lattice 30. The bits can be loaded onto the FSM lattice 30 to configure the state of STEs 34, 36, the special purpose elements 58, and the configurable switching elements such that the programmed FSM lattice 30 implements a FSM having the functionality described by the source code. Placement (block 120) and routing (block 122) can map specific hardware elements at specific locations in the FSM lattice 30 to specific states in the automaton. Accordingly, the bits in the image can configure the specific hardware elements to implement the desired function(s). In an example, the image can be published by saving the machine code to a computer readable medium. In another example, the image can be published by displaying the image on a display device. In still another example, the image can be published by sending the image to another device, such as a configuring device for loading the image onto the FSM lattice 30. In yet another example, the image can be published by loading the image onto a FSM lattice (e.g., the FSM lattice 30).

In an example, an image can be loaded onto the FSM lattice 30 by either directly loading the bit values from the image to the STEs 34, 36 and other hardware elements or by loading the image into one or more registers and then writing the bit values from the registers to the STEs 34, 36 and other hardware elements. In an example, the hardware elements (e.g., STEs 34, 36, special purpose elements 58, configurable switching elements 40, 42, 44) of the FSM lattice 30 are memory mapped such that a configuring device and/or computer can load the image onto the FSM lattice 30 by writing the image to one or more memory addresses.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

Figure 9:
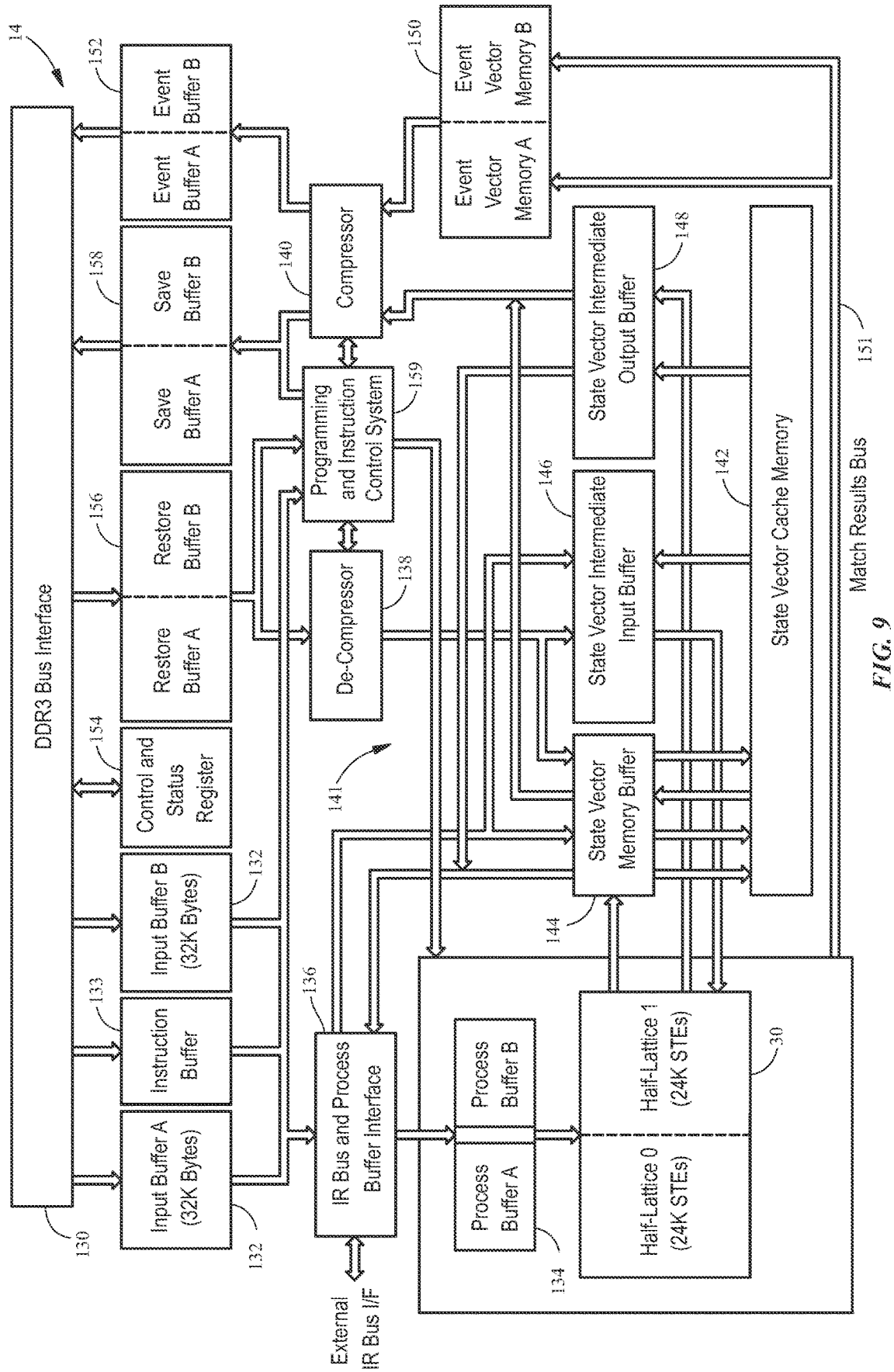
FIG. 9 illustrates a state machine engine, according to various embodiments.

Referring now to FIG. 9, an embodiment of the state machine engine 14 (e.g., a single device on a single chip) is illustrated. As previously described, the state machine engine 14 is configured to receive data from a source, such as the memory 16 over a data bus. In the illustrated embodiment, data may be sent to the state machine engine 14 through a bus interface, such as a double data rate three (DDR3) bus interface 130. The DDR3 bus interface 130 may be capable of exchanging (e.g., providing and receiving) data at a rate greater than or equal to 1 GByte/sec. Such a data exchange rate may be greater than a rate that data is analyzed by the state machine engine 14. As will be appreciated, depending on the source of the data to be analyzed, the bus interface 130 may be any suitable bus interface for exchanging data to and from a data source to the state machine engine 14, such as a NAND Flash interface, peripheral component interconnect (PCI) interface, gigabit media independent interface (GMMI), etc. As previously described, the state machine engine 14 includes one or more FSM lattices 30 configured to analyze data. Each FSM lattice 30 may be divided into two half-lattices. In the illustrated embodiment, each half lattice may include 24K STEs (e.g., STEs 34, 36), such that the lattice 30 includes 48K STEs. The lattice 30 may comprise any desirable number of STEs, arranged as previously described with regard to FIGS. 2-5. Further, while only one FSM lattice 30 is illustrated, the state machine engine 14 may include multiple FSM lattices 30, as previously described.

Data to be analyzed may be received at the bus interface 130 and provided to the FSM lattice 30 through a number of buffers and buffer interfaces. In the illustrated embodiment, the data path includes input buffers 132, an instruction buffer 133, process buffers 134, and an inter-rank (IR) bus and process buffer interface 136. The input buffers 132 are configured to receive and temporarily store data to be analyzed. In one embodiment, there are two input buffers 132 (input buffer A and input buffer B). Data may be stored in one of the two data input 132, while data is being emptied from the other input buffer 132, for analysis by the FSM lattice 30. The bus interface 130 may be configured to provide data to be analyzed to the input buffers 132 until the input buffers 132 are full. After the input buffers 132 are full, the bus interface 130 may be configured to be free to be used for other purpose (e.g., to provide other data from a data stream until the input buffers 132 are available to receive additional data to be analyzed). In the illustrated embodiment, the input buffers 132 may be 32 KBytes each. The instruction buffer 133 is configured to receive instructions from the processor 12 via the bus interface 130, such as instructions that correspond to the data to be analyzed and instructions that correspond to configuring the state machine engine 14. The IR bus and process buffer interface 136 may facilitate providing data to the process buffer 134. The IR bus and process buffer interface 136 can be used to ensure that data is processed by the FSM lattice 30 in order. The IR bus and process buffer interface 136 may coordinate the exchange of data, timing data, packing instructions, etc. such that data is received and analyzed correctly. Generally, the IR bus and process buffer interface 136 allows the analyzing of multiple data sets in parallel through a logical rank of FSM lattices 30. For example, multiple physical devices (e.g., state machine engines 14, chips, separate devices) may be arranged in a rank and may provide data to each other via the IR bus and process buffer interface 136. For purposes of this application the term "rank" refers to a set of state machine engines 14 connected to the same chip select. In the illustrated embodiment, the IR bus and process buffer interface 136 may include a 32 bit data bus. In other embodiments, the IR bus and process buffer interface 136 may include any suitable data bus, such as a 128 bit data bus.

In the illustrated embodiment, the state machine engine 14 also includes a de-compressor 138 and a compressor 140 to aid in providing state vector data through the state machine engine 14. The compressor 140 and de-compressor 138 work in conjunction such that the state vector data can be compressed to minimize the data providing times. By compressing the state vector data, the bus utilization time may be minimized. The compressor 140 and de-compressor 138 can also be configured to handle state vector data of varying burst lengths. By padding compressed state vector data and including an indicator as to when each compressed region ends, the compressor 140 may improve the overall processing speed through the state machine engine 14. The compressor 140 may be used to compress results data after analysis by the FSM lattice 30. The compressor 140 and de-compressor 138 may also be used to compress and decompress configuration data. In one embodiment, the compressor 140 and de-compressor 138 may be disabled (e.g., turned off) such that data flowing to and/or from the compressor 140 and de-compressor 138 is not modified.

As previously described, an output of the FSM lattice 30 can comprise a state vector. The state vector comprises the state (e.g., activated or not activated) of the STEs 34, 36 of the FSM lattice 30 and the dynamic (e.g., current) count of the counter 58. The state machine engine 14 includes a state vector system 141 having a state vector cache memory 142, a state vector memory buffer 144, a state vector intermediate input buffer 146, and a state vector intermediate output buffer 148. The state vector system 141 may be used to store multiple state vectors of the FSM lattice 30 and to provide a state vector to the FSM lattice 30 to restore the FSM lattice 30 to a state corresponding to the provided state vector. For example, each state vector may be temporarily stored in the state vector cache memory 142. For example, the state of each STE 34, 36 may be stored, such that the state may be restored and used in further analysis at a later time, while freeing the STEs 34, 36 for further analysis of a new data set (e.g., search terms). Like a typical cache, the state vector cache memory 142 allows storage of state vectors for quick retrieval and use, here by the FSM lattice 30, for instance. In the illustrated embodiment, the state vector cache memory 142 may store up to 512 state vectors.

As will be appreciated, the state vector data may be exchanged between different state machine engines 14 (e.g., chips) in a rank. The state vector data may be exchanged between the different state machine engines 14 for various purposes such as: to synchronize the state of the STEs 34, 36 of the FSM lattices 30 of the state machine engines 14, to perform the same functions across multiple state machine engines 14, to reproduce results across multiple state machine engines 14, to cascade results across multiple state machine engines 14, to store a history of states of the STEs 34, 36 used to analyze data that is cascaded through multiple state machine engines 14, and so forth. Furthermore, it should be noted that within a state machine engine 14, the state vector data may be used to quickly configure the STEs 34, 36 of the FSM lattice 30. For example, the state vector data may be used to restore the state of the STEs 34, 36 to an initialized state (e.g., to prepare for a new input data set), or to restore the state of the STEs 34, 36 to prior state (e.g., to continue searching of an interrupted or "split" input data set). In certain embodiments, the state vector data may be provided to the bus interface 130 so that the state vector data may be provided to the processor 12 (e.g., for analysis of the state vector data, reconfiguring the state vector data to apply modifications, reconfiguring the state vector data to improve efficiency of the STEs 34, 36, and so forth).

For example, in certain embodiments, the state machine engine 14 may provide cached state vector data (e.g., data stored by the state vector system 141) from the FSM lattice 30 to an external device. The external device may receive the state vector data, modify the state vector data, and provide the modified state vector data to the state machine engine 14 for configuring the FSM lattice 30. Accordingly, the external device may modify the state vector data so that the state machine engine 14 may skip states (e.g., jump around) as desired.

The state vector cache memory 142 may receive state vector data from any suitable device. For example, the state vector cache memory 142 may receive a state vector from the FSM lattice 30, another FSM lattice 30 (e.g., via the IR bus and process buffer interface 136), the de-compressor 138, and so forth. In the illustrated embodiment, the state vector cache memory 142 may receive state vectors from other devices via the state vector memory buffer 144. Furthermore, the state vector cache memory 142 may provide state vector data to any suitable device. For example, the state vector cache memory 142 may provide state vector data to the state vector memory buffer 144, the state vector intermediate input buffer 146, and the state vector intermediate output buffer 148.

Additional buffers, such as the state vector memory buffer 144, state vector intermediate input buffer 146, and state vector intermediate output buffer 148, may be utilized in conjunction with the state vector cache memory 142 to accommodate rapid retrieval and storage of state vectors, while processing separate data sets with interleaved packets through the state machine engine 14. In the illustrated embodiment, each of the state vector memory buffer 144, the state vector intermediate input buffer 146, and the state vector intermediate output buffer 148 may be configured to temporarily store one state vector. The state vector memory buffer 144 may be used to receive state vector data from any suitable device and to provide state vector data to any suitable device. For example, the state vector memory buffer 144 may be used to receive a state vector from the FSM lattice 30, another FSM lattice 30 (e.g., via the IR bus and process buffer interface 136), the de-compressor 138, and the state vector cache memory 142. As another example, the state vector memory buffer 144 may be used to provide state vector data to the IR bus and process buffer interface 136 (e.g., for other FSM lattices 30), the compressor 140, and the state vector cache memory 142.

Likewise, the state vector intermediate input buffer 146 may be used to receive state vector data from any suitable device and to provide state vector data to any suitable device. For example, the state vector intermediate input buffer 146 may be used to receive a state vector from an FSM lattice 30 (e.g., via the IR bus and process buffer interface 136), the de-compressor 138, and the state vector cache memory 142. As another example, the state vector intermediate input buffer 146 may be used to provide a state vector to the FSM lattice 30. Furthermore, the state vector intermediate output buffer 148 may be used to receive a state vector from any suitable device and to provide a state vector to any suitable device. For example, the state vector intermediate output buffer 148 may be used to receive a state vector from the FSM lattice 30 and the state vector cache memory 142. As another example, the state vector intermediate output buffer 148 may be used to provide a state vector to an FSM lattice 30 (e.g., via the IR bus and process buffer interface 136) and the compressor 140.

Once a result of interest is produced by the FSM lattice 30, an event vector may be stored in a event vector memory 150, whereby, for example, the event vector indicates at least one search result (e.g., detection of a pattern of interest). The event vector can then be sent to an event buffer 152 for transmission over the bus interface 130 to the processor 12, for example. As previously described, the results may be compressed. The event vector memory 150 may include two memory elements, memory element A and memory element B, each of which contains the results obtained by processing the input data in the corresponding input buffers 132 (e.g., input buffer A and input buffer B). In one embodiment, each of the memory elements may be DRAM memory elements or any other suitable storage devices. In some embodiments, the memory elements may operate as initial buffers to buffer the event vectors received from the FSM lattice 30, along results bus 151. For example, memory element A may receive event vectors, generated by processing the input data from input buffer A, along results bus 151 from the FSM lattice 30. Similarly, memory element B may receive event vectors, generated by processing the input data from input buffer B, along results bus 151 from the FSM lattice 30.

In one embodiment, the event vectors provided to the results memory 150 may indicate that a final result has been found by the FSM lattice 30. For example, the event vectors may indicate that an entire pattern has been detected. Alternatively, the event vectors provided to the results memory 150 may indicate, for example, that a particular state of the FSM lattice 30 has been reached. For example, the event vectors provided to the results memory 150 may indicate that one state (i.e., one portion of a pattern search) has been reached, so that a next state may be initiated. In this way, the event vector 150 may store a variety of types of results.

In some embodiments, IR bus and process buffer interface 136 may provide data to multiple FSM lattices 30 for analysis. This data may be time multiplexed. For example, if there are eight FSM lattices 30, data for each of the eight FSM lattices 30 may be provided to all of eight IR bus and process buffer interfaces 136 that correspond to the eight FSM lattices 30. Each of the eight IR bus and process buffer interfaces 136 may receive an entire data set to be analyzed. Each of the eight IR bus and process buffer interfaces 136 may then select portions of the entire data set relevant to the FSM lattice 30 associated with the respective IR bus and process buffer interface 136. This relevant data for each of the eight FSM lattices 30 may then be provided from the respective IR bus and process buffer interfaces 136 to the respective FSM lattice 30 associated therewith.

The event vector 150 may operate to correlate each received result with a data input that generated the result. To accomplish this, a respective result indicator may be stored corresponding to, and in some embodiments, in conjunction with, each event vector received from the results bus 151. In one embodiment, the result indicators may be a single bit flag. In another embodiment, the result indicators may be a multiple bit flag. If the result indicators may include a multiple bit flag, the bit positions of the flag may indicate, for example, a count of the position of the input data stream that corresponds to the event vector, the lattice that the event vectors correspond to, a position in set of event vectors, or other identifying information. These results indicators may include one or more bits that identify each particular event vector and allow for proper grouping and transmission of event vectors, for example, to compressor 140. Moreover, the ability to identify particular event vectors by their respective results indicators may allow for selective output of desired event vectors from the event vector memory 150. For example, only particular event vectors generated by the FSM lattice 30 may be selectively latched as an output. These result indicators may allow for proper grouping and provision of results, for example, to compressor 140. Moreover, the ability to identify particular event vectors by their respective result indicators allow for selective output of desired event vectors from the result memory 150. Thus, only particular event vectors provided by the FSM lattice 30 may be selectively provided to compressor 140.

Additional registers and buffers may be provided in the state machine engine 14, as well. In one embodiment, for example, a buffer may store information related to more than one process whereas a register may store information related to a single process. For instance, the state machine engine 14 may include control and status registers 154. In addition, a program buffer system (e.g., restore buffers 156) may be provided for initializing the FSM lattice 30. For example, initial (e.g., starting) state vector data may be provided from the program buffer system to the FSM lattice 30 (e.g., via the de-compressor 138). The de-compressor 138 may be used to decompress configuration data (e.g., state vector data, routing switch data, STE 34, 36 states, Boolean function data, counter data, match MUX data) provided to program the FSM lattice 30.

Similarly, a repair map buffer system (e.g., save buffers 158) may also be provided for storage of data (e.g., save maps) for setup and usage. The data stored by the repair map buffer system may include data that corresponds to repaired hardware elements, such as data identifying which STEs 34, 36 were repaired. The repair map buffer system may receive data via any suitable manner. For example, data may be provided from a "fuse map" memory, which provides the mapping of repairs done on a device during final manufacturing testing, to the save buffers 158. As another example, the repair map buffer system may include data used to modify (e.g., customize) a standard programming file so that the standard programming file may operate in a FSM lattice 30 with a repaired architecture (e.g., bad STEs 34, 36 in a FSM lattice 30 may be bypassed so they are not used). The compressor 140 may be used to compress data provided to the save buffers 158 from the fuse map memory. As illustrated, the bus interface 130 may be used to provide data to the restore buffers 156 and to provide data from the save buffers 158. As will be appreciated, the data provided to the restore buffers 156 and/or provided from the save buffers 158 may be compressed. In some embodiments, data is provided to the bus interface 130 and/or received from the bus interface 130 via a device external to the state machine engine 14 (e.g., the processor 12, the memory 16, the compiler 20, and so forth). The device external to the state machine engine 14 may be configured to receive data provided from the save buffers 158, to store the data, to analyze the data, to modify the data, and/or to provide new or modified data to the restore buffers 156.

The state machine engine 14 includes a lattice programming and instruction control system 159 used to configure (e.g., program) the FSM lattice 30 as well as provide inserted instructions, as will be described in greater detail below. As illustrated, the lattice programming and instruction control system 159 may receive data (e.g., configuration instructions) from the instruction buffer 133. Furthermore, the lattice programming and instruction control system 159 may receive data (e.g., configuration data) from the restore buffers 156. The lattice programming and instruction control system 159 may use the configuration instructions and the configuration data to configure the FSM lattice 30 (e.g., to configure routing switches, STEs 34, 36, Boolean cells, counters, match MUX) and may use the inserted instructions to correct errors during the operation of the state machine engine 14. The lattice programming and instruction control system 159 may also use the de-compressor 138 to de-compress data and the compressor 140 to compress data (e.g., for data exchanged with the restore buffers 156 and the save buffers 158).

Micron's D480 Automata Processor is a programmable silicon device capable of performing very high speed searches over an immense search space. In some embodiments, the state machine engine 14 may be a Micron's D480 Automata Processor. Automata Network Markup Language (ANML) is a language for building automata networks for implementation in, for example, the Automata Processor.

Based on XML, and formally described in an XML schema definition (XSD) document, ANML contains tags (elements and properties) that represent each of the automata processing resources. Element properties describe, for instance, the states in an automata, their transitions, and their response to input. The way in which these elements are configured and connected defines the task an automata network is programmed to perform.

Figure 10:
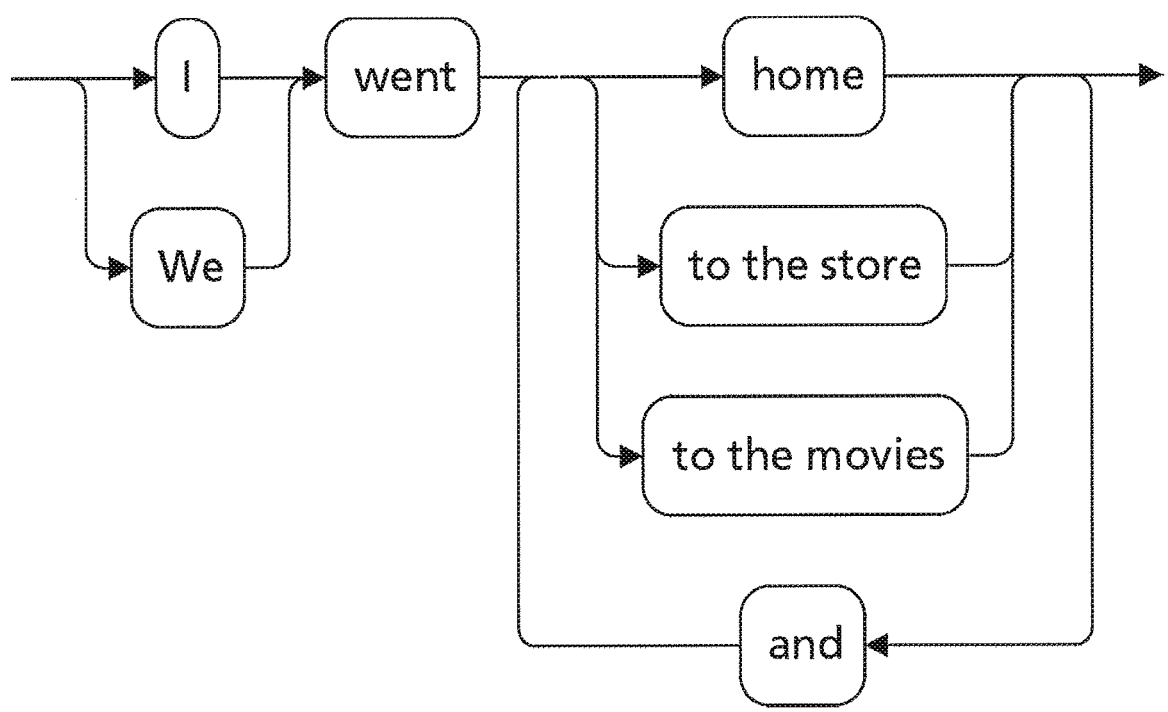
FIG. 10 illustrates a railroad diagram for creating Automata Network Markup Language (ANML) elements, according to various embodiments.

As a method for describing ANML syntax, the following description presents ANML in both text and graphical form, including railroad diagrams. Railroad diagrams represent a syntactic structure for creating ANML elements, an example of which is illustrated in FIG. 10.

Rectangles indicate the name of an element (rounded rectangles specify literal text whereas square rectangles represent abstractions defined elsewhere in the form of a text description or another more detailed diagram).

Arrows connect elements to each other and indicate path(s) in the syntax (arrows that split circumvent an optional syntax element or loop back to a repeated element whereas arrows that join indicate the next valid syntax element).

For example, following the railroad diagram above, various sentences can be constructed, including:

I went home.
We went to the movies.
We went to the store and to the movies.

Automata are autonomous, or self-operating, machines. In the world of automata computing, automata consist of computing nodes and connections configured to perform a computation, with the capability of many different automaton operating in parallel to process incoming data. Automata networks can be massively parallel, enabling the creation of networks of individual automaton with at least one, possibly multiple, entry points that execute simultaneously. Automata can be compared to traditional state machines; both are state-based, accepting input and transitioning to different states based on that input. Unlike traditional state machines, however, automata are flexible, easier to program, and are non-deterministic, which means more than one active state can occur at any given time.

Figure 11:
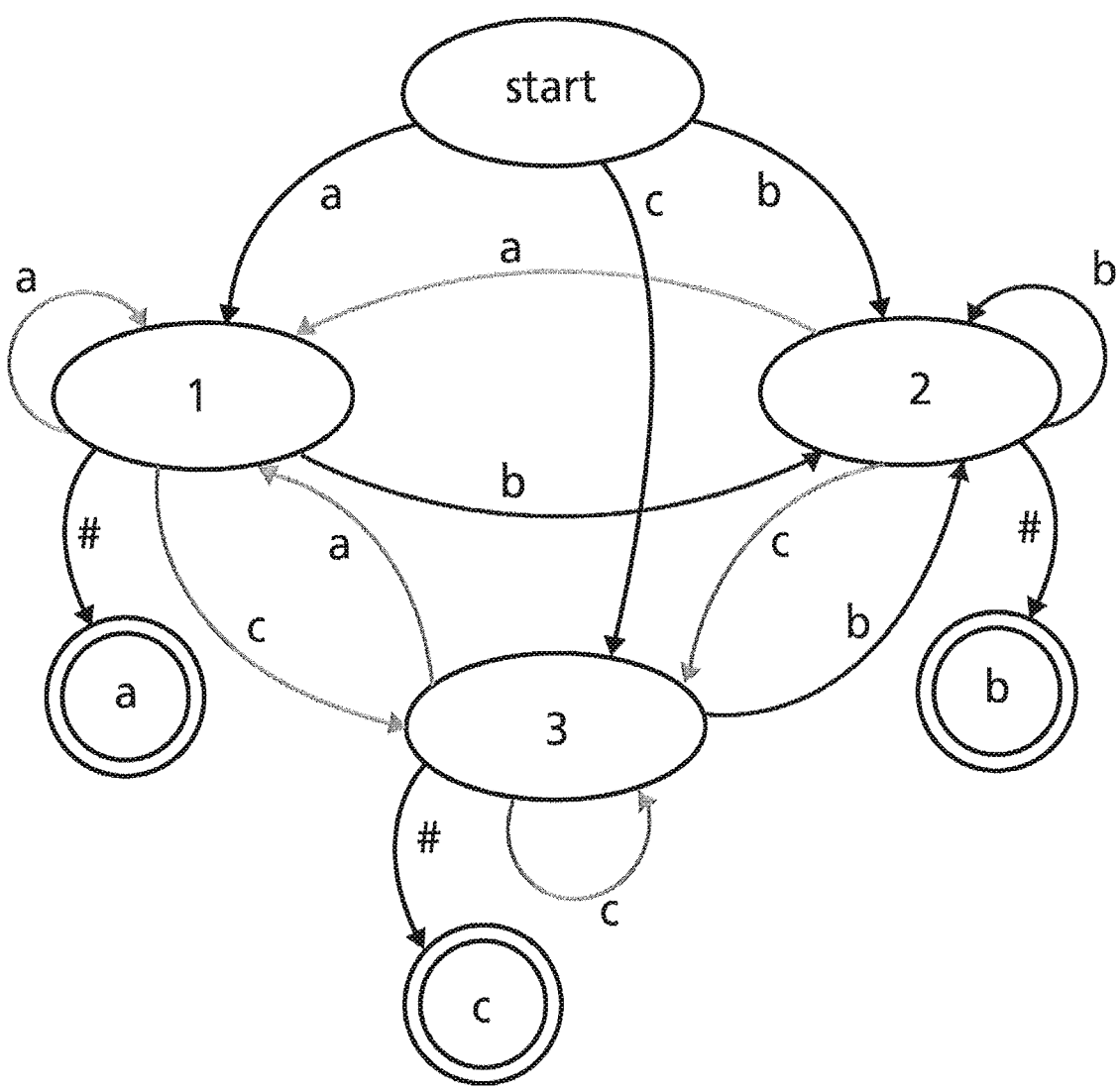
FIG. 11 illustrates a state machine that processes text, according to various embodiments.

Automata can also be compared to regular expressions. A regular expression can be reduced to a deterministic finite state machine, and therefore comparisons can be made between automaton, state machines, and regular expressions. FIG. 11 shows an example of a traditional state machine that processes text. The machine detects if a string of characters ends in a, b, or c. (The end of the string is denoted by a # character.)

Figure 12:
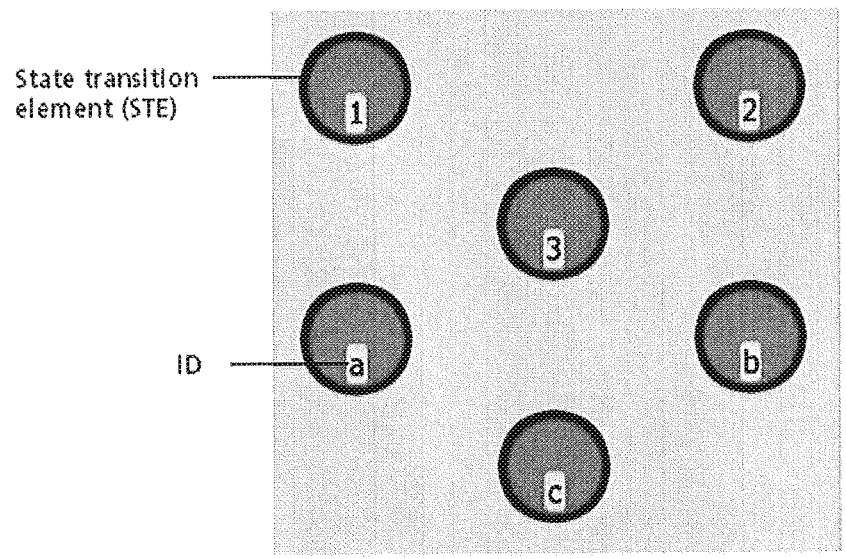
FIG. 12 illustrates an example of a state machine as an automaton, according to various embodiments.

This state machine contains seven states: start, 1, 2, 3, a, b, and c. The machine starts on the start state. It receives input with the set of characters [a,b,c,#] and transitions on a, b, c, or #. The three final states are a, b, and c. The process of creating an equivalent automaton starts with FIG. 12, which shows an example state machine as an automaton to illustrate the states of the automaton.

Figure 13:
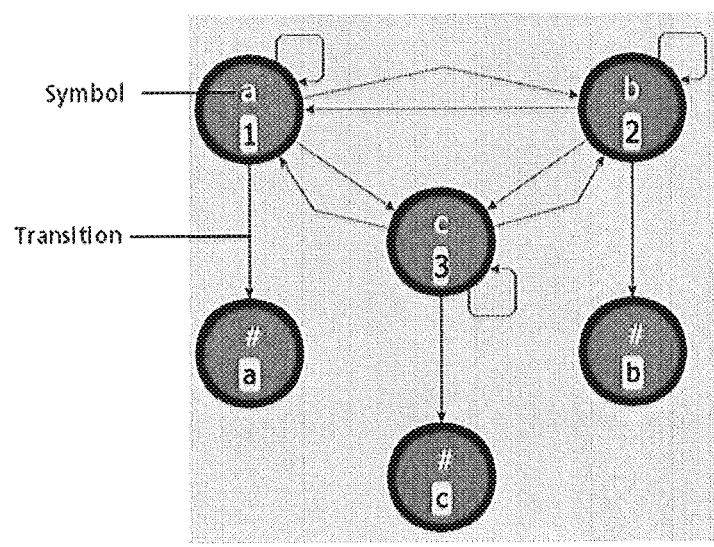
FIG. 13 illustrates an example of symbol assignments to state transition elements (STEs), according to various embodiments.

This automaton contains six state transition elements (STEs). The STE is the entity that stores the state of the machine. One STE exists for each state. (Note the start state does not have its own STE; start and final states are defined differently in automata and are explained in more detail later.) STEs can be programmed to recognize specific symbols and connected to each other by transitions, which denote activation connections and transition paths. As illustrated in FIG. 13, symbol assignments have been made to the STEs and transitions have been added to the automaton.

Figure 14:
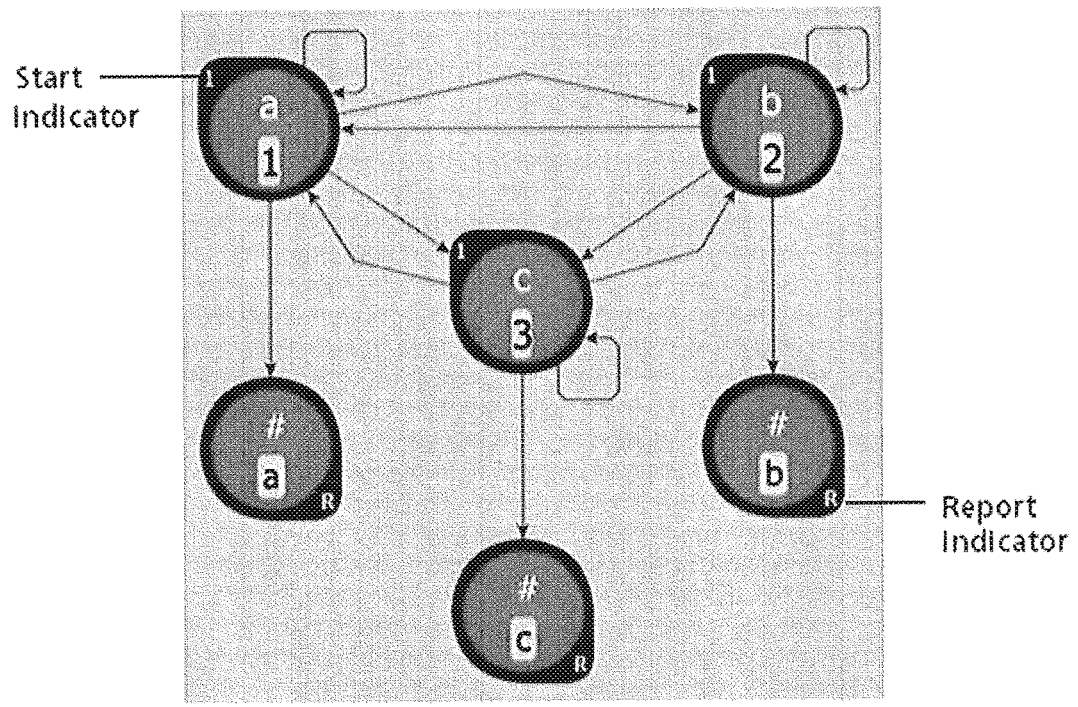
FIG. 14 illustrates an example of symbol assignments to STEs with start and final indicators, according to various embodiments.

The transitions emanating from a respective STE indicate the nodes that will be activated for processing the next character, if the source STE matches the current input symbol. Automata may not have start and final states in the traditional sense, but they do have equivalent constructs (start and report indicators). When these constructs are added, the automaton appears as follows to indicate these start and final indicators, as illustrated in FIG. 14.

Illustrated STEs 1, 2, and 3 each contain an indicator in the top left corner containing the number 1. Similar to the start state in traditional state machines, this indicates each of these nodes will process the first symbol in the data stream. It is assumed the input sequence will start with either a, b, or c, and one of these three nodes will match the first symbol.

Figure 15:
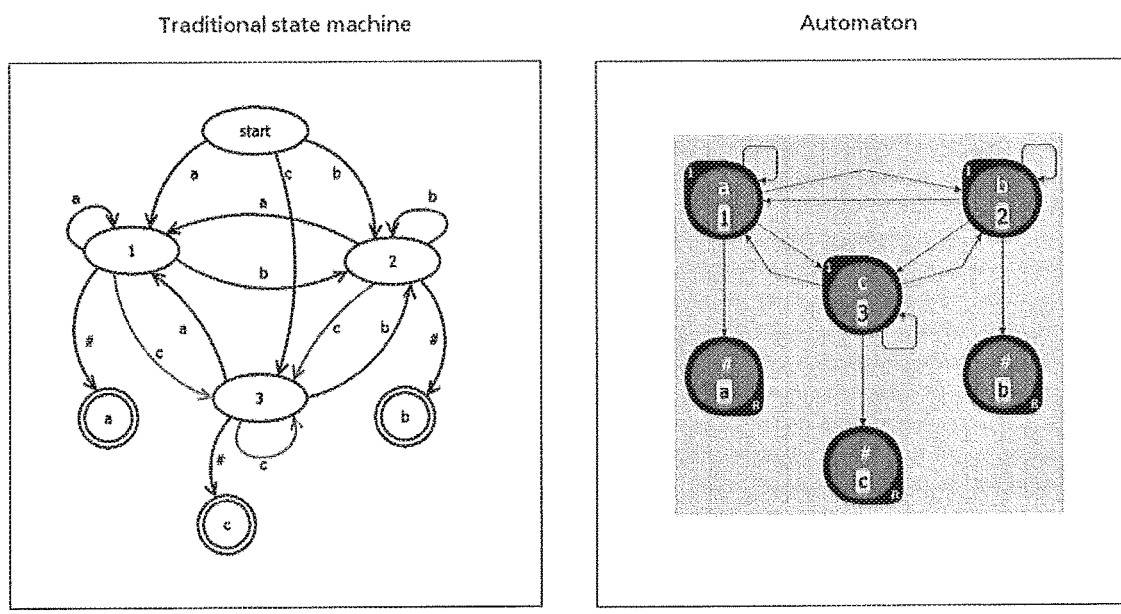
FIG. 15 illustrates a state machine and an automaton network, according to various embodiments.

Likewise, STEs a, b, and c each contain an indicator in their lower right corner with the character R. This is the report indicator (similar to the final state in a traditional state machine). When one of these nodes matches a symbol in the input, the node will generate a report event. This report event will contain the identifier of the node that generated it. Given the identifier from the report event, one can determine which symbol was at the end of the sequence of symbols. As such, traditional state machines and the present automaton networks may be compared and contrasted as set forth in FIG. 15 and Table 1 below:

TABLE 1

State Machine Functions vs. Automata Functions

| Traditional State Machine | Automata |
| --- | --- |
| State | State transition element (STE) |
| Start states | STE start indicators |
| Transitions | Activation connections and STE recognition symbols |
| Final states | Reporting elements |

A regular expression (regex) is a string of characters that defines a text search pattern. For example, the following regex searches for the characters 123 with an optional abc or xyz occurring between 1 and 2: /1(abc|xyz)?23/

Figure 16:
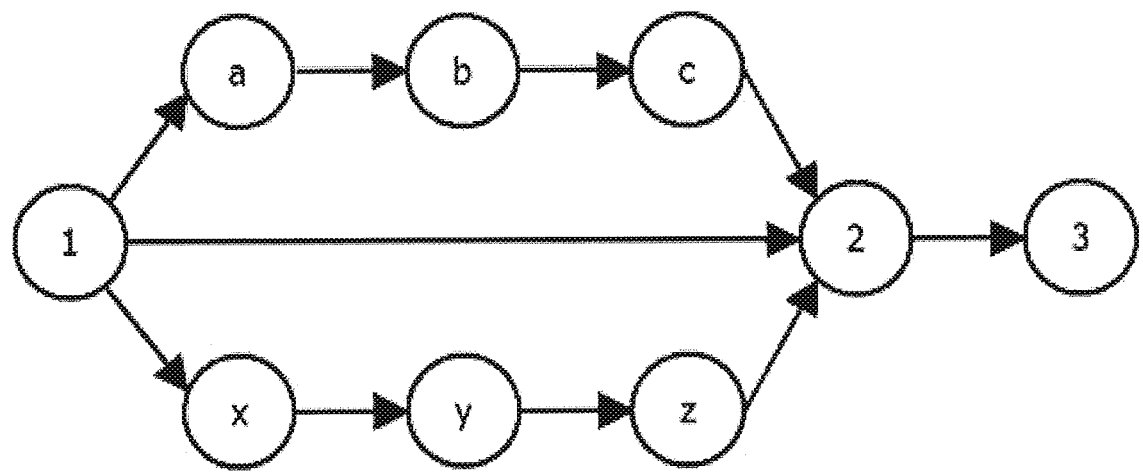
FIG. 16 illustrates a regular expression (regex) converted into a graph, according to various embodiments.
Figure 17:
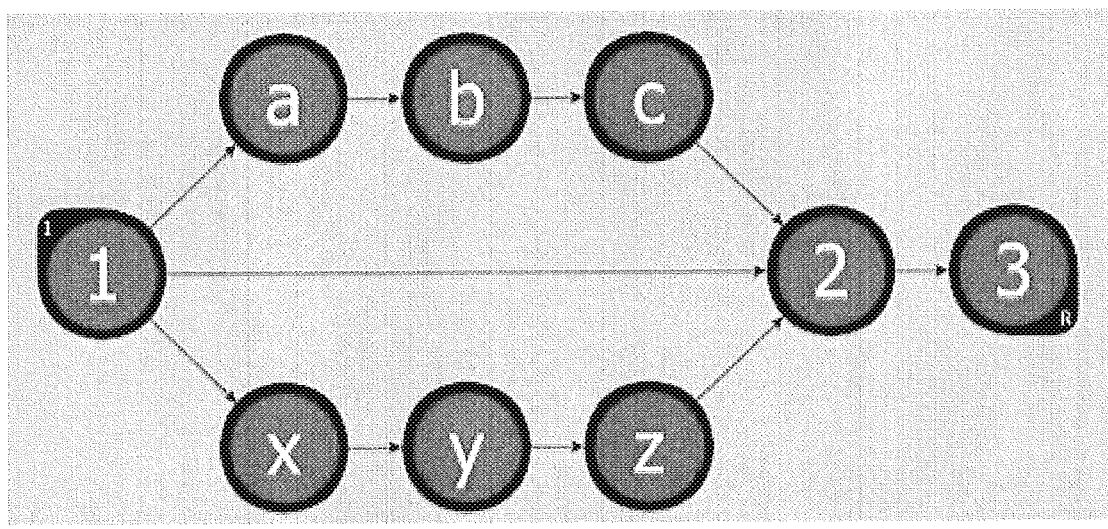
FIG. 17 illustrates an example of an automaton implementation of the regex of FIG. 16, according to various embodiments.

The strings 1abc23, 1xyz23, and 123 would all match this regex. FIG. 16 shows an example of this regex converted into a graph with nodes representing the characters and arrows representing the paths for finding a matching text string:

Similarly, in the context of automata computing, nodes detect specific characters and arrows show paths. Accordingly, FIG. 17 is an example of an automaton implementation of the example regex (e.g., the example regex as an automaton).

As discussed earlier, a state in an automaton can be defined by the STE. Each STE can be programmed to accept a specific set of symbols, and the STEs can be chained together with transition arrows which represent activation connections. In the above illustration, the STE with the 1 indicator is active on the very first input processing cycle. This is analogous to the start anchor (^) in regex. The STE with the indicator R means the STE will generate a report event if it matches the input symbol during the cycle in which it is active. This is analogous to the string matching the regular expression. Table 2 includes examples of regex functions with their similar automata functions (e.g., regex functions vs. automata functions).

TABLE 2

Regex Functions vs. Automata Functions

| Regex | Automata |
| --- | --- |
| Characters/character classes | STEs programmed with characters/character classes |
| Beginning anchor | STE start-of-data attribute |
| Unanchored expressions | STE all-input attribute |
| Tail anchor | End-of-data (EOD) signal |
| Repetitions | Loopback connections, possibly with counters |
| Match-any-character (.) | Match-any-character (*) |
| Quantifiers | Can be implemented with repeated STE chains or counters |
| Modifiers | Certain modifiers are supported |
| Match | Reporting element |

Figure 18:
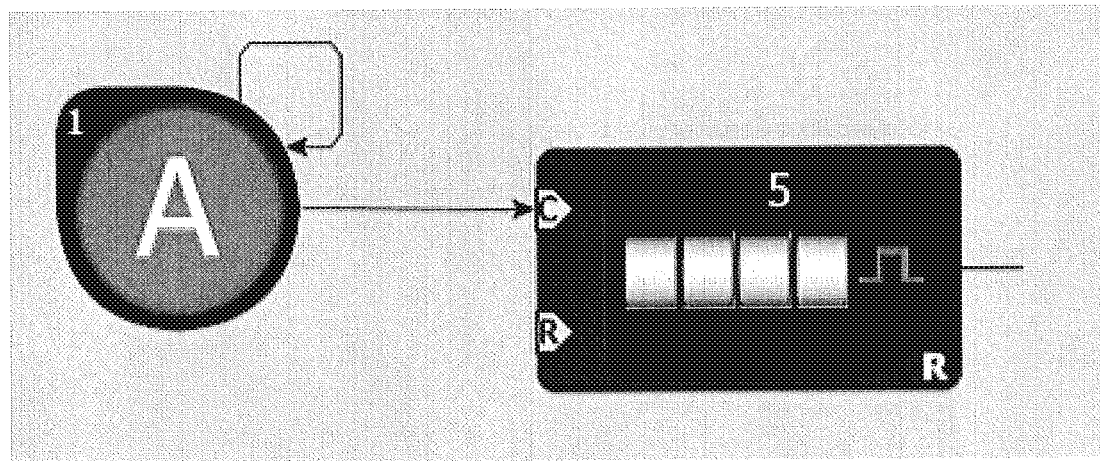
FIG. 18 illustrates an example of an automaton that will generate a report event if the input begins with five A symbols, according to various embodiments.

Automata can be more advanced than state machines and regular expressions because they contain additional elements: counters and Booleans. A counter element can increment once on every cycle in which it is active. A target value can be assigned to a counter, and after the counter has reached this value, it can generate an activation signal to downstream elements, generate a report event, or both. For example, FIG. 18 shows an example of an automaton that will generate a report event if the input begins with five A symbols (e.g., an illustration inclusive of a counter element).

Figure 19:
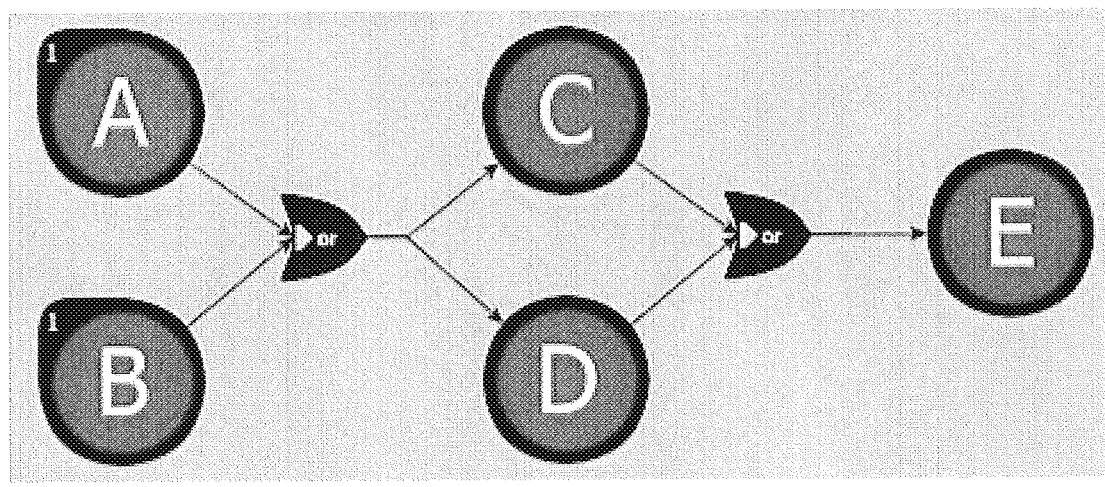
FIG. 19 illustrates Boolean elements and their operations, according to various embodiments.

A Boolean element enables the creation of logical constructs. For example, FIG. 19 provides an example of an automaton that looks for either an A or a B in the first symbol position, followed by either a C or a D in the second symbol position, followed by an E in the third symbol position (e.g., the illustration below shows Boolean elements and their operations).

The inclusion of a counter and a Boolean element can simplify the programming task substantially. Automata can also be non-deterministic, meaning multiple states can be active simultaneously. For example, the current posture in many academic institutions is that non-deterministic finite automata (NFAs) should be converted to deterministic finite automata (DFAs), and then the DFAs can be implemented in whatever medium the designer is using. This NFA-to-DFA conversion, however, can suffer from state-space explosion where an exponential number of states and transitions are required to represent all of the state and transition possibilities expressed compactly in the NFA. By natively supporting NFA implementations, Automata Processor designs do not suffer from this state-space explosion issue.

Figure 20:
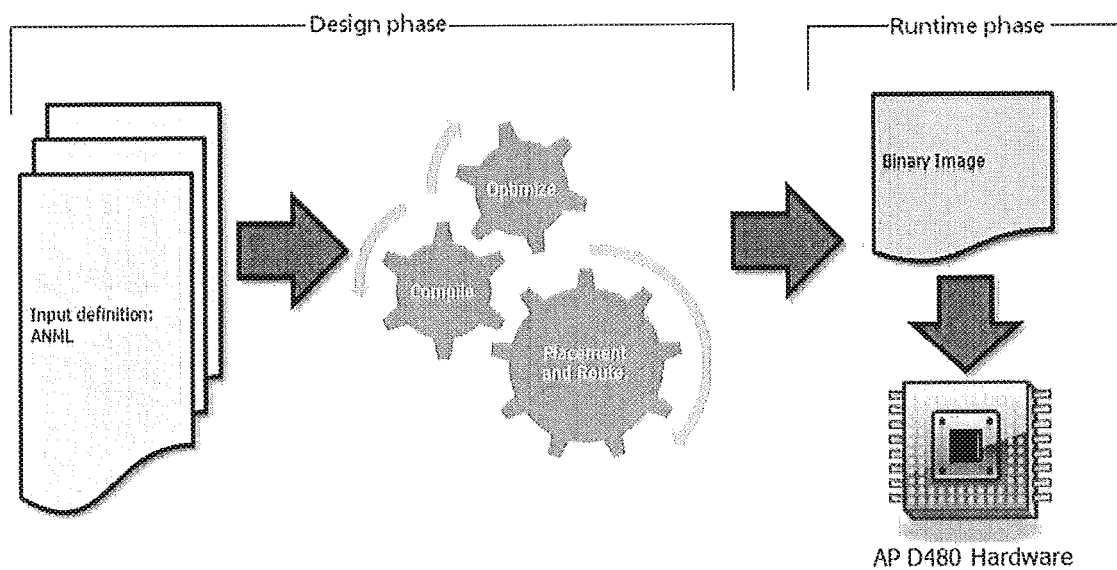
FIG. 20 illustrates a design and a runtime phase for creating and implementing automata network designs in hardware, according to various embodiments.

ANML and Micron's Automata Processor allow for creating and implementing automata network designs in hardware. This process can be accomplished in two phases: design and runtime. FIG. 20 provides an example of a visual representation of the compilation of automata networks. Similarly, Table 3 provides an example of phases for creating and implementing automata networks.

TABLE 3

Phases for Creating and Implementing Automata Networks

| Phase | Process | Tool |
|---|---|---|
| Design | 1. Construct the network | ANML (using the AP Workbench) |
|  | 2. Simulate and debug | AP Workbench |
|  | 3. Compile | AP SDK |
| Runtime | 4. Load the hardware | AP SDK |
|  | 5. Run the design | AP SDK |

Design Phase

The first step in creating an automata network can be to design and construct the automata. This design and construction can be done with Micron's Automata Processor (AP) Workbench. Other design methodologies can also be used (for example, you can create a design from a set of regular expressions or by writing ANML directly).

After the automata is constructed, the next step can be to simulate and debug the design. The AP Workbench contains a simulator where input streams can be created and run against automata designs. The simulator has the ability to single-step forward and backward, and shows which nodes are active and which are not. It also displays report events and the processing cycles at which the report events would be generated. A next step of compilation may then be undertaken.

The compilation process takes an automata network and maps it into an abstracted version of the hardware, identifying the hardware resources needed and the routing lines required for connecting these resources to each other given the finite resources contained within the Automata Processor. The output of the compiler is a binary file that can be used to program an Automata Processor.

Runtime Phase

To begin the runtime phase, the hardware may be loaded. For example, after the binary file is complied, the file can be loaded into the Automata Processor using the AP Workbench. (Multiple compiled designs can be loaded onto an Automata Processor if there is capacity to do so. All of the designs will run in parallel on the same input data.)

After the binary file is loaded, the next step is to run the design. The run phase can be divided, for example, into two steps: a) provide input and b) read and analyze results. During the providing of input, data is presented to the Automata Processor. This can be done using DDR3 writes to specific addresses in the address range on the Automata Processor. Input data can be buffered in the device, as the Automata Processor processing time might be slower than the DDR3 write speed. Data can be processed in the Automata Processor input buffer. Report events may or may not be generated while data processing occurs (e.g., depending on whether the input data stimulates the automata to a reporting state). Assuming report events are generated, these report events can be collected into an output buffer within the Automata Processor. This leads to the reading and analyzing of results.

The Automata Processor can generate an interrupt when a report event is created. The host system can also poll the processor by reading the device status register. When the host is ready, it can read the report events output buffer by issuing DDR3 read commands to a specific address in the Automata Processor address range. The following tools are available for designing, programming, and implementing automata networks within the silicon circuits in an Automata Processor:

Automata Network Markup Language

The Automata Network Markup Language (ANML) is a custom language for describing automata networks. As an XML-based language, any XML or text editor can be used to create automata in ANML. Automata can also be constructed programmatically by having those programs generate ANML output. ANML is fully specified by an XML schema definition (XSD).

Automata Processor Workbench

Micron's Automata Processor (AP) Workbench is a graphical environment for designing and simulating automata networks. The workbench integrates with other software tools to allow designs to be compiled and checked for design errors. The workbench supports the import and export of designs to and from the ANML language. It also contains a Perl Compatible Regular Expression (PCRE) input mechanism where regular expressions can be converted to visual form and used within an automaton.

Automata Processor SDK

The Automata Processor (AP) SDK contains the following applications for programming and operating D480 hardware, AP compile, AP emulate, and AP admin. AP compile may be a command line tool used to compile designs into binary form. The tool supports compilation of ANML files. It also supports compilation of PCRE expressions into either binary form or ANML form. Various command line switches can be used to guide the specific operations of the tool.

The AP emulate may be a hardware simulator that takes a compiled automaton and a string of input data and runs the input data through the compiled automaton. Report events are generated as output from the simulator. This simulator is independent of the simulator provided with the AP Workbench. Furthermore, the AP admin may be a utility that performs various administrative tasks on a compiled automaton. For example, it can list the properties of the compiled automaton, or it can extract a subgraph of the automaton.

As previously noted, ANML is an XML language for describing the composition of automata networks. Accordingly, ANML contains elements that represent automata processing resources. Using ANML, a software programmer can explicitly describe how these automata processing resources are connected together to create an automata network by configuring the elements, configuring the connections, and providing input and allowing the automata network to compute. ANML contains three foundational elements and two container elements. Connections are made among these elements to create an automata network. The foundational elements are state transition elements, counter elements, and Boolean elements. The container elements are automata network elements and macro elements. The automata network element is a top-level element that houses the complete design.

The foundational elements can be created within the top-level automata network element or a macro. These elements can receive activation signals from each other and can generate activation signals to downstream elements. The way in which these elements are configured and connected defines the task an automata network is programmed to perform. In other words, programming an automaton can refer to placing, configuring, and connecting these basic elements (and macros) to each other.

The macro element can contain any number of foundational elements as well as other macro elements. Macros have input and output connections so they can be connected to other macros or to sibling foundational elements. Macros can be compared to functions in a traditional programming language; they encapsulate a certain set of predefined behavior and can be used to modularize a design.

An automata network receives data on an input data stream, and the automata network responds to this input by either activating an STE or by reporting an event. Input data can be delivered to an automata network one byte at a time. Elements process the current input symbol. The time that elapses between the receipt of one symbol and the receipt of the next symbol is defined as one symbol cycle.

Elements in an automata network can be programmed to generate report events. These events indicate something of consequence has been detected in the input data stream. When an STE generates a report, an ANML device records the STE that caused the report as well as the current position in the input buffer in the match buffer. This effectively provides a pointer to the sequence of symbols matched by an automaton at the last position of the match. It can be useful to the application to have this pointer at various points within the automaton, not just at an STE in the automaton.

Figure 21:
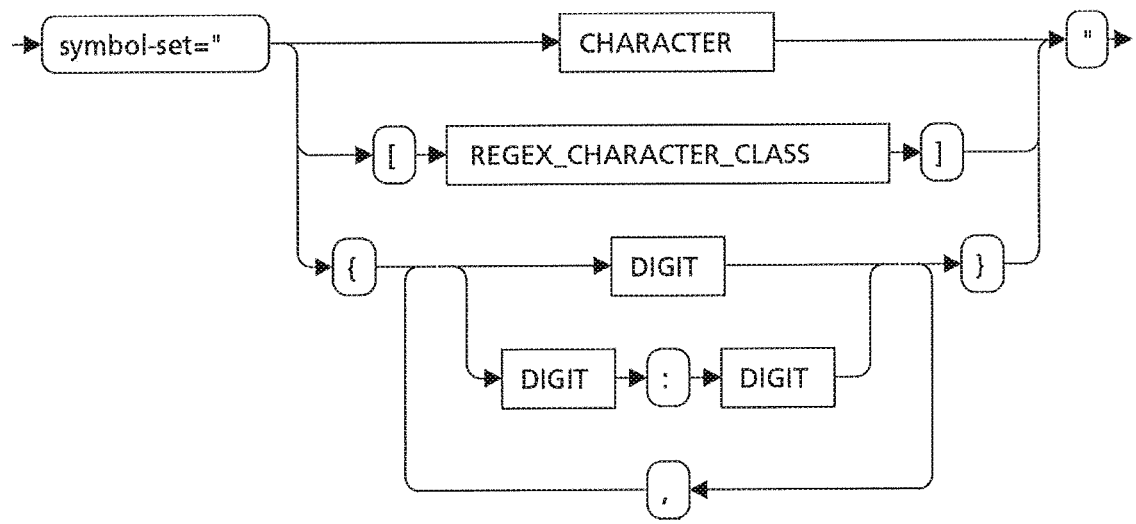
FIG. 21 illustrates an ANML syntax as represented by a railroad diagram, according to various embodiments.
Figure 22:
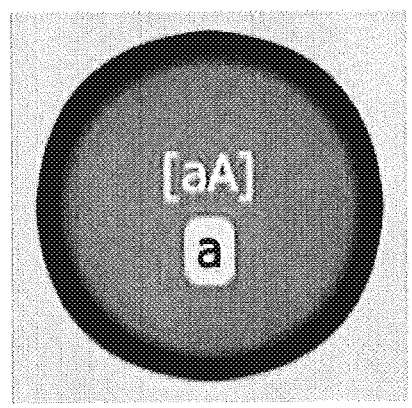
FIG. 22 illustrates the ANML syntax of FIG. 21 as constructed in Automata Processor (AP) Workbench, according to various embodiments.

This following description illustrates an example of ANML syntax in both text and graphical form. ANML syntax may be represented by a railroad diagram (FIG. 21), plain code (which can be written in an XML or text editor), and the same ANML code as constructed in Micron's Automata Processor (AP) Workbench (FIG. 22), respectively.

```
<state-transition-element id="a" symbol-set="[aA]">
</ state-transition-element>
```

Figure 23:
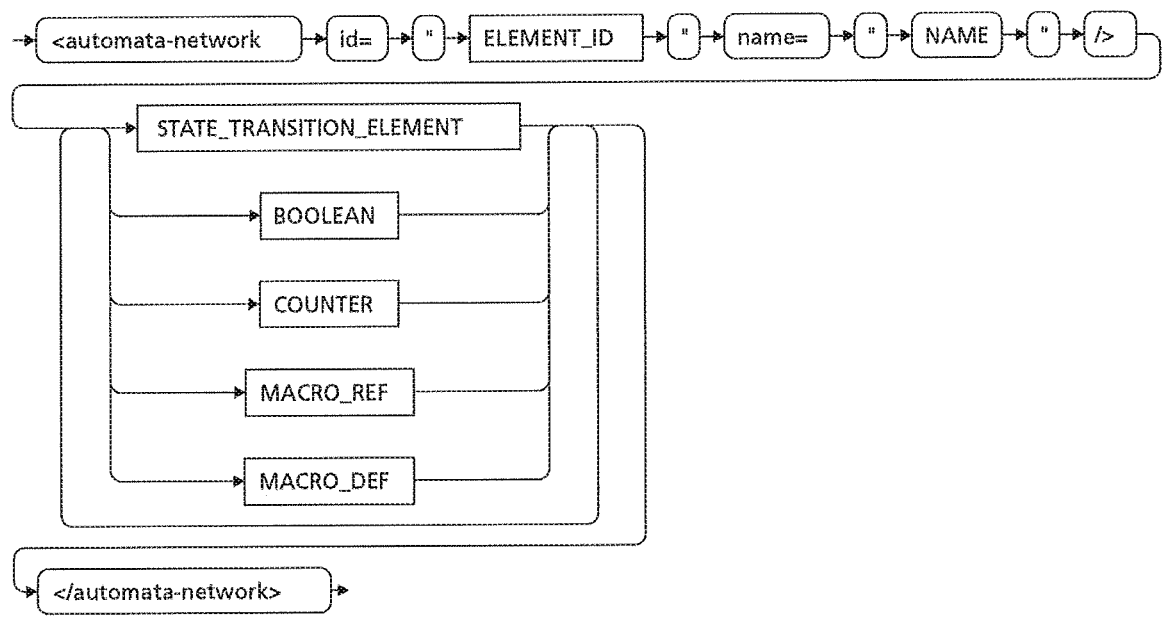
FIG. 23 illustrates an example of an automata network element, according to various embodiments.

The automata network element can be the root element (top-level namespace) for an ANML network description. It contains one or more automatons composed of foundational elements or macros. An automata network can be comprised of three attributes: a) an id, b) a name, and c) at least one at least one foundational element (state transition element, Boolean element, or counter) or macro (macro reference or macro definition). In an exemplary embodiment, every element and top-level macro nested inside an automata network should have a unique ID. FIG. 23 shows an example of an automata network element:

The ID attribute is a user-defined unique identifier (name) for the automata network. The ID attribute can start with a character and contain other characters, digits, or underscore symbols. The name attribute is a user-defined name (label) for identifying the automata network. The foundational element(s) or macro(s) comprise the automata network.

The state transition element (STE) can be the resource that stores the state of the automaton. It can be also the symbol recognition element and, in at least some embodiments, the sole device capable of receiving an input symbol. An STE can be comprised of, for example, two required attributes and three optional attributes. It may also generate, for example, two types of output. The required attributes may be: a) an id and b) a symbol set. The optional attributes may be: a) start, b) case, and c) latch. The optional outputs may be an activate-on-match (activation signals to other nodes) and a report-on-match (report generation).

An STE can be either active or inactive. An active STE will respond to the current input symbol. If the input symbol matches the STE's programmed symbol set, the STE according to this example will generate outputs: activate-on-match (activate any STEs to which it is connected, possibly including itself) or report-on-match (generate a report). Activated STEs will be active for the next input symbol cycle. This process of matching and activating downstream STEs repeats for each additional input symbol.

Figure 24:
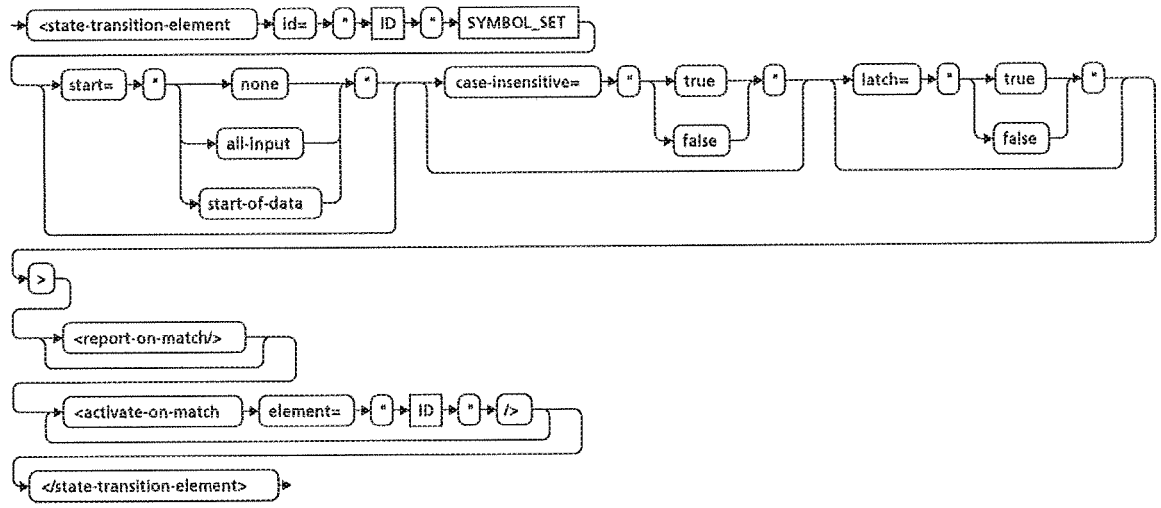
FIG. 24 illustrates an example of a syntax of an STE, according to various embodiments.
Figure 25:
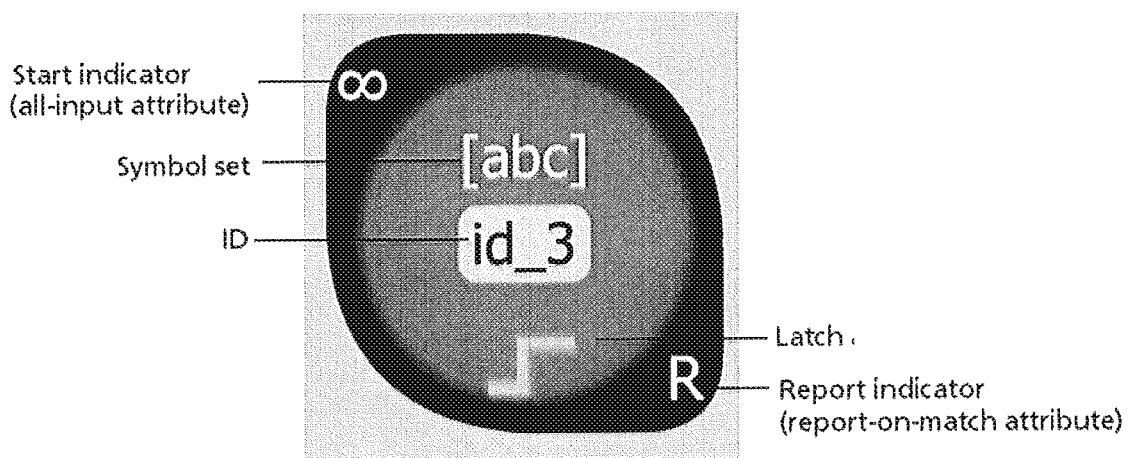
FIG. 25 illustrates an example of the syntax of FIG. 24 as constructed in the AP Workbench, according to various embodiments.
Figure 26:
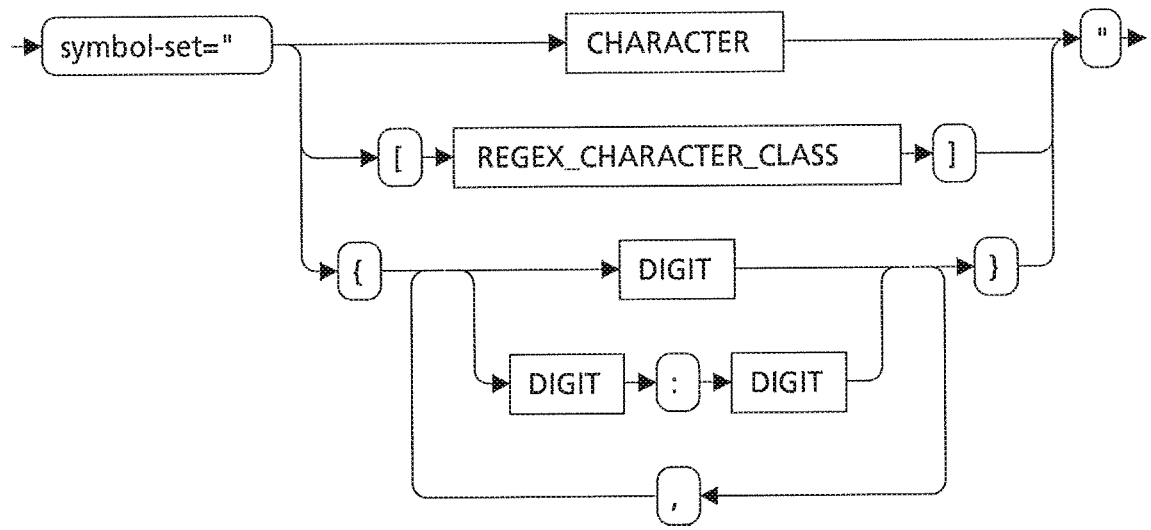
FIG. 26 illustrates an example of a symbol set attribute, according to various embodiments.

It is possible for an automaton to die out if it reaches the end of a chain of STEs and there are no further activation connections. It may also die out if an STE does not match the input symbol on a symbol cycle. FIGS. 24 and 25 show examples of the syntax of an STE and an STE as constructed in the AP Workbench, respectively:

The ID attribute of a STE can be a user-defined unique identifier (name) for the STE. According to at least one embodiment, the ID attribute should start with a character, but can then contain other characters, digits, or underscore symbols. The symbol set attribute of the STE can define the symbol(s) the STE is programmed to match. The symbol set attribute can be defined using one of three methods: as a single character, a regex character class, or as a numerical class (digit). FIG. 26 shows an example of a symbol set attribute:

The single character method programs an STE to recognize a single 8-bit character. The character is entered without any additional markup. The character can be specified in decimal or hexadecimal notation. For hexadecimal notation, include a leading \x followed by two hexadecimal digits. For example:

A

\x41

The single character method is based on a subset of admissible characters in Perl Compatible Regular Expression (PCRE). Most characters stand for themselves in a pattern and will match the corresponding input character. For example, a will match the ASCII byte value for the lower case letter a.

The single character method supports pattern meta-characters; these pattern meta-characters are not interpreted as literal characters. The single character method also supports the use of an asterisk (*) as a meta-character representing any character including a new line. An STE can be made case-insensitive. The regex character class is based on a subset of the PCRE character classes. A set of square brackets encloses a regex character class specification; for example:

[ABC]

Ranges are specified with a dash and operate in ASCII collating sequence. Ranges can be used for characters specified numerically, for example [\000-\037]. Additional formatting includes:

[A-Z] represents any uppercase letter in the range A through Z

[^A] represents anything other than the letter A

[ABCDE] is any of the letters A,B,C,D,E (no other characters)

[0-9A-Fa-f] represents any single hexadecimal digit

Regex character classes, unlike PCRE, cannot be set for case-insensitivity. If case-insensitivity is desired, both the lower and upper case ranges should be specified. If a closing square bracket is required as a member of the class, it should be the first data character in the class (after an initial circumflex, if present) or escaped with a backslash. If a minus character is required in a class, it should be escaped with a backslash or appear in a position where it cannot be interpreted as indicating a range, typically as the first or last character in the class.

In at least one embodiment, it is not possible to have the literal character "]" as the end character of a range. A pattern such as [W-]46] is interpreted as a class of two characters ("W" and "-") followed by a literal string "46]", so it would match "W46]" or "-46]". However, if the "]" is escaped with a backslash it is interpreted as the end of range; therefore, [W-\]46] is interpreted as a single class containing a range followed by two separate characters. The octal or hexadecimal representation of "]" can also be used to end a range.

The character types \d, \D, \s, \S, \w, and \W may also appear in a character class and add the characters that they match to the class. For example, [\dABCDEF] matches any hexadecimal digit. A circumflex can conveniently be used with the upper-case character types to specify a more restricted set of characters than the matching lowercase type. For example, the class [^\W_] matches any letter or digit, but not underscore. All non-alphanumeric characters other than \, -, ^ (at the start) and the terminating] are non-special in character classes, but it does no harm if they are escaped. The pattern terminator is always special and should be escaped when used within an expression.

The numerical class specifies a bit-level pattern. This method is unique to ANML and not found in PCRE. This method may be easier to use than the single character or regex character class method for applications that are not character-oriented. Numerical class digits can be specified in decimal form only. A set of curly brackets encloses a numerical class specification; for example:

{3,8,24}

The numerical class can specify multiple digits and ranges of digits. Multiple digits are comma-separated and ranges are specified with a colon. For example, the following pattern specifies 0 to 9 and 250 to 255 as well as positions 20 and 40. An input byte, after passing through the 8-to-256 decoder that has any of these bits sets, will match the pattern and cause the STE to execute match actions:

{0:9,20,40,250:255}

In the regex character class, this pattern would be specified as:

[\x00-\x09\x14\x28\xFA-\xFF]

Figure 27:
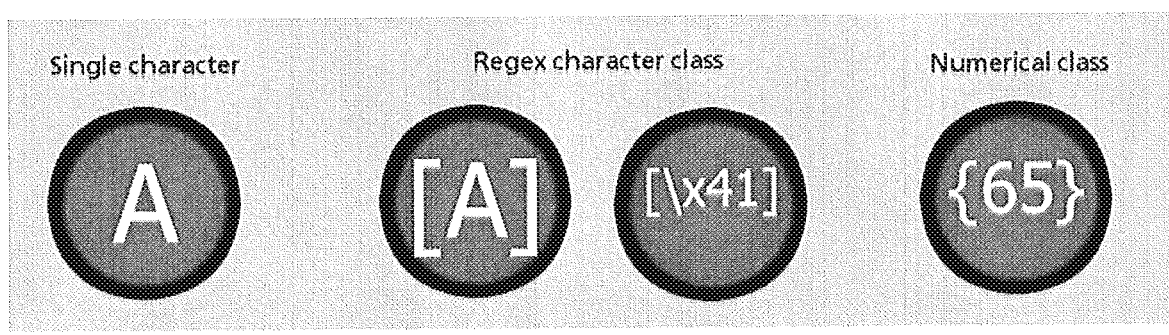
FIG. 27 illustrates an example of programming a single value (A) in the AP Workbench using the three symbol set methods, according to various embodiments.
Figure 28:
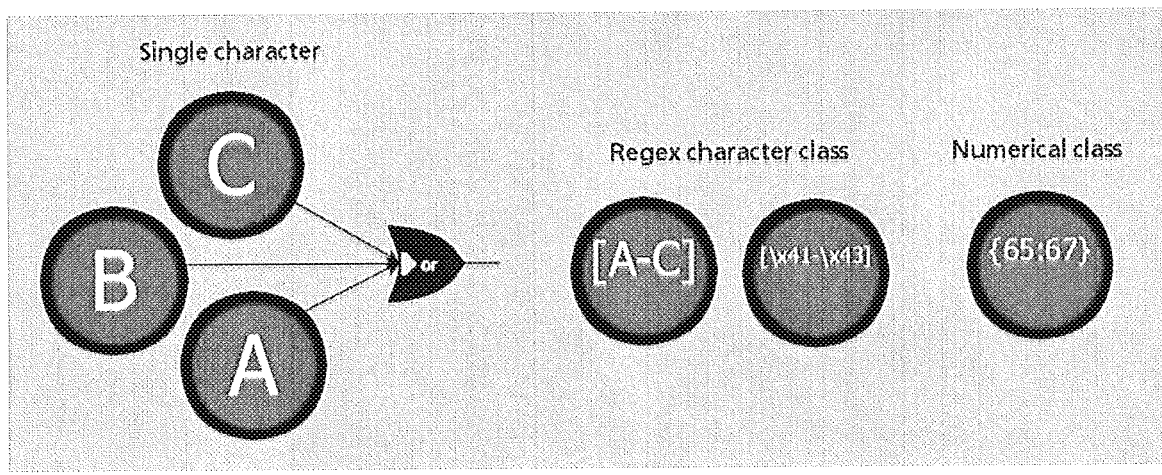
FIG. 28 illustrates an example of programming a range of values (e.g., A-C) with each method of FIG. 27, according to various embodiments.
Figure 29:
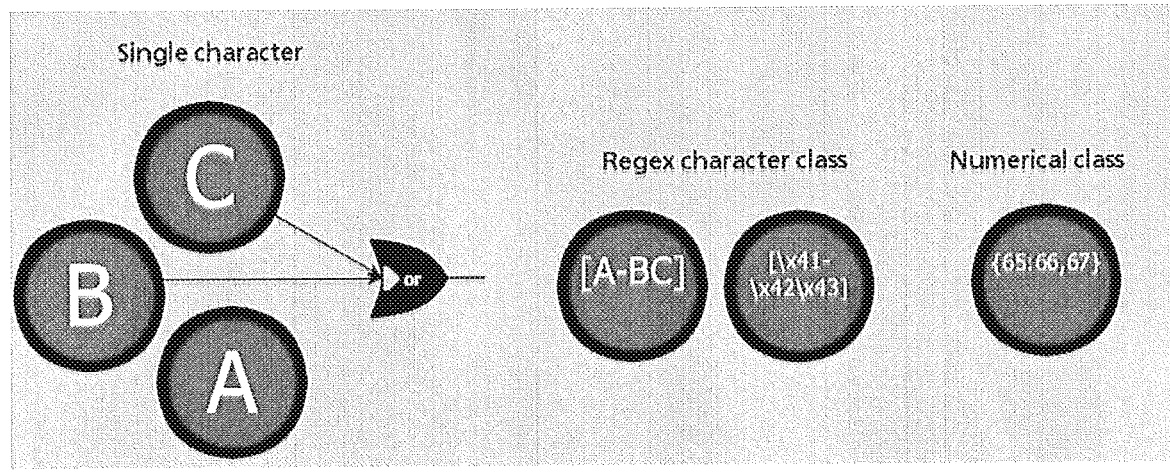
FIG. 29 illustrates an example of programming a mix of ranges and values (e.g., A, B-C) with each method of FIG. 27, according to various embodiments.

The numerical class specifies any combination of bit positions from 0 to max_bit, inclusive, which are set and match-enabled. In an 8-bit byte implementation, max_bit is 255. FIGS. 27-29 show an example of programming a single value (A) in the AP Workbench using the three symbol set methods, an example of programming a range of values (e.g., A-C) with each method, and an example of programming a mix of ranges and values (e.g., A, B-C), respectively.

Figure 30:
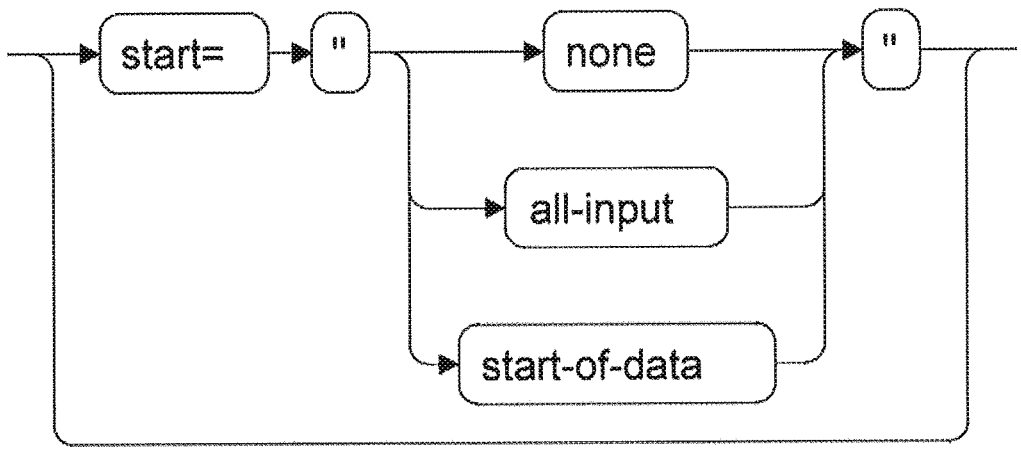
FIG. 30 illustrates a graphical example of a start attribute, according to various embodiments.

The start attribute defines the STE that will be active on either the first symbol cycle or all symbol cycles. The start attribute has three possible settings, a) none, b) start-of-data, and c) all-input. When the start attribute is set to none, the STE is active only when activated by another element in the automata network. When the start attribute is set to start-of-data, the STE is active on the first symbol cycle and only active thereafter if it is activated by another element (possibly itself) in the automata network. In the AP Workbench, start-of-data appears with the 1 indicator in the upper left corner of the STE. When the start attribute is set to all-input, the STE is active on all symbol cycles. In the AP Workbench, all-input appears with the infinity symbol (∞) indicator in the upper left corner of the STE. If not specified, a default setting (e.g., none) may be used. FIG. 30 shows a graphical example of the start attribute.

The case attribute is a shorthand method for specifying an STE's matching as case-insensitive. This setting only affects the characters a-z and A-Z. Other match symbols are unaffected. For example, an STE with symbol set=[AB*?] and case-insensitive=true will match any of these symbols:

*, a, A, b, B, ?

Figure 31:
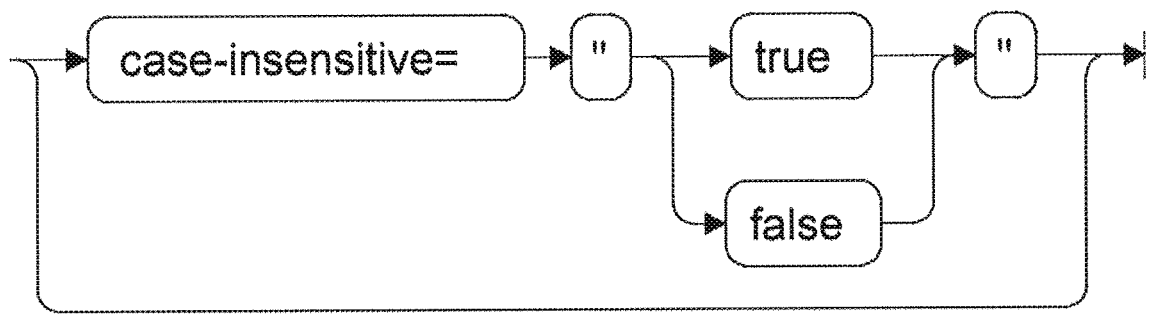
FIG. 31 illustrates a graphical example of a case attribute, according to various embodiments.

The default behavior is false (STE is case-sensitive). FIG. 31 shows a graphical example of a case attribute.

Figure 32:
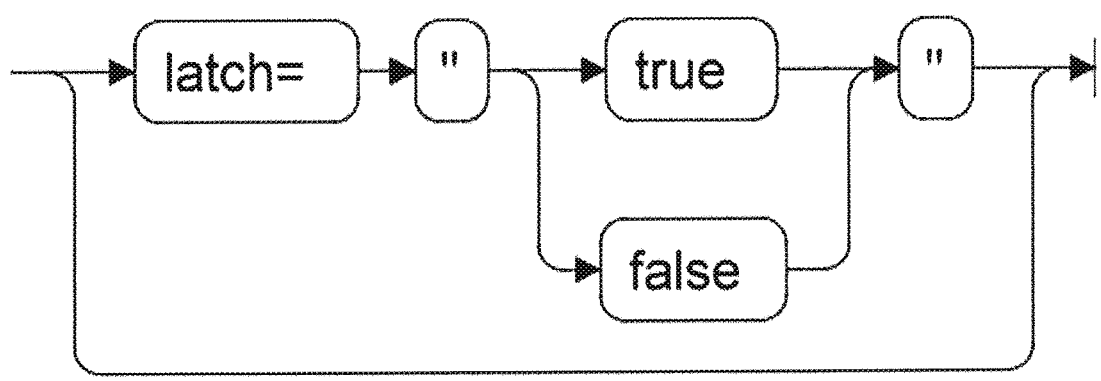
FIG. 32 illustrates a graphical example of a latch attribute, according to various embodiments.

If an STE has the latch attribute enabled, the STE will continue to drive its outputs after it has matched against a symbol in the input data stream, including if the STE has report-on-match enabled (the STE will continue to generate reports on all subsequent symbol cycles). A latched STE will also continue to drive activation signals to any other automata network elements to which it is connected. The default behavior is false. FIG. 32 shows a graphical example of a latch attribute.

Figure 33:
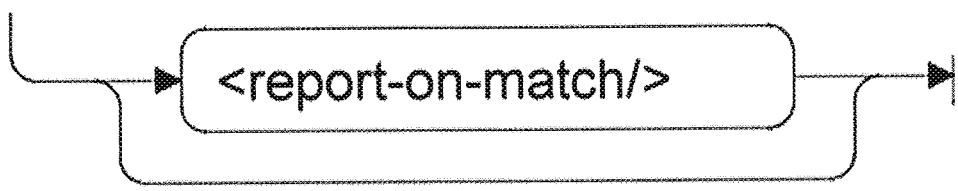
FIG. 33 illustrates a graphical example of a report-on-match output, according to various embodiments.

The report-on-match output causes the STE to generate a report event if the current input symbol matches the STE's symbol set. If the STE also has the latch attribute turned on, the STE will continue to generate report events on all subsequent symbol cycles. Because the report-on-match output is a characteristic of the STE, there will only be a single indicator to represent this; therefore, an STE will have either a report-on-match or it will not. This is in contrast to activate-on-match, where an STE can have any number of activate-on-match outputs. The report-on-match output should precede any activate-on-match outputs. FIG. 33 shows a graphical example of a report-on-match output.

Any STE can generate an output report and any number of STEs can be enabled for reporting. A hardware device implementing ANML may have restrictions either in the total number or distribution of report-enabled STEs; however, these potential restrictions are not an intrinsic part of ANML. At least one embodiment of ANML does not support output values either on the transition or associated with the STE. Match report output from the STE is generated on elements designated as report-on-match. However, elements that are not report-output-enabled do not generate report output. In a very limited sense it is possible to view the operation of an ANML machine as a finite transducer with a capability of outputting either no report output signal on a given clock cycle or a report output signal if the STEs are configured as report-on-match.

ANML chip implementations may limit the number of report-output-enabled elements because of routing constraints, and there may be other practical limitations that would prevent one from making much use of the finite transducer, even as a finite transducer with the limitation of having essentially just a binary output value. The activate-on-match output indicates which other automata network entities are activated if the current input symbol matches the STE's symbol set, creating activation connections (transitions) from this STE to other elements in the automata network. Activation means the STE will accept the next input symbol and take whatever action is specified when the symbol matches the symbol set. An activation by another STE is only enabled for the next symbol cycle; if no subsequent activation of the STE occurs, it will be deactivated after processing the current input symbol.

Figure 34:
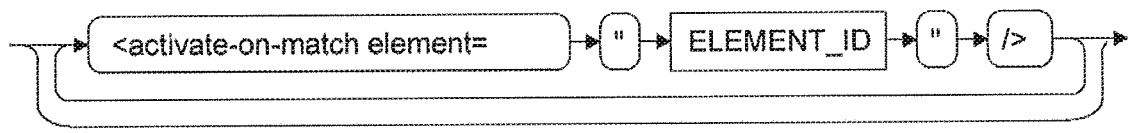
FIG. 34 illustrates a graphical example of an activate-on match output, according to various embodiments.

The containing STE is the source or causative element, and the element that is activated on the next input cycle is identified by the value of the element attribute in the activate-on-match element. FIG. 34 shows a graphical example of an activate-on match output.

According to at least one embodiment, ANML transitions are specified only in the source element; an element declares what elements it activates on a match but it does not know what elements can activate it. In classic finite state automata, the match value is associated with the transition; however, in at least one embodiment of ANML, transitions are unmarked as they are more properly activations which occur on the match event in the source element. An STE can drive activation connections to any number of other elements in the network. However, when it comes to hardware, there is a finite limit to the routing capacity and the number of elements available within a chip. For these reasons, it is usually recommended that a designer be somewhat conservative in how many activation connections come from any single STE in the automata network. There may be cases where a designer will want to use redundant resources within a network to accommodate high fanout activation connections, or there may be instances where resources are used to combine multiple activation signals into a single activation signal.

Figure 35:
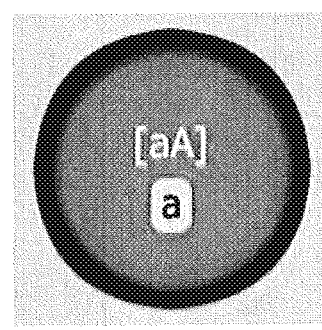
FIG. 35 illustrates ANML syntax as constructed in AP Workbench, according to various embodiments.

This section provides examples of simple automata built with STEs. A basic STE for a state labeled "a" with a transition function on the input of either a or A may be graphically represented via ANML syntax in both text and graphical form. The illustration below show examples of ANML syntax as plain code (which can be written in an XML or text editor), and as constructed in Micron's Automata Processor (AP) Workbench in FIG. 35, respectively:

```
<state-transition-element id="a" symbol-set="[aA]">
</state-transition-element>
```

Figure 36:
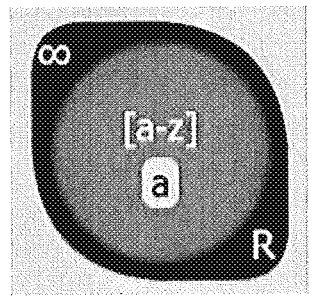
FIG. 36 illustrates an input/output automaton for a state labeled "a", according to various embodiments.

The above illustrated STE receives no input and is not connected to other STEs, and therefore, generates no output. A simple automaton network with input and output (e.g., an input/output automaton) for a state labeled "a" may be illustrated by way of example below (in both text and graphical form in FIG. 36):

```
<state-transition-element id="a" symbol-set="[a-z]" start="all-input">
    <report-on-match/>
</state-transition-element>
```

This above illustrated automaton accepts symbols from the input stream and reports when an input symbol matches the symbol set. The infinity symbol ∞ indicator (all-input attribute) shows the STE is active for all symbol cycles. An all-input STE remains active and receives and tests every input symbol against the symbol set. A difference between ANML and classic finite state automata can be that any ANML STE may be designated as an all-input or start-of-data STE. In the formal definition of finite automata, only a single state may be designated as the start state. Additionally, the R indicator (report-on-match attribute) shows the STE reports when an input symbol matches the symbol set.

Figure 37:
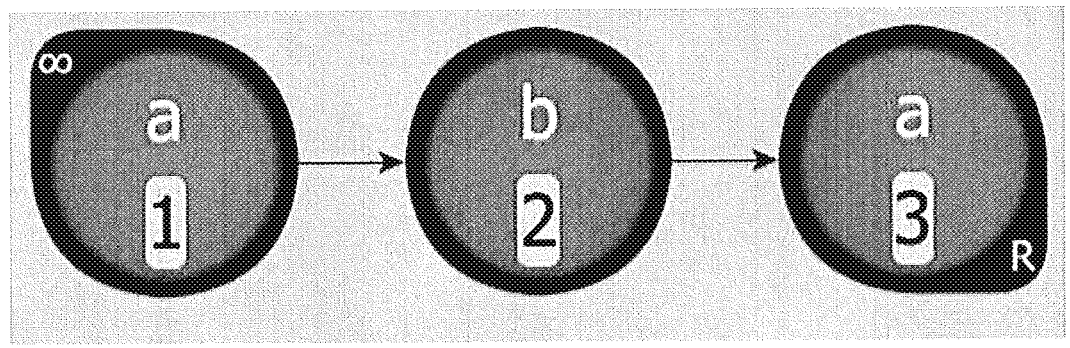
FIG. 37 illustrates a three state automaton, according to various embodiments.

The automaton illustrated by way of example below (in both text and graphical form in FIG. 37) contains three states. It accepts symbols on STE 1 and, on a match, activates STE 2. If STE 2 matches a b, STE 3 will be activated. If, on the next input cycle STE 3 sees an a, the match will be reported because reporting is enabled for this STE.

```
<state-transition-element id="1" symbol-set="a" start="all-input">
    <activate-on-match element="2"/>
</state-transition-element>
<state-transition-element id="2" symbol-set="b">
    <activate-on-match element="3"/>
</state-transition-element>
<state-transition-element id="3" symbol-set="a">
    <report-on-match/>
</state-transition-element>
```

STE 1 is configured to receive all-input so it will be continuously activated. If this automaton were to be presented with the sequence aba, on the final a, the report output signal would be generated by STE 3 and the final a would also be evaluated and matched by STE 1, causing STE 2 to be activated for the next input cycle. If the sequence continued with ba, a second output report would be generated by STE 3.

Figure 38:
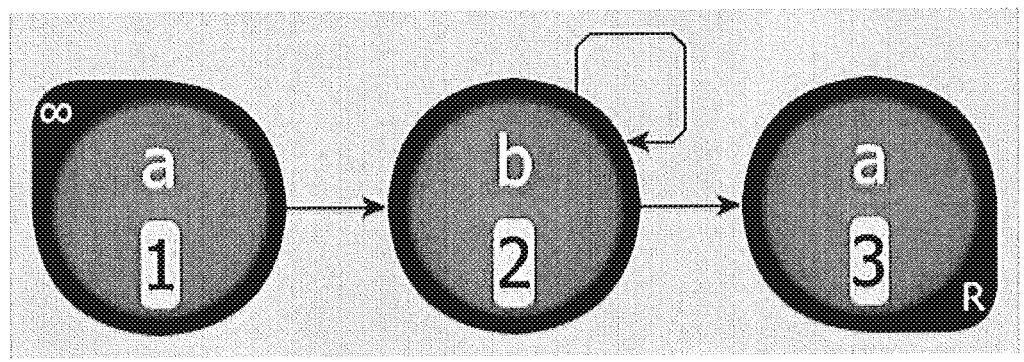
FIG. 38 illustrates a three state automaton with an additional activate-on-match signal that activates itself, according to various embodiments.

The following illustrated example of an automaton (in both text and graphical form in FIG. 38) is identical to the previous example except for an additional activate-on-match signal in STE 2 that activates itself After STE 2 is activated by STE 1, it will continue to remain activated as long as the input symbol is a b. Without the self-activation loop, the previous automaton would only generate an output signal in STE 3 after seeing the sequence aba. This automaton will report output on /ab+a/ where + means one or more (that is, a followed by one or more b followed by a).

```
<state-transition-element id="1" symbol-set="a" start="all-input">
    <activate-on-match element="2"/>
```

-continued

```
    </state-transition-element>
    <state-transition-element id="2" symbol-set="b">
        <activate-on-match element="2"/>
        <activate-on-match element="3"/>
    </state-transition-element>
    <state-transition-element id="3" symbol-set="a">
        <report-on-match/>
    </state-transition-element>
```

Figure 39:
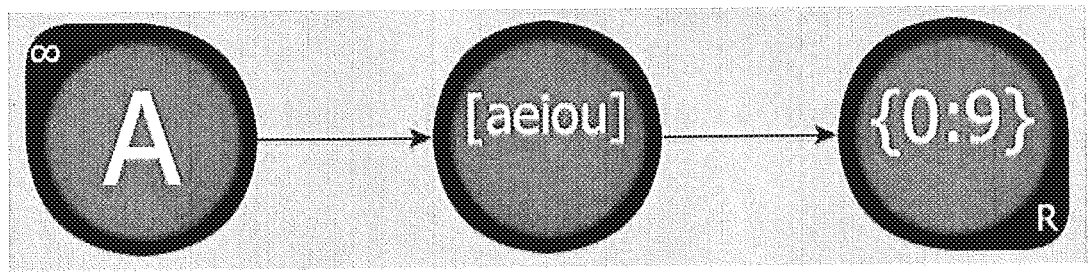
FIG. 39 illustrates another three state automaton, according to various embodiments.

The following illustrated example (in both text and graphical form in FIG. 39) is an automaton that uses the three methods for expressing symbol sets (single character, regex character class, numerical class). The automaton recognizes an input sequence beginning with an uppercase A followed by one of the following lowercase letters: a, e, i, o, u, followed by a symbol with a value between 0 and 9. In this manner, the example is for programming a symbol set.

```
<state-transition-element id="q0" symbol-set="A" start="all-input">
    <activate-on-match automaton="q1"/>
</state-transition-element>
<state-transition-element id="q1" symbol-set="[aeiou]">
    <activate-on-match automaton="q2"/>
</state-transition-element>
<state-transition-element id="q2" symbol-set="{0:9}">
    <report-on-match/>
</state-transition-element>
```

The counter element is a special type of automaton element used to count and, perhaps less commonly, perform control operations and maintain state in automata networks. The counter element can be programmed with a target value and mode of operation that determines the behavior when the count reaches the target. The counter element, according to at least one example embodiment, is comprised of two required attributes, one optional attribute, two outputs, and two input terminals. The required attributes may be an ID and a target. The optional attribute may be an at_target. The optional outputs of the counter element may be a report-on-target output and an activate-on-target output. Additionally, the input terminals may be <ID>:cnt and <ID>:rst (e.g., a count input and a reset input).

Figure 40:
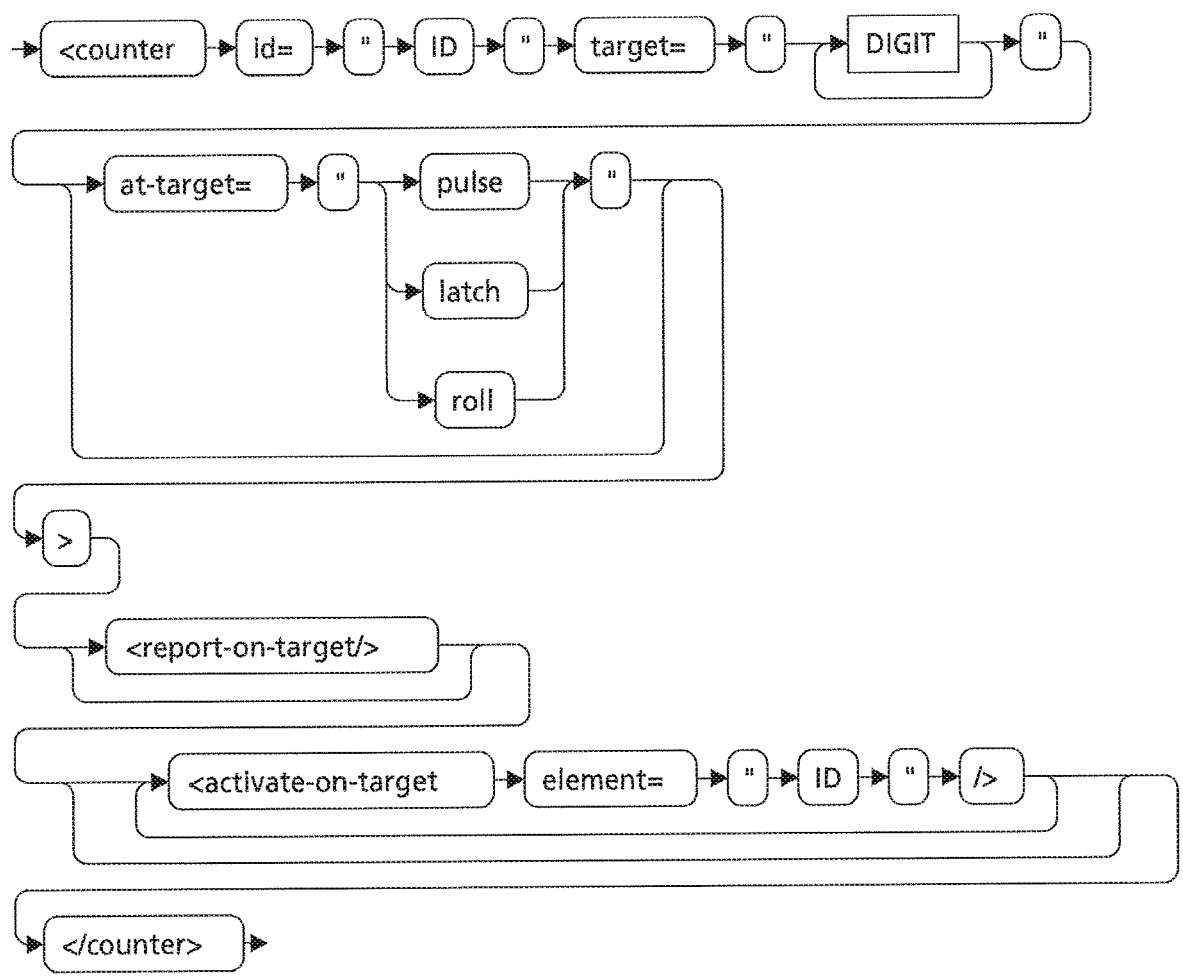
FIG. 40 illustrates an example of the syntax of a counter element, according to various embodiments.
Figure 41:
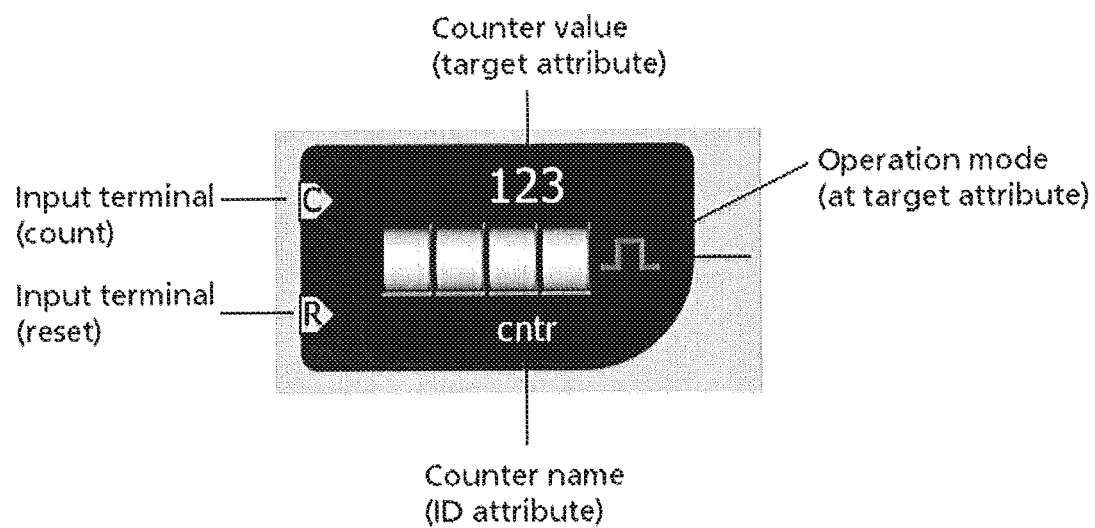
FIG. 41 illustrates an example of a counter element as constructed in the AP Workbench, according to various embodiments.

In an example embodiment, counter elements cannot accept symbols from the input source; therefore, in most circumstances, they will work in conjunction with STEs to perform their operation on the same symbol set as the STEs that activate them. The counter element should be connected to elements driving input. In FIG. 40, an example of the syntax of the counter element and an example of a counter element as constructed in the AP Workbench (in FIG. 41) are shown.

Figure 42:
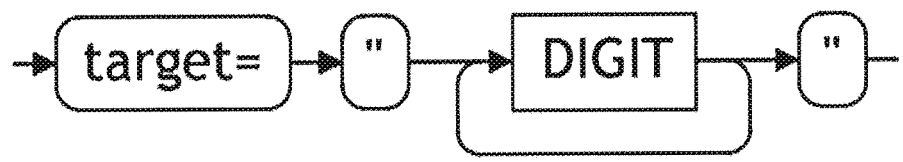
FIG. 42 illustrates an example of syntax of a target attribute, according to various embodiments.

The ID attribute of the counter element can be a user-defined unique identifier (name) for the counter element. The ID should start with a character, but can then contain other characters, digits, or underscore symbols. The target attribute of the counter element can be the target value of the counter. When this value is reached, an activation signal can be raised and the designated action (as defined by the at_target attribute) occurs. According to one or more embodiments, the target attribute should consist of digits only and is typically greater than or equal to 1. The maximum counter value is not defined in ANML; however, for practical purposes, the maximum value should probably be no higher than $2^{48}$. FIG. 42 shows an example of the syntax of the target attribute.

Figure 43:
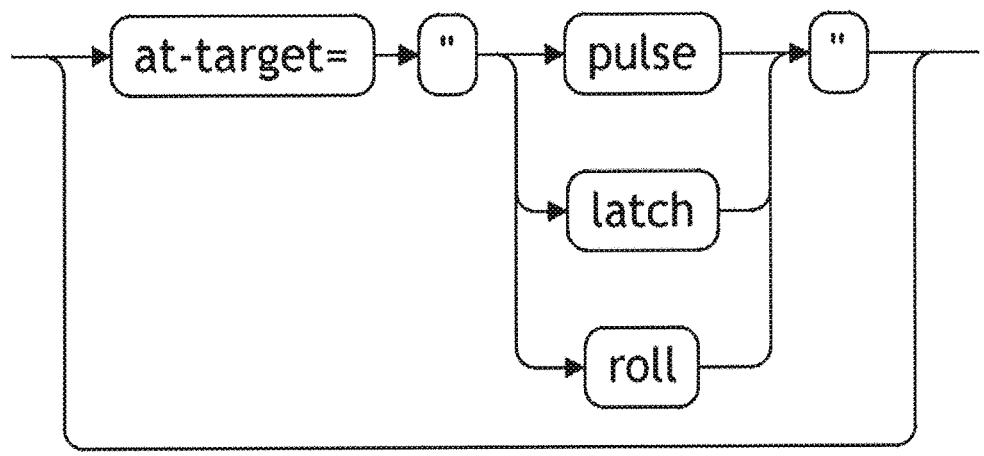
FIG. 43 illustrates an example of a counter having a latch mode, a pulse mode, and a roll mode, according to various embodiments.
Figure 44:
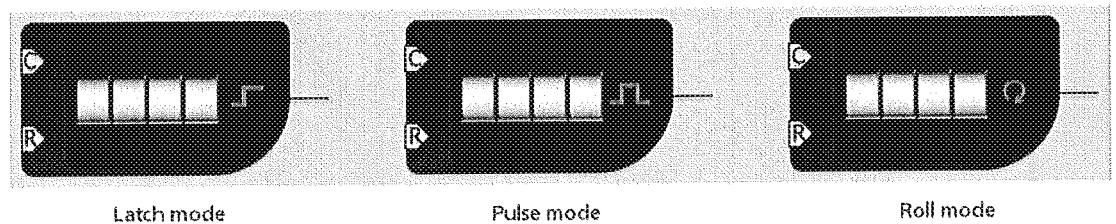
FIG. 44 illustrates an example of a counter having a latch mode, a pulse mode, and a roll mode as constructed in the AP Workbench, according to various embodiments.

The at_target attribute configures the mode of operation for a counter when the target value is reached. If not specified, the default mode (pulse) is used. The modes of operation may include a latch, a pulse, and a roll mode (FIG. 43). In the latch mode, the counter continuously drives its outputs on every subsequent cycle. The counter holds at the target and behaves as if, on each cycle, it has reached the target value. In the AP Workbench, the latch attribute appears to the right of the counter, as shown in FIG. 44.

The counter generates its outputs for a single cycle and then goes dormant until it is reset. Subsequent activations on the cnt input have no effect. If an activation signal is receive on the rst input, the counter is reset to zero and resumes normal operation. In the AP Workbench, the pulse attribute appears to the right of the counter, as additionally shown in FIG. 44.

The counter generates its outputs for a single cycle and then automatically resets to zero to resume normal operation. This mode effectively combines the pulse mode behavior with an automatic internally generated reset. In the AP Workbench, the roll attribute appears to the right of the counter, as further shown in FIG. 44. Also illustrated in FIG. 44 is an example of a counter elements having each of the latch mode, the pulse mode, and the roll mode at as at_target attribute as constructed in the AP Workbench.

Figure 45:
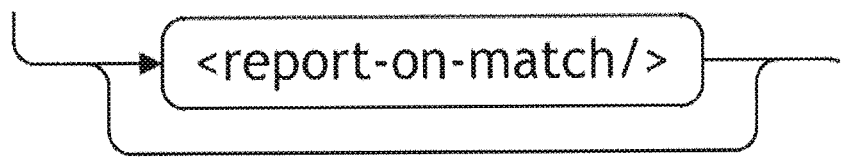
FIG. 45 illustrates an example of syntax of a report-on-target attribute, according to various embodiments.

The report-on-target attribute causes the counter to generate a report event when the target value is reached. Because the report-on-target output is a characteristic of the counter, there might only be a single indicator to represent it; therefore, a counter will either have a report-on-target or it will not. This is in contrast to activate-on-target, where a counter can have any number of activate-on-target outputs. The report-on-target element should precede any activate-on-target elements. FIG. 45 shows an example of the syntax of the report-on-target attribute.

Figure 46:
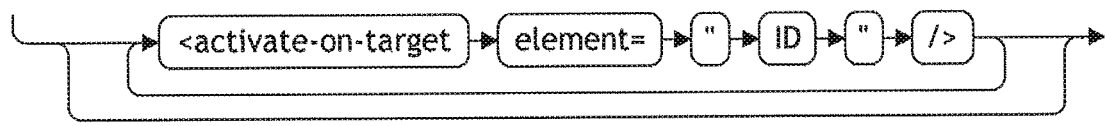
FIG. 46 illustrates an example of the syntax of the activate-on-target attribute, according to various embodiments.

The activate-on-target attribute indicates which other automata network entities are activated when the counter reaches its target, creating activation connections (transitions) from this counter to other elements in the automata network. FIG. 46 shows an example of the syntax of the activate-on-target attribute.

The count input terminal (<ID>:cnt) of the counter is a connection point where other automata network elements can connect activation signals. When one or more activation signals are active, the counter advances by one during that cycle. If the reset and count input terminals are both driven during the same symbol cycle, the reset function will have priority. The counter will reset, it will not increment.

The reset input terminal (<ID>:rst) of the counter is a connection point where other automata network elements can connect activation signals. When one or more activation signals are active, the counter will reset to zero during that cycle. If the reset and the count input terminals are both driven during the same cycle, the reset function will have priority. The counter will reset, it will not increment.

Figure 47:
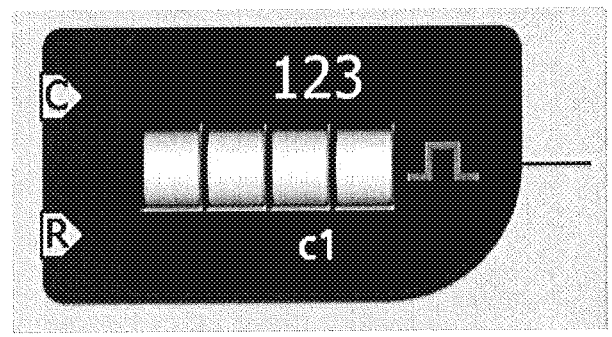
FIG. 47 illustrates an example of a counter automaton with a target value of 123 and an operation mode of pulse as constructed in the AP Workbench, according to various embodiments.

This section provides examples of simple automata networks built with the counter element. A simple counter automaton with a target value of 123 and an operation mode of pulse may be graphically represented via ANML syntax in both text and graphical form. The illustrations below show examples of ANML syntax as plain code (which can be written in an XML or text editor), and as constructed in Micron's AP Workbench (FIG. 47), respectively:

```
<counter id="cnt_to_123" target="123" at-target="pulse">
</counter>
```

The input terminals (cnt and rst) are represented by the C and R input symbols on the left of the illustrated counter. The operation mode (at_target=pulse) is represented by the waveform symbol on the right of the counter.

Figure 48:
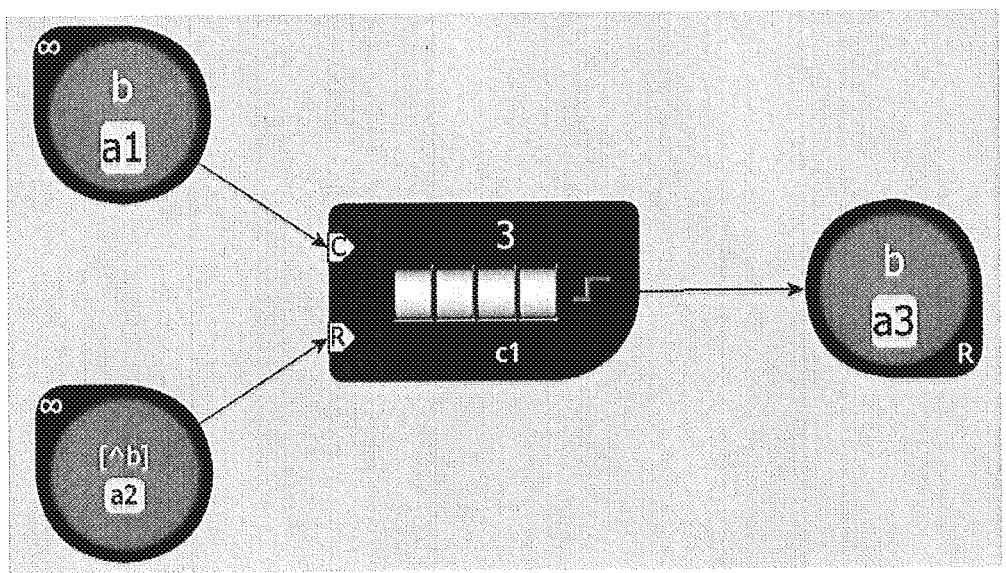
FIG. 48 illustrates a reset and counting automaton, according to various embodiments.

An example of an automaton that counts only sequences of four consecutive symbols (b) using the reset counter (e.g., a reset and counting automaton) is illustrated below (in both text and graphical form in FIG. 48).

```
<state-transition-element id="a1" symbol-set="b" start="all-input">
    <activate-on-match-element="c1"/>
</state-transition-element>
<state-transition-element id="a2" symbol-set="[^b]" start="all-input">
    <activate-on-match-element="r1"/>
</ state-transition-element>
<counter countone="c1" reset="r1" target="3" at_target="latch">
    <activate-on-target element="a3"/>
</counter>
<state-transition-element id="a3" symbol-set="b">
    <report-on-match/>
</state-transition-element>
```

In the above illustrated example, if in the first input cycle a b is seen, STE a1 (which is always active) will drive an activation signal to the counter c1. The counter c1 then advances. In the second input cycle if another b is seen, STE a1 will match again and drive another activation signal to c1, causing c1 to advance a second time. If a third b is seen on the next input cycle, STE a1 will drive another activation signal to the counter c1, which will then advance to its target, driving an activation signal to STE a3. The counter c1 remains at the target level (it does not reset).

The process continues with the fourth and fifth input cycles. STE a1 remains active. If a b is seen on each cycle, STE a1 drives an activation signal to c1, which advances to target and drives an activation signal to STE a3. The c1 count remains at target and does not reset. On the sixth input cycle, however, if an x is seen, STE a2 activates because it matches the x input symbol. STE a2 then drives an activation signal to r1. The counter c1 resets and STE a3 is deactivated. STE a2 examines each input symbol and resets the counter if a symbol that is not a b is seen. Reset causes the counter value to be restored to the initial value, restarting the count.

The Boolean (also known as combinatorial) elements enable the creation of logical constructs in an automaton network by combining activation values using bitwise Boolean operations such as OR and AND. According to one or more embodiments, Boolean elements do not receive or respond to input symbols in the input stream; instead, they are driven by STEs or counter elements, for example. In an exemplary embodiment, Boolean elements evaluate their logic functions instantaneously (in the same clock cycle within which they are driven).

In an actual hardware implementation, a finite amount of time is required for electrical signals to propagate through a Boolean element. For this reason, cascaded Boolean elements may have an effect on the speed at which an automata network operates. The most conservative approach might be to never connect the output of one Boolean element to the input of another Boolean element; however, this approach is not practical for all network automata designs.

Activation signals that are actively driven by other network elements (for example, an activate-on-match signal from an STE) are treated as logic 1. Activation signals that are not actively driven are treated as logic 0. ANML supports three types of Boolean elements: a) an inverter (e.g., a single input terminal accepting a single activation signal; also referred to as a single-tier gate), b) OR, AND, NAND, and NOR (e.g., single input terminals accepting multiple activation signals; also referred to as single-tier gates), and c) SOP, POS, NSOP, NPOS (e.g., multiple input terminals accepting multiple activation signals; also referred to as dual-tiered gates). The Boolean elements of one or more embodiments share a common structure of required and optional attributes, outputs, and input terminals. The required attribute may be an ID, the optional attribute may be an EOD, the outputs may be a report-on-high and an activate-on-high, and the input terminals of the inverter, OR, AND, NAND, and NOR elements can have a single, unnamed input terminal while the SOP, POS, NSOP, and NPOS elements can have three named input terminals.

<ID>:t1
<ID>:t2
<ID>:t3

Figure 49:
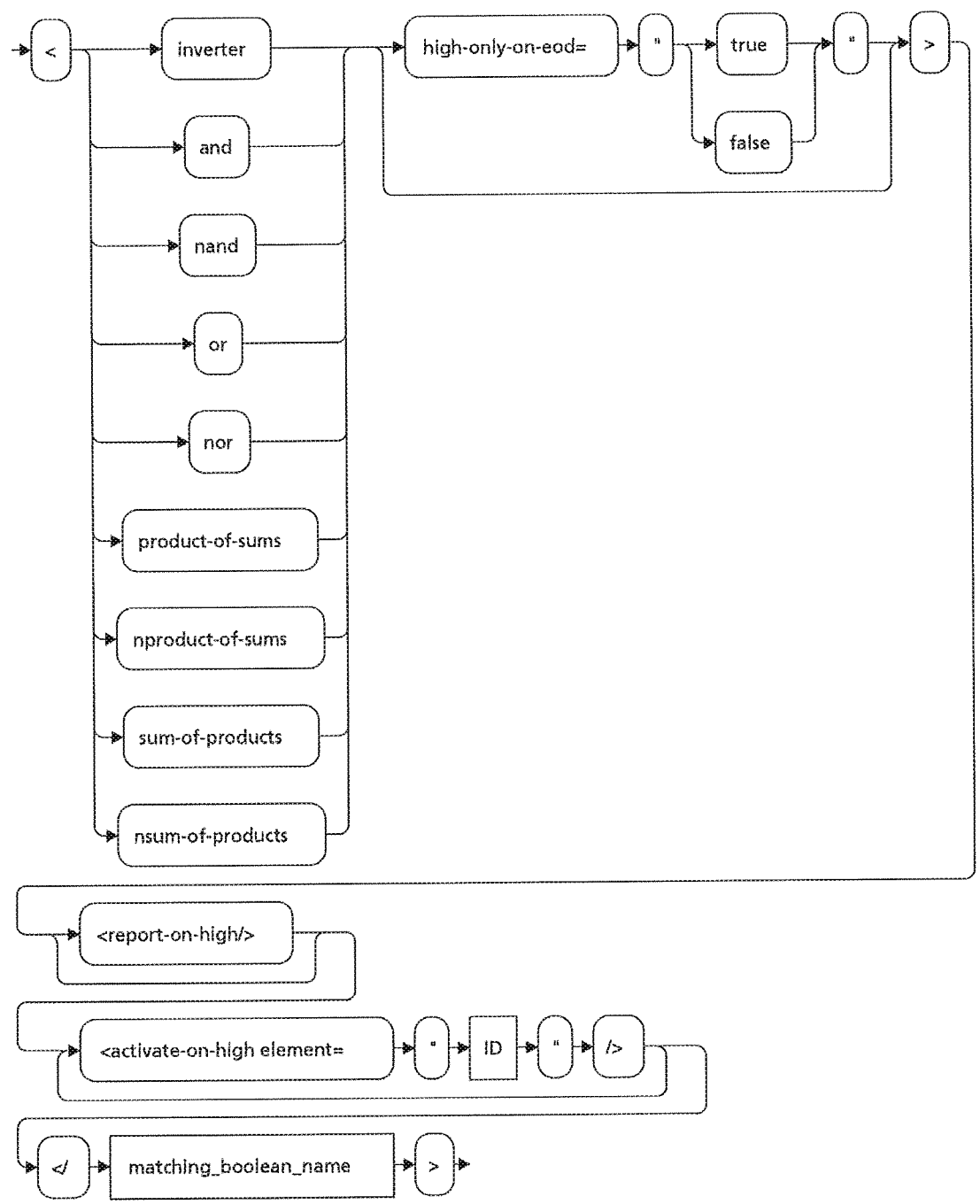
FIG. 49 illustrates an example of the syntax of a Boolean element, according to various embodiments.

FIG. 49 shows an example of the syntax of a Boolean element.

Figure 50:
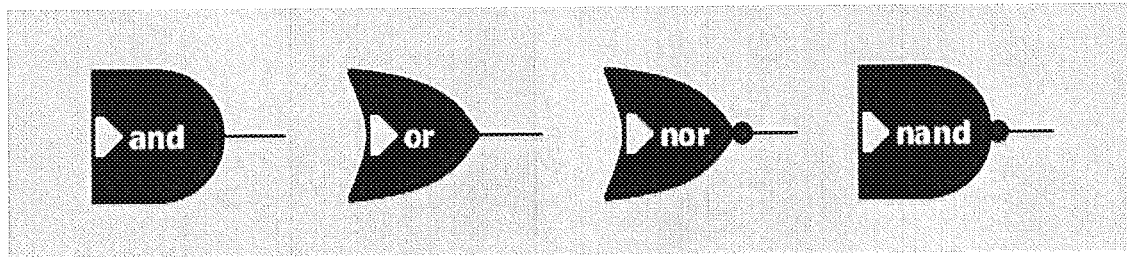
FIG. 50 illustrates an OR, AND, NAND, and NOR elements as constructed in the AP Workbench, according to various embodiments.

An inverter element inverts an activation signal. It can, for example, invert non-activation into activation even when the input STE is not testing input symbols against its symbol set. ANML syntax does not prohibit multiple activations to an inverter; however, ANML tools and compilers may reject such a construct or convert the inverter to a NOR or have other or undefined behavior. The OR, AND, NAND, and NOR elements (illustrated in FIG. 50 as constructed in the AP Workbench) combine activation values, producing a high event when the Boolean value computed by the element is equivalent to 1. There is no limit in ANML to the number of activations that may be combined, although the implementation will likely have a limit. These elements also work on single input activation; however, the function they perform will be logically equivalent to either a pass-through gate or an inverter.

The sum-of-product (SOP), product-of-sums (POS), nsum-of-products (NSOP), and nproduct-of-sums (NPOS) are Boolean elements with multiple input terminals. An SOP is the sum (OR) of product (AND) terms. A POS is the product (AND) of sum (OR) terms. An NSOP is an SOP with its activation value inverted. An NPOS is POS with its activation value inverted. The number of terms supported in this type of Boolean element is specific to the implementation, as is the number of activations that can be input into each term. These Boolean elements can be used to implement SOP and POS expressions and, more generally, can be useful in the implementation of complex logical operations involving the two-level combination of several separate Boolean terms.

Figure 51:
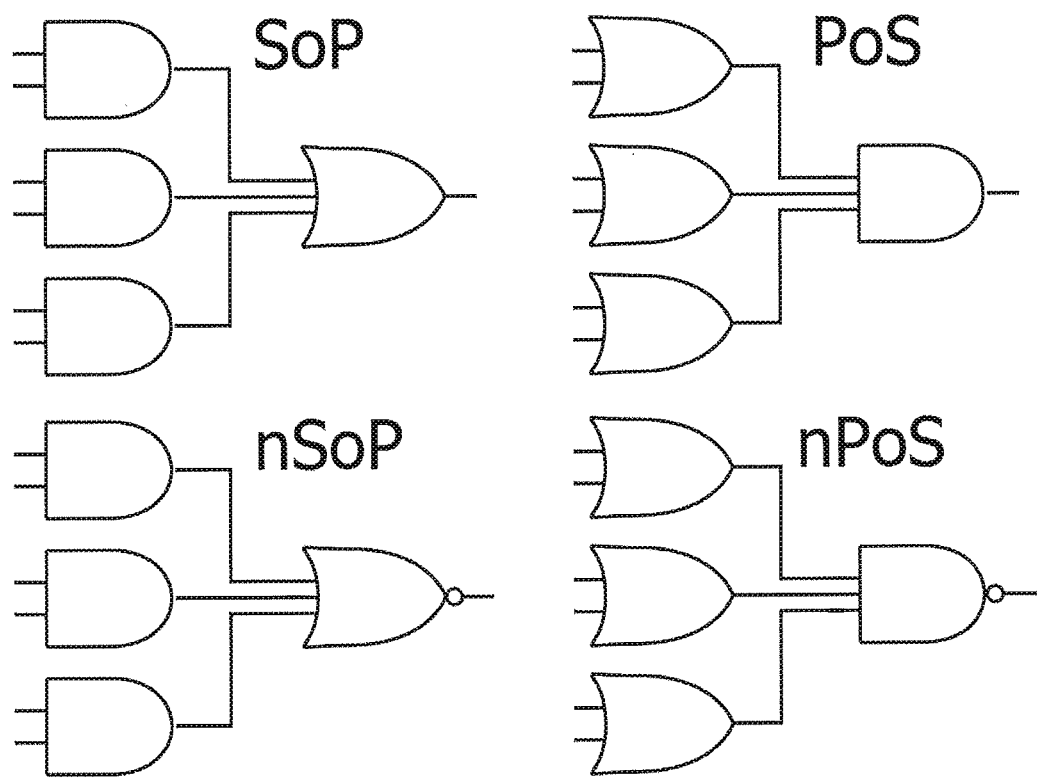
FIG. 51 illustrates SOP, POS, NSOP, NPOS elements, according to various embodiments.
Figure 52:
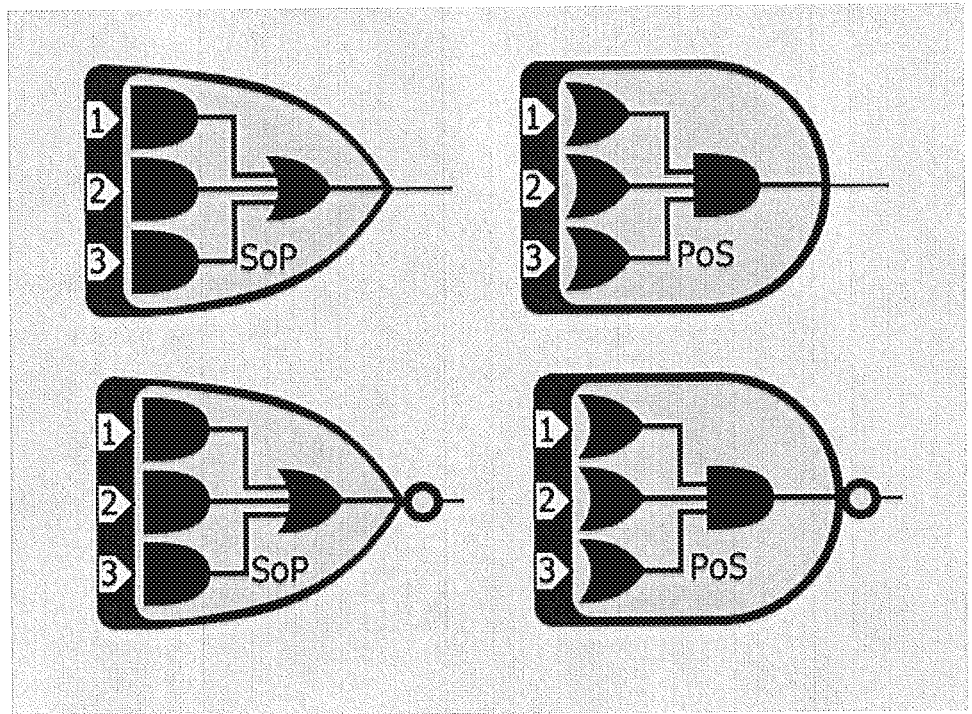
FIG. 52 illustrates SOP, POS, NSOP, NPOS elements as constructed in the AP Workbench, according to various embodiments.

It may be helpful to visualize POS and SOP in their representation as combinations of OR and AND gates as shown in FIG. 51. In the image, three terms are shown for each element, and each term is shown as having two inputs. However, in actuality, the number of terms and activation input to each term is an implementation dependency. Additionally illustrated in FIG. 52 are SOP, POS, NSOP, NPOS elements as constructed in the AP Workbench.

Similar to the other Boolean elements, SOP, POS, NSOP, and NPOS have an ID element; however, unlike the other elements, they have multiple terminals which should be selected when activating the element. Activations are therefore made directly to the term ID and not to the element. Like other ANML IDs, the IDs should be unique in the current namescope.

Figure 53:
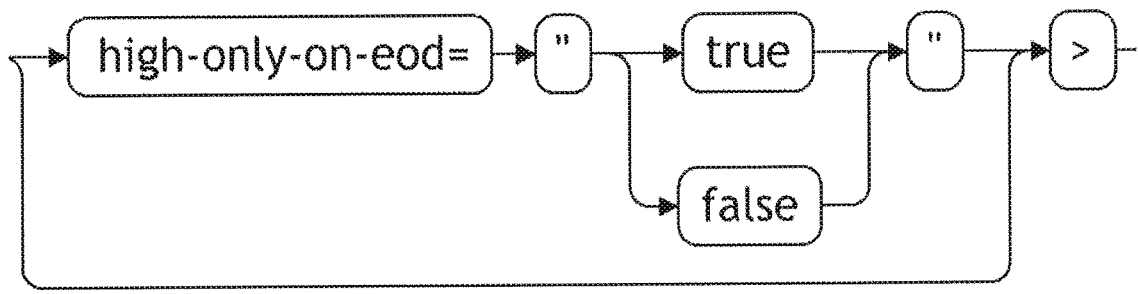
FIG. 53 illustrates an example of the syntax of the end of data (EOD) attribute, according to various embodiments.

The ID attribute of a Boolean element can be a user-defined unique identifier (name) for the Boolean element. The ID attribute should start with a character, but can then contain other characters, digits, or underscore symbols. End of data (EOD) is a signal delivered in conjunction with the input data stream. The EOD signal can be used to configure Boolean elements to be active only at specific points in the processing of input. The EOD signal is typically not asserted. At times, EOD can be set to true. A Boolean element can be configured to respond to EOD by setting the high-only-on-eod attribute to true. If a Boolean element is configured with EOD, it can only generate outputs on symbol cycles where the EOD signal is asserted. FIG. 53 shows an example of the syntax of the EOD attribute.

EOD implementation should support a mechanism by which the designer may request that EOD is asserted, zero or more times, at specific symbol cycles. This feature may have implementation-specific limitations, such as requiring the EOD be associated with chunks of data in allocated buffers or the EOD is asserted only on at intervals of a multiple of a specific length. In one or more embodiments, if a foundational element is configured with EOD, it can only activate other elements and report on symbol cycles where EOD is asserted.

Similar to STEs and counter elements, Boolean elements can be configured to report on an event. For example, up to one report-on-high element may be associated with a Boolean element, while zero or more activate-on-high elements may be specified. The Boolean event can be a high value, specified in ANML with the report-on-high subelement. A Boolean element configured to report a high event will report on each symbol cycle in which its value is high. In ANML coding, the report-on-high element should precede any activate-on-high elements.

An input terminal is the connection point where other network elements connect to the Boolean element. The single-tier gates (inverter, AND, OR, NAND, NOR) can all have a single, unnamed input terminal. Any number of other network elements may connect an activation signal to this terminal, and the gate will perform its logic function on these signals. In the current implementation, the dual-tier gates (SOP, POS, NSOP, NPOS) contain three different input terminals. Multiple network elements may connect to any of these input terminals, and the dual-tiered logic function of the gate will operate on these signals as specified. Examples of this behavior will be shown later.

Figure 54:
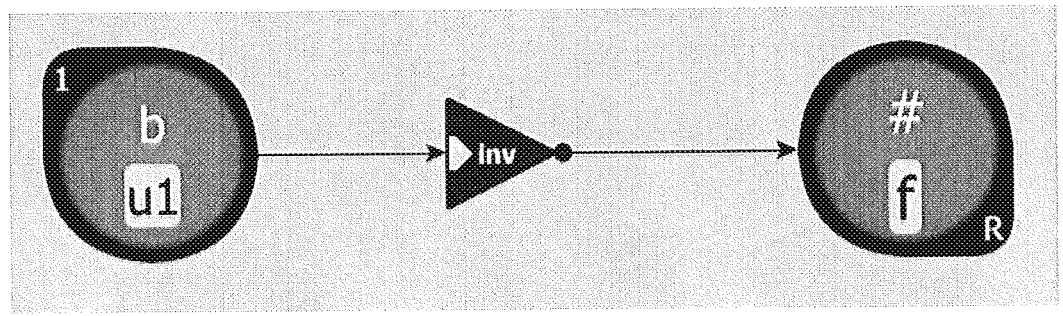
FIG. 54 illustrates an example of ANML syntax as constructed in AP Workbench, according to various embodiments.

This section provides examples of simple automaton networks built with Boolean elements. A basic operation of the inverter element be graphically represented via ANML syntax in both text and graphical form. The illustrations below show examples of ANML syntax as plain code (which can be written in an XML or text editor), and as constructed in Micron's AP Workbench (FIG. 54), respectively:

```
<state-transition-element id="u1" symbol-set="b" start="start-of-data">
    <activate-on-match element="i1"/>
</state-transition-element>
<inverter id="i1">
    <activate-on-high element="f"/>
</inverter>
<state-transition-element id="f" symbol-set="#">
    <report-on-match/>
</state-transition-element>
```

In this example, STE u1 is only active on the very first symbol cycle. On this cycle, if a b is seen in the input data stream, u1 will drive an activation signal to the inverter, and the inverter will therefore not drive an activation signal to STE f STE f will be inactive on the second symbol cycle. If the first symbol in the input data stream is not a b, STE u1 will not drive an activation signal to the inverter, and therefore, the inverter will drive an activation signal to STE f. STE f will be active during the second symbol cycle. On all subsequent symbol cycles, STE u1 is inactive, and therefore, is not driving an activation signal to the inverter. The inverter drives an activation signal to STE f, and STE f is active on all subsequent symbol cycles. On the very first symbol cycle f is inactive; the activation from the inverter u1 does not cause it be activated until the second symbol cycle. It should be noted that Boolean elements in the exemplary implementation do not drive out signals until the end of the first symbol cycle. Therefore, in this example, STE f is inactive on the very first symbol cycle; the activation from the inverter u1 (if any) does not cause STE f to be activated until the second symbol cycle.

Table 4 provides a listing of inverter behavior.

TABLE 4

| Symbol Cycle | Input | Actions |
|---|---|---|
| | | Inverter Behavior |
| | | Input stream: b#2# |
| 0 | b | 1. u1 is active; f is inactive<br>2. u1 matches the b input symbol<br>3. u1 drives an activation signal to i1<br>4. i1 inverts the activation signal and does NOT drive an activation signal to f |
| 1 | # | 1. u1 is inactive; f is inactive<br>2. Neither STE responds to the input symbol<br>3. u1 does not drive an activation signal to i1<br>4. i1 inverts the not-active signal and drives an activation signal to f |
| 2 | 2 | 1. u1 is inactive; f is active<br>2. f does not match the input symbol (2)<br>3. u1 does not drive an activation signal to i1<br>4. i1 inverts the not-active signal and drives an activation signal to f |
| 3 | # | 1. u1 is inactive; f is active<br>2. f matches the input symbol (#); f generates a report event<br>3. u1 does not drive an activation signal to i1<br>4. i1 inverts the not-active signal and drives an activation signal to f |
| | | Input stream: a# |
| 0 | a | 1. u1 is active; f is inactive<br>2. u1 does not match the input symbol (a)<br>3. u1 does not drive an activation signal to i1<br>4. i1 inverts the non-activate signal and drives an activation signal to f |
| 1 | # | 1. u1 is inactive; 'f is active<br>2. f matches the input symbol (#); f generates a report event<br>3. u1 does not drive an activation signal to i1<br>4. i1 inverts the not-active signal and drives an activation signal to f |
| | | Input stream: b## |
| 0 | b | 1. u1 is active<br>2. b causes u1 match<br>3. i1 inverts to not activate f on next cycle<br>4. f is inactive |
| 1 | # | 1. u1 is inactive<br>2. i1 inverts to activate f on next cycle<br>3. f is inactive<br>4. no report |
| 2 | # | 1. u1 is inactive<br>2. i1 inverts to activate f on next cycle<br>3. f is active<br>4. # causes f match<br>5. f reports |

TABLE 4-continued

Inverter Behavior

| Symbol Cycle | Input | Actions |
|---|---|---|
| | | Input stream: a## |
| 0 | a | 1. u1 is active<br>2. a is not a match u1<br>3. i1 inverts to activate f on next cycle<br>4. f is inactive |
| 1 | # | 1. u1 is inactive<br>2. i1 inverts to activate f on next cycle<br>3. f is active<br>4. # causes f match<br>5. f reports |
| 2 | # | 1. u1 is inactive<br>2. i1 inverts to activate f on next cycle<br>3. f is active<br>4. # causes f match<br>5. f reports |
| | | Input stream: baba# |
| 0 | b | 1. u1 is active<br>2. b causes u1 match<br>3. i1 inverts to not activate f on next cycle<br>4. f is inactive |
| 1 | a | 1. u1 is inactive<br>2. i1 inverts to activate f on next cycle<br>3. f is inactive<br>4. no report |
| 2 | b | 1. u1 is active<br>2. i1 inverts to activate f on next cycle<br>3. f is active<br>4. b is not a match for f<br>5. no report |
| 3 | a | 1. u1 is active<br>2. i1 inverts to activate f on next cycle<br>3. f is active<br>4. a is not a match for f<br>5. no report |
| 4 | # | 1. u1 is inactive<br>2. i1 inverts to activate f on next cycle<br>3. f is active<br>4. # causes f match<br>5. f reports |

Figure 55:
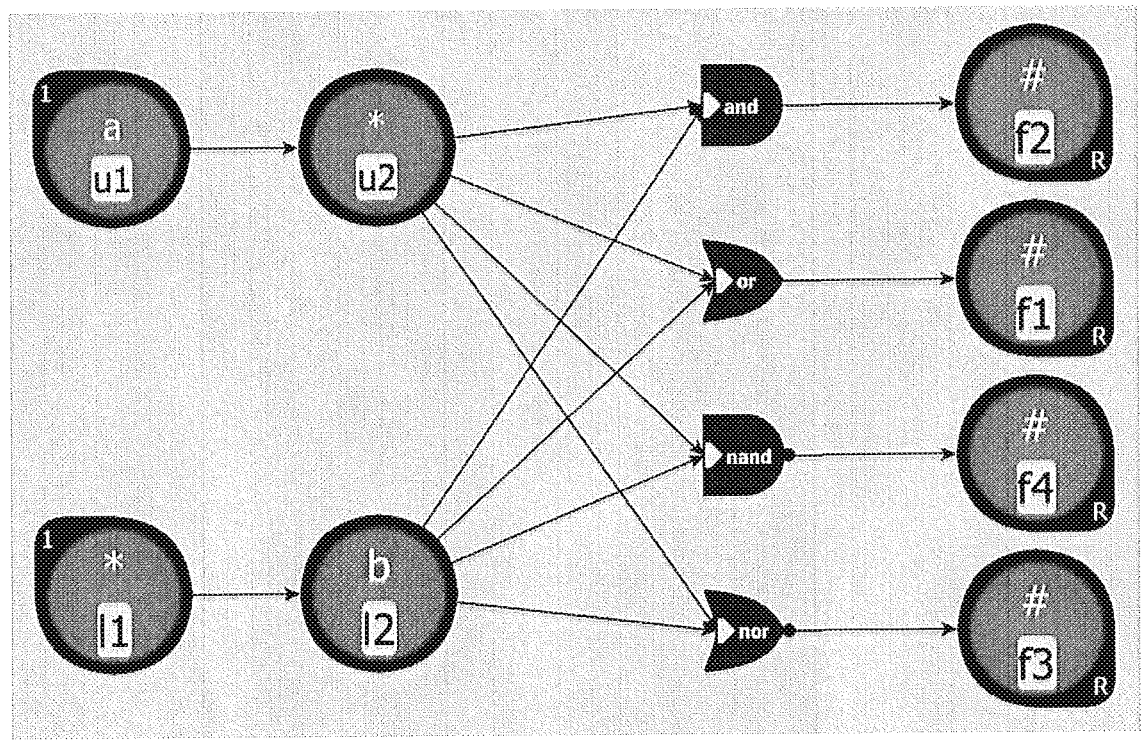
FIG. 55 illustrates another example of ANML syntax as constructed AP Workbench, according to various embodiments.

The basic operation of OR, AND, NAND, and NOR elements is illustrated below with automata that implement ean elements, which will compute the Boolean results and either activate or not activate the final STEs which, if activated, report on seeing the termination symbol #. The illustrations below show examples of ANML syntax as plain code (which can be written in an XML or text editor), and as constructed in Micron's AP Workbench (FIG. 55), respectively. Additionally, Table 5 illustrates examples of OR, AND, NOR, NAND behavior.

```
<state-transition-element id="l1" symbol-set="*" start="start-of-data">
    <activate-on-match element="u2"/>
</state-transition-element>
<state-transition-element id="l2" symbol-set="b">
    <activate-on-match element="a1"/>
</state-transition-element>
<state-transition-element id="u1" symbol-set="a" start="start-of-data">
    <activate-on-match element="l2"/>
</state-transition-element>
<state-transition-element id="u2" symbol-set="*">
    <activate-on-match element="a1"/>
</state-transition-element>
<or id="o1">
    <activate-on-high element="f1"/>
</or>
<and id="a1">
    <activate-on-high element="f2"/>
</and>
<nor id="no1">
    <activate-on-high element="f3"/>
</nor>
<nand id="na1">
    <activate-on-high element="f4"/>
</nand>
<state-transition-element id="f1" symbol-set="#">
    <report-on-match/>
</state-transition-element>
<state-transition-element id="f2" symbol-set="#">
    <report-on-match/>
</state-transition-element>
<state-transition-element id="f3" symbol-set="#">
    <report-on-match/>
</state-transition-element>
```

TABLE 5

OR, AND, NOR, NAND Behavior

| | f reports | | | | | | | | | | | | | | | |
|---|---|---|---|---|---|---|---|---|---|---|---|---|---|---|---|---|
| | OR Cycle | | | | AND Cycle | | | | NOR Cycle | | | | NAND Cycle | | | |
| Input | 1 | 2 | 3 | 4 | 1 | 2 | 3 | 4 | 1 | 2 | 3 | 4 | 1 | 2 | 3 | 4 |
| a | | Y | | | | Y | | | | Y | | | | | | Y |
| !ab## | | Y | | | | | | | | Y | | | | | Y | Y |
| a!b## | | Y | | | | | | | | Y | | | | | Y | Y |
| !a!b## | | | | | | | | | | | Y | Y | | | Y | Y | each of these Boolean element types with two input STEs and one output reporting STE. The input STEs recognize the symbols a and b. The symbols arrive serially, one after the other, so the automata each have two sequences of two STEs: the upper, which recognizes the a followed by a wildcard to propagate the result of the a STE into the second cycle, and the lower which recognizes the b, preceded by a wildcard STE to delay recognition of the b until the second cycle. The second upper and lower STEs activate the Bool- The OR element is not necessary in the first example because all elements have an implicit OR. The activation of u1 and l1 in the example could have gone straight to the STE f and would produce the same output as the automaton with the OR Boolean element.

Figure 56:
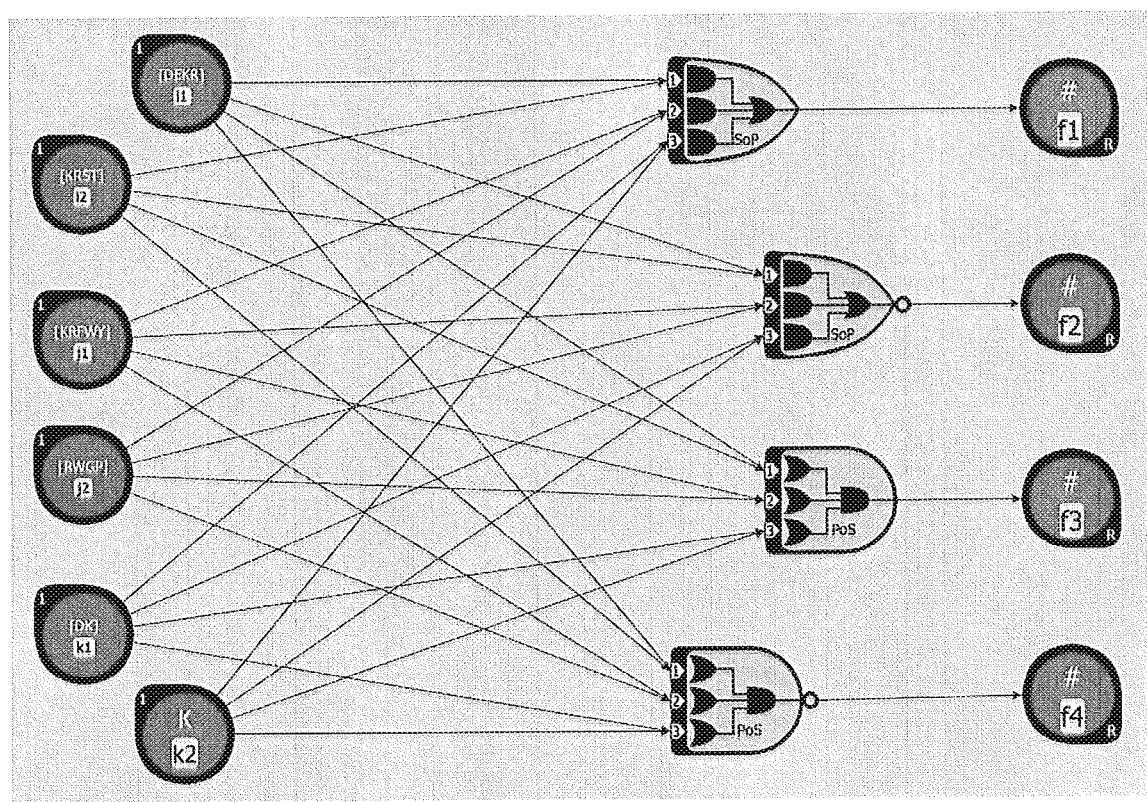
FIG. 56 illustrates an example of the operation of SOP, POS, NSOP, and NPOS elements, according to various embodiments.

An example of the basic operation of SOP, POS, NSOP, and NPOS elements is illustrated below (in both text and graphical form in FIG. 56), where a single activation connection has been made from six STEs to each of an SOP, POS, NSOP, and NPOS element. Each of these Boolean elements has three input terminals, with two activations going to each terminal. An activation signal goes from the Boolean element to STE f which reports if it is activated by the Boolean element and sees a termination symbol #.

```
<state-transition-element id="i1" symbol-set="[DEKR]"
start="start-of-data">
    <activate-on-match element="sop:t1"/>
    <activate-on-match element="nsop:t1"/>
    <activate-on-match element="pos:t1"/>
    <activate-on-match element="npos:t1"/>
</state-transition-element>
<state-transition-element id="i2" symbol-set="[KRST]"
start="start-of-data">
    <activate-on-match element="sop:t1"/>
    <activate-on-match element="nsop:t1"/>
    <activate-on-match element="pos:t1"/>
    <activate-on-match element="npos:t1"/>
</state-transition-element>
<state-transition-element id="j1" symbol-set="[KRFWY]"
start="start-of-data">
    <activate-on-match element="sop:t2"/>
    <activate-on-match element="nsop:t2"/>
    <activate-on-match element="pos:t2"/>
    <activate-on-match element="npos:t2"/>
</state-transition-element>
<state-transition-element id="j2" symbol-set="[RWGP]"
start="start-of-data">
    <activate-on-match element="sop:t2"/>
    <activate-on-match element="nsop:t2"/>
    <activate-on-match element="pos:t2"/>
    <activate-on-match element="npos:t2"/>
</state-transition-element>
<state-transition-element id="k1" symbol-set="[DK]"
start="start-of-data">
    <activate-on-match element="sop:t3"/>
    <activate-on-match element="nsop:t3"/>
    <activate-on-match element="pos:t3"/>
    <activate-on-match element="npos:t3"/>
</state-transition-element>
<state-transition-element id="k2" symbol-set="K" start="start-of-data">
    <activate-on-match element="sop:t3"/>
    <activate-on-match element="nsop:t3"/>
    <activate-on-match element="pos:t3"/>
    <activate-on-match element="npos:t3"/>
</state-transition-element>
<sum-of-products id="sop">
    <activate-on-high element="f1"/>
</sum-of-products>
<nsum-of-products id="nsop">
    <activate-on-high element="f2"/>
</nsum-of-products>
<product-of-sums id="pos">
    <activate-on-high element="f3"/>
</product-of-sums>
<nproduct-of-sums id="npos">
    <activate-on-high element="f4"/>
</nproduct-of-sums>
<state-transition-element id="f1" symbol-set="#">
    <report-on-match/>
</state-transition-element>
<state-transition-element id="f2" symbol-set="#">
    <report-on-match/>
</state-transition-element>
<state-transition-element id="f3" symbol-set="#">
    <report-on-match/>
</state-transition-element>
<state-transition-element id="f4" symbol-set="#">
    <report-on-match/>
</state-transition-element
```

Similar to the other Boolean elements, SOP, POS, NSOP, and NPOS have an ID attribute; however, unlike the other elements, they have multiple terminals which should be selected when activating the element. Activations are therefore made directly to the term ID and not to the element. Like other ANML IDs, the IDs should be unique in the current namescope.

Table 6 below shows the result of inputting different symbol values followed by the termination symbol # to illustrate the operation of each of different types of combinatorial elements discussed in this section.

TABLE 6

SOP, POS, NSOP, NPOS Behavior

| | Input Stream | | | | | | |
|---|---|---|---|---|---|---|---|
| | D# | Y# | K# | R# | L# | S# | W# |
| i1[DEKR] | 1 | | 1 | 1 | | | |
| i2[KRST] | | | 1 | 1 | | 1 | |
| j1[KRFWY] | | 1 | 1 | 1 | | | 1 |
| j2[RWGP] | | | | 1 | | | 1 |
| k1[DK] | 1 | | 1 | | | | |
| k1[K] | 1 | | 1 | | | | |
| SOP | | | Y | Y | | | Y |
| POS | | | Y | | | | |
| NSOP | Y | Y | | | Y | Y | |
| NPOS | Y | Y | | Y | Y | Y | Y |

As was the case with the inverter and NAND and NOR elements, the NSOP and NPOS elements will activate f on any symbol cycle following the second cycle, as the inactive input STEs drive a low input on a term connection causing a high output by the logic of the element.

Figure 57:
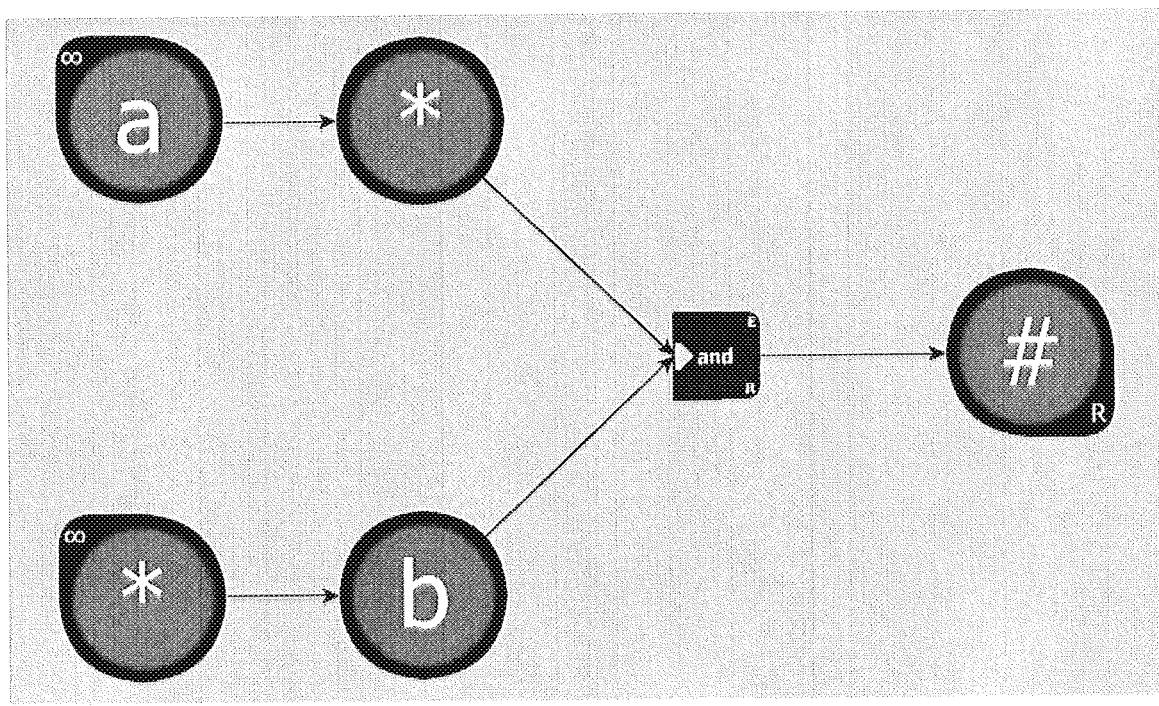
FIG. 57 illustrates an example of an EOD with a Boolean element, according to various embodiments.

An example of EOD operation (e.g., an EOD with a Boolean element) is illustrated below (in both text and graphical form in FIG. 57). The AND element is enabled for EOD, is reporting, and also activates an STE (which is also reporting). The starting STEs have been set to all-input so that the effect of asserting EOD several times in an input stream can be seen. Also illustrated is Table 7, which illustrates examples of EOD Behavior.

```
<state-transition-element id="l1" symbol-set="*" start="all-input">
    <activate-on-match element="u2"/>
</state-transition-element>
<state-transition-element id="l2" symbol-set="b">
    <activate-on-match element="a1"/>
</state-transition-element>
<state-transition-element id="u1" symbol-set="a" start="all-input">
    <activate-on-match element="l2"/>
</state-transition-element>
<state-transition-element id="u2" symbol-set="*">
    <activate-on-match element="a1"/>
</state-transition-element>
<and id="a1">
    <report-on-high/>
    <activate-on-high element="f"/>
</and>
<state-transition-element id="f" symbol-set="#">
    <report-on-match/>
</state-transition-element>
```

TABLE 7

| | | | | | | | | | | | | | EOD Behavior | | | | | | | | | | | | |
|---|---|---|---|---|---|---|---|---|---|---|---|---|---|---|---|---|---|---|---|---|---|---|---|---|---|
| Cycle | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Symbol | # | # | a | b | # | # | a | b | # | # | a | b | # | # | a | b | # | # | a | b | # | # | x | y | # |
| EOD asserted? | | | | | | | | Y | | | | | | | | | | | | | | | | | Y | |
| a1 reports? | | | | | | | | Y | | | | | | | | | | | | | | | | | | |
| f reports? | | | | | | | | | Y | | | | | | | | | | | | | | | | | |

The Boolean element a1 only reports and activates f at cycle 8 when EOD has been asserted; all other sequences of a b do not cause reporting or activation. EOD is enabled at cycle 24; however, because the input does not generate a high value, it has no effect and a1 does not report or activate f. According to one or more embodiments, enabling EOD on NAND, NOR, NPOS, and NSOP elements prevents them from generating a high value in the absence of activation inputs when EOD is not asserted.

Figure 58:
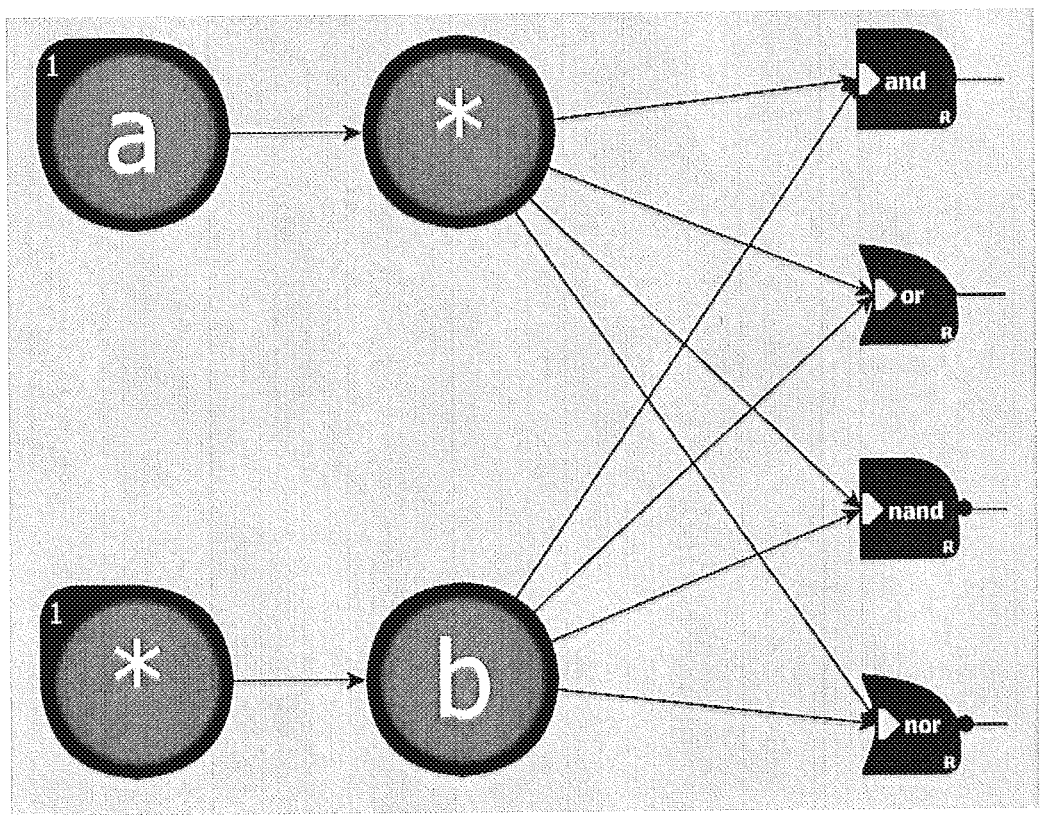
FIG. 58 illustrates an example of a reporting Boolean element, according to various embodiments.

A reporting Boolean element is illustrated below (in both text and graphical form in FIG. 58) by modifying AND in the previous example. In this example, it was reported by adding an extra symbol cycle with a termination symbol, with using the AND to activate a final reporting STE. The additional cycle and the STE can be eliminated simply by making the AND element one that reports.

```
<state-transition-element id="l1" symbol-set="*" start="start-of-data">
    <activate-on-match element="u2"/>
</state-transition-element>
<state-transition-element id="l2" symbol-set="b">
    <activate-on-match element="a1"/>
</state-transition-element>
<state-transition-element id="u1" symbol-set="a" start="start-of-data">
    <activate-on-match element="l2"/>
</state-transition-element>
<state-transition-element id="u2" symbol-set="*">
    <activate-on-match element="a1"/>
</state-transition-element>
<and id="a1">
    <report-on-high/>
</and>
```

The SOP, POS, NSOP, and NPOS elements have an element ID in addition to IDs associated with each terminal. Activations are made to the terminal ID, not to the element ID; however, when reporting the output is associated with the element ID.

A macro is a container element and can be the encapsulation mechanism of automata networks. Macros are intended to encourage hierarchical design and facilitate reuse and sharing of useful designs among the development community. Macros can be thought of as user-defined resources within an automata network. Like the other ANML elements, macros may accept inputs and may produce outputs. The function they perform is determined by a designer through the connection of the internal elements to each other and to other elements within the automata network outside the macro definition. A macro can be used within an automata network by instantiating it as a macro reference. A macro contains one syntax for creating macro definitions and another for creating macro references.

A macro definition is the ANML statements that describe the content of the macro and the interface to that macro. A macro definition does not consume any resources in the design until it is instantiated; it only provides the description of the hardware and the connection ports that will be used by a macro instance.

Figure 59:
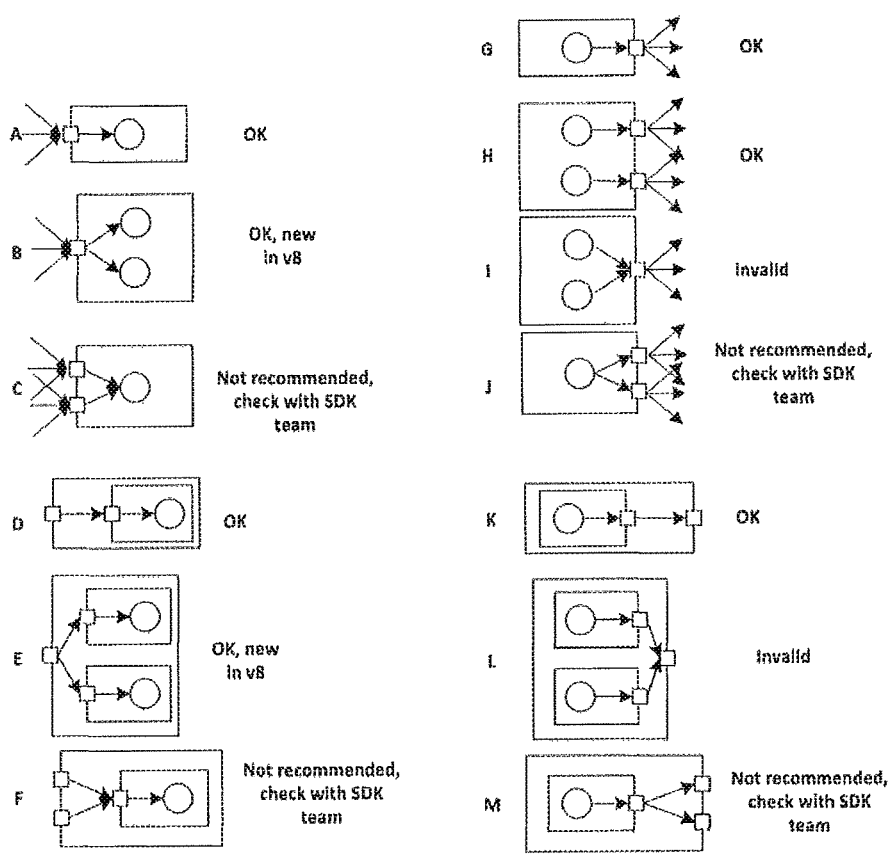
FIG. 59 illustrates examples of macro guidelines, according to various embodiments.

A macro reference is the unique identifier associated with each instance of a macro. The reference thus becomes the one and only actual physical realization of the macro in the automata network. This reference provides a way for other network resources to address this specific macro instantiation. Instantiation involves taking a macro definition and assigning specific automata network elements to implement that macro definition. A macro definition may be instantiated multiple times within an automata network. Each instantiation is distinct, consumes its own resources, and has its own identifier. Illustrated in FIG. 59 are examples of macro guidelines.

Figure 60:
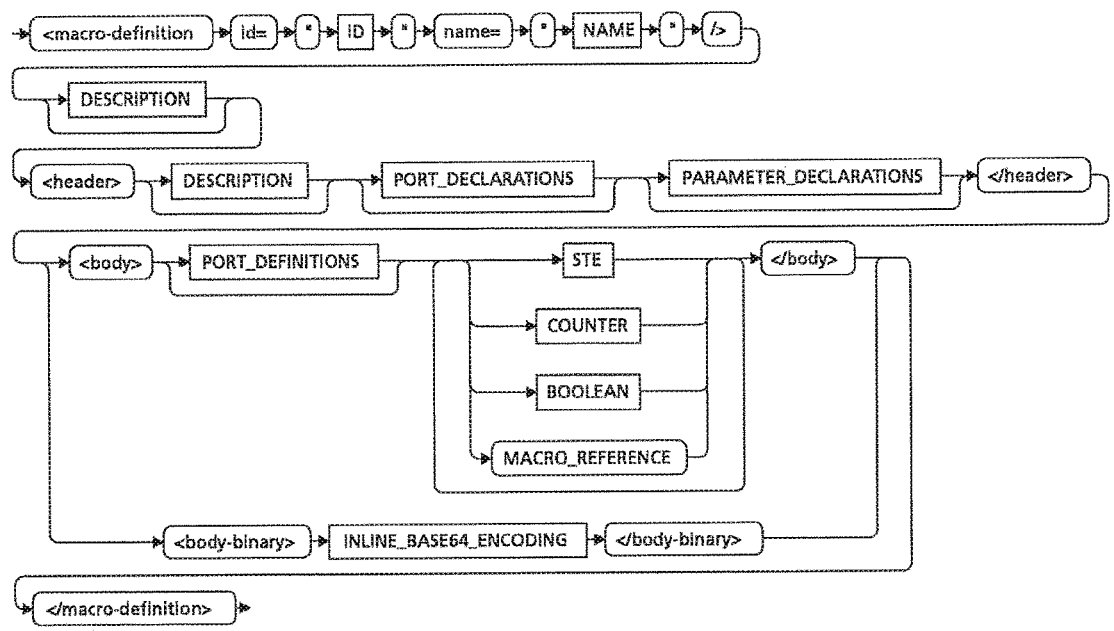
FIG. 60 illustrates an example of syntax of a macro definition, according to various embodiments.

A macro definition defines the content of a macro and its interface. The definition may contain instances of other macros, enabling the support of hierarchical macro designs. According to one or more embodiments, a macro definition should not contain another macro definition. A macro definition can be comprised of, for example, four required attributes and three optional attributes. For example, the required attributes may be: a) ID, b) name, c) header, and d) body while the optional attributes may be: a) description, b) port declarations, and c) parameter declarations. FIG. 60 shows an example of the syntax of a macro definition.

Figure 61:
FIG. 61 illustrates an example of syntax of a header attribute, according to various embodiments.

The ID attribute of a macro definition can be a user-defined unique identifier (name) for the macro. The ID attribute should start with a character, but can then contain other characters, digits, or underscore symbols. The name attribute of a macro definition can be a user-defined name (label) for identifying the macro. The name can be for a designer's benefit and may not necessarily be used by other elements in the network. The header attribute describes the macro's interface, describing, for example, how the macro is to be used. The header should contain information that will assist the user of the macro with understanding the macro's function and how to connect to its interface. FIG. 61 shows an example of the syntax of a header attribute.

Figure 62:
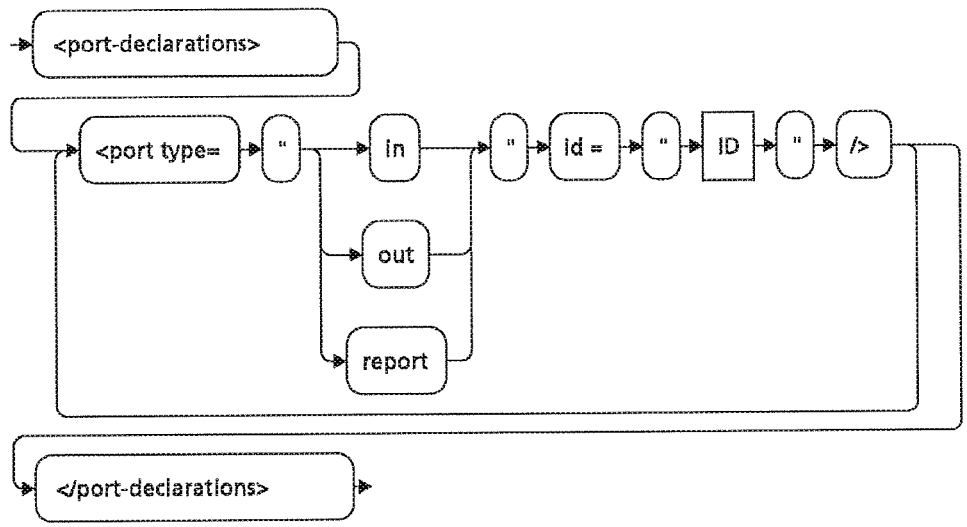
FIG. 62 illustrates an example of syntax of a port declarations header, according to various embodiments.

A macro contains two categories of information that define the connections and parameters associated with the macro, port declarations and parameter declarations (which may operate as placeholders for values that may be assigned to the macro when it is instantiated). Port declarations may include statements that describe how outside entities may connect to the macro, containing three types of connections: in, out, and report. The in connection receives an activation input and connects that activation signal to a resource within the macro. The in statement should be connected to a resource within the body of the macro; unconnected in ports are not allowed in one or more embodiments. The out connection is the inverse of an in port. The out connection connects an activation signal from within the macro to the outside world (elements outside of the macro). The report connection provides an optional way to attach identifiers to reporting elements within the macro. The report connection also provides a way to group similar reporting elements together. FIG. 62 shows an example of the syntax of a port declarations header.

Port declarations may include statements that describe how outside entities may connect to the macro, containing three types of connections: in, out, and report. Parameters (e.g., parameter declarations) provide a way of generalizing a macro. Parameters can be placeholders for actual values specified when a macro instance is created in a design. Parameters should be assigned default values. If a macro instantiation does not assign a parameter value, the default value may be used. Examples of items that may be parameterized are STE symbol sets and counter target values.

According to one or more embodiments, parameters should be prefixed with a percent sign (for example, % a, % target_count, % match_string, and so on). For example: a macro may contain a counter with its target count set to the parameter % tcount with a default of 15. When instantiated, the user could leave the % tcount value unassigned, in which the default value of 15 will be used. Another macro reference could be created and it could assign the value of 10 as the value assigned to % tcount. In this case, the 10 would override the default value of 15.

Figure 63:
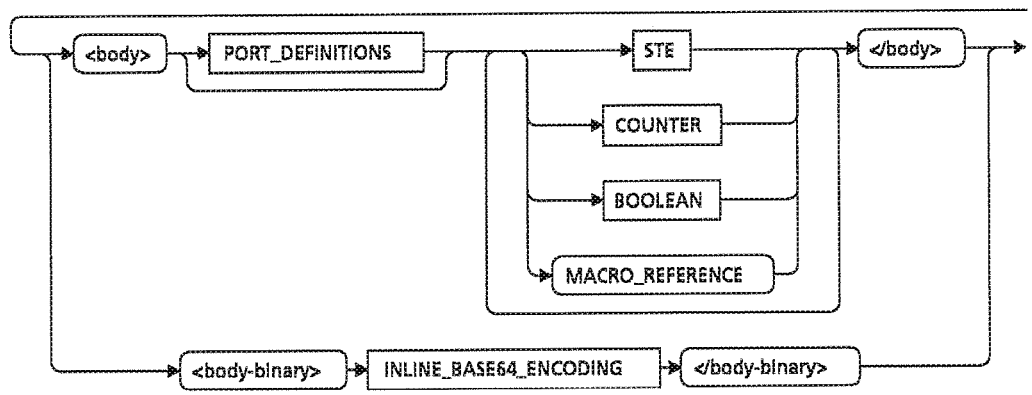
FIG. 63 illustrates an example of syntax of a body attribute, according to various embodiments.

The body attribute contains the resources and connections that comprise the content of the macro as well as the statements that connect those macro resources to the interface connections declared in the header. The body attribute can be, for example, either plain text (specified with <body>) or binary encoding (specified with <bond-binary>). Binary encodings are created using specific API calls to the Automata Processor SDK. They exist for the purpose of obfuscating macros (and, in some cases, facilitating faster design compilations). This allows a macro to be shared without revealing the details of its implementation. FIG. 63 shows an example of the syntax of a body attribute.

A port definition associates an element with a port declared in the port declarations section of the header attribute. There can be, for example, three different port definition types. A port definition should be associated with a port declaration of the same type. One definition may be a port-in, which may be an input port that receives an activation signal from the outside of the macro. The port-in contains an ID followed by at least one, but possibly many, activate-on-event statements. Each activate-on-event statement connects the activation signal for this port with a different resource within the macro body. Another definition may be a port-out, which connects an activation signal from within the macro to other elements within the automata network outside this macro definition. The port-out should be associated with one and only one resource within the macro. This can be done by specifying the driving resource in the activate-from-event element ID. An additional definition may be a report-alias, which provides a way to determine which specific resource within the macro generated a report event. One or more resource IDs from within the macro can be associated with a report-alias ID. If a report alias is specified, it should be associated with at least one resource within the macro.

Figure 64:
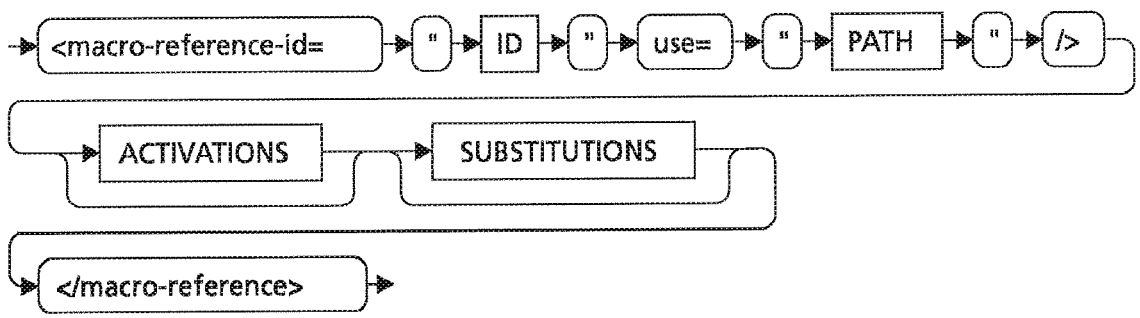
FIG. 64 illustrates an example of syntax of a macro definition, according to various embodiments.

After defining a port definition, the content of the macro can be defined by adding various network elements or references to other macro instances, just as when constructing an automata network. Instantiation involves taking a macro definition and assigning specific automata network elements to implement that macro definition. The macro reference provides a way for other network resources to address this specific macro instantiation. Required attributes for the macro reference may include an ID and a path while optional clauses may include activations and substitutions. FIG. 64 shows an example of the syntax of a macro definition.

The ID attribute of the macro reference can be a user-defined unique identifier (name) that is used by other network resources to refer to this macro instance. The path attribute can be the filesystem location where the macro definition can be found. The path is a relative location in the current filesystem. The activations statement is the mechanism that connects a macro's output to the outside world. Any number of activate-from-macro statements can exist within the activate-out statement.

Figure 65:
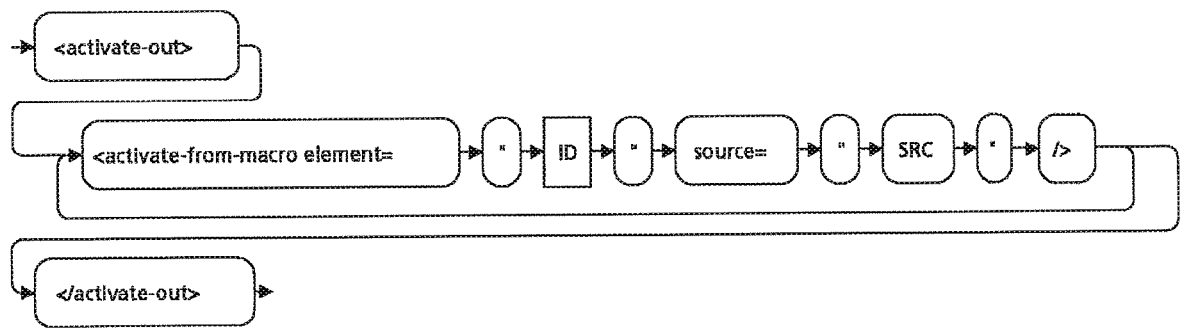
FIG. 65 illustrates an example of syntax of activations, according to various embodiments.

Each of these statements connects a macro output port to an element in the automata network. The element="ID" parameter is where the automata network resource is specified. This is the resource that receives the activation output from the macro output port. The source="SRC" parameter specifies the macro output port from where the activation signal originates. The activations statement may be repeated any number of times, including zero times. FIG. 65 shows an example of the syntax of activations.

Figure 66:
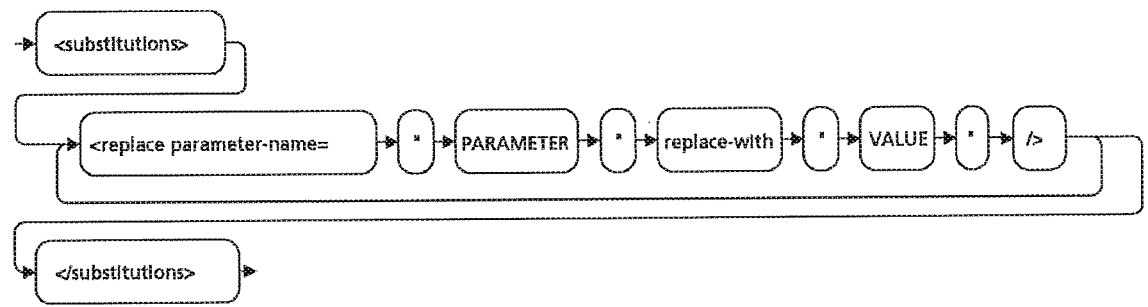
FIG. 66 illustrates an example of the syntax of substitutions, according to various embodiments.

The substitutions statement is the way in which parameter values can be set when a macro is instantiated. A substitutions statement may be repeated any number of times, including zero times. FIG. 66 shows an example of the syntax of substitutions.

This section provides an example for building an ANML macro (in text form).

```
<macro-definition id="m3" name="simplemacro">
    <header>
        <interface-declarations>
            <port type="in" id="in_dec_1"/>
            <port type="out" id="out_dec_1"/>
            <port type="out" id="out_dec_2"/>
            <port type="report" id="report_dec_1"/>
        </interface-declarations>
    </header>
    <body>
        <port-definitions>
            <port-in id="in_dec_1">
                <activate-on-event element="ste_1"/>
                <activate-on-event element="ste_2"/>
                <activate-on-event element="ste_3"/>
            </port-in>
            <port-out id="out_dec_1">
                <activate-from-event element="ste_1"/>
            </port-out>
            <port-out id="out_dec_2">
                <activate-from-event element="ste_2"/>
            </port-out>
            <report-alias id="report_dec_1" element="ste_1"/>
            <report-alias id="report_dec_1" element="ste_2"/>
        </port-definitions>
    <state-transition-element id="ste_1" symbol-set="A">
        <report-on-match/>
    </state-transition-element>
    <state-transition-element id="ste_2" symbol-set="B">
        <report-on-match/>
    </state-transition-element>
    <state-transition-element id="ste_3" symbol-set="C">
        <report-on-match/>
    </state-transition-element>
    </body>
</macro-definition>
```

The macro functions accordingly may be defined as follows:
1. The <header> <interface-declarations> statement creates five ports:
    a single input port: in_dec_1
    two output ports: out_dec_1 and out_dec_2
    a single report port: report_dec_2.

2. The <port-definitions> section connects the ports to resources located within the macro.
3. The input <port-in> in_dec_1 connects to all three STEs.
4. STE 1 is connected to the output port out_dec_1.
5. STE 2 is connected to the output port out_dec_2.
6. Both STEs 1 and 2 are connected to the report port report_dec_1'.
7. STE 3 reports on match, but it is not connected to any report port; therefore, if it generates a report event, this event will propagate up as a report associated with the top-most macro reference that uses this macro.

Figure 67:
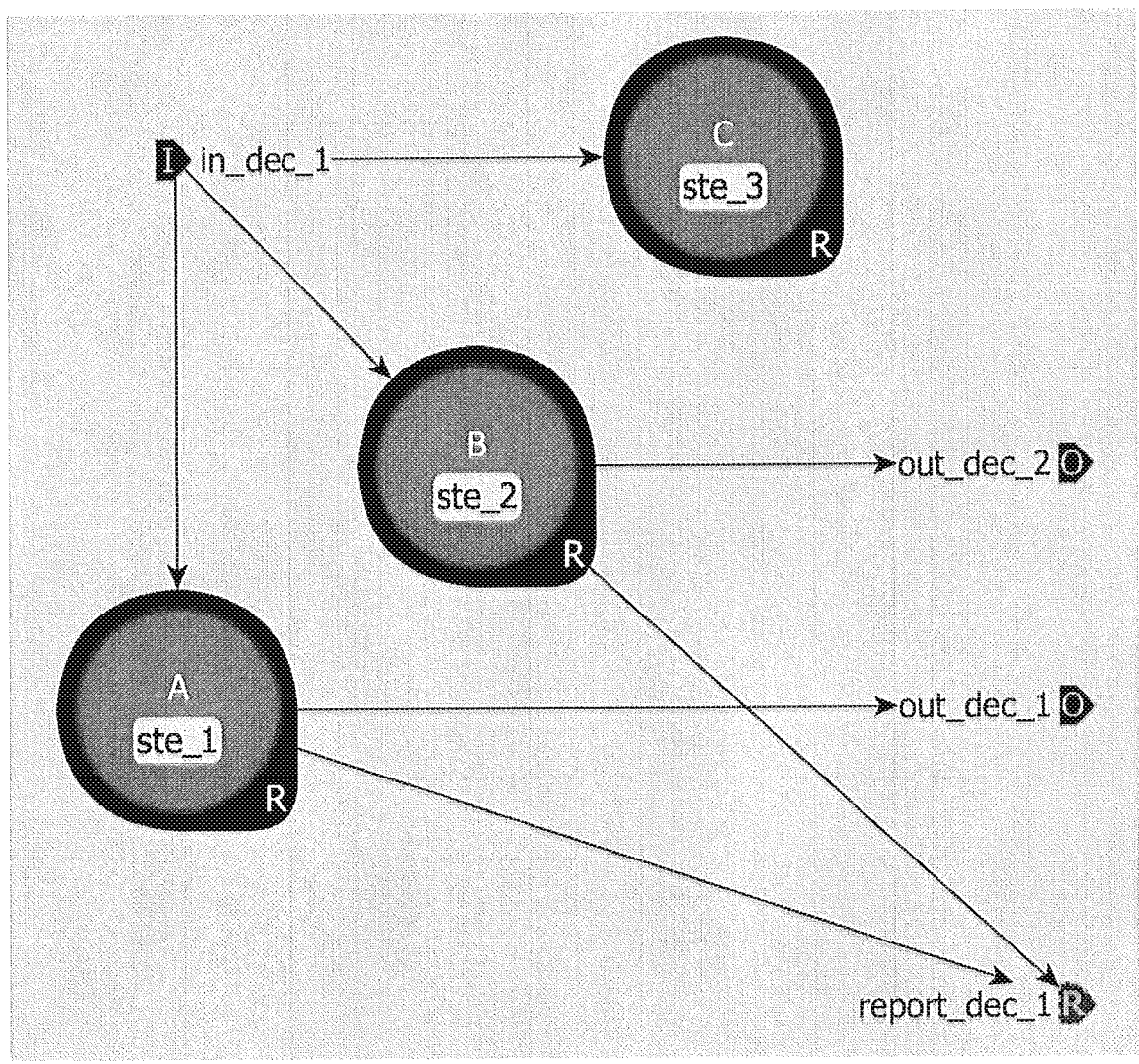
FIG. 67 illustrates an example of macro functions as constructed in AP Workbench, according to various embodiments.

The macro functions accordingly may be defined as follows (e.g., a Macro in the AP Workbench, as illustrated in FIG. 67).

This section describes the default reporting behavior of ANML macros. Report events are associated with the macro that contains the reporting elements. For example, in an automata network containing only a single macro reference, and with that macro not instantiating any other macros, reporting occurs at the macro reference level.

Suppose an STE within this macro generated a report event. That report event would not be associated with the STE. Rather, the report event would appear as a report event associated with macro instance that contains the STE. The same concept applies for counter and Boolean elements contained within the macro. According to one or more embodiments, all report events are associated with the macro that contains the reporting elements.

Nested macros are allowed, and the same principle applies when a report event is generated at any hierarchical level within a set of nested macros. The report event can rise to the top of the macro hierarchy, and will be associated with the top-most macro that contains the element that generated the report event. If multiple report events are generated within a macro hierarchy, all of these report events can aggregate together into a single report event associated with the top-most macro reference. This occurs even if the individual report events occur at different hierarchical levels within the macro hierarchy. In effect, the default behavior of a macro reference is to aggregate together all child report events at all levels of depth in the hierarchy.

A report port—a type of port declaration in a macro definition—provides a way to capture report events within a macro and associate them with a port. When these report events are presented, they are specifically associated with the containing macro instance and the port to which they are connected. Different reporting resources within a macro can be connected to different report ports, and therefore can be distinguished from each other rather than being grouped together under the generic macro reference. Multiple reporting resources within a macro can be connected to the same report port. Not all reporting elements within a macro need be connected to a report port. It is possible to have some elements that report but are not connected to a report port. Any reporting elements not connected to a report port take on the default behavior and report at the macro level, as described in the Default Reporting Behavior section. Those connected to the report port will behave according to the report port description.

In some instances it may be desirable to group different report nodes together. For example, consider salutations where you want an automata network that generates a report event when the text "cheers," "cordially," "respectfully," "sincerely," and so forth is detected. Specific automata could be constructed to search for each of these individual phrases; however, it would be helpful to group together all of the report events so that whenever a closing statement is found (regardless of which one) a single "closing statement found" report event is created. According to one or more embodiments, two methods are available for creating a grouping of report events; use of report codes and use of macro report posts.

A report code can be assigned to any reporting resource in an automata network. The report code is a number larger than 0x80000000. Multiple automata resources can be assigned the same report code. For resources within a macro, a report port can be used to group together different reporting resources. Any number of reporting resources can be connected to a single report port. When any of these resources generates a report event, the report event will be associated with the macro instance and the specific report port to which the reporting element is connected.

A report event can be presented as a two-element list. The first item in the list can be the report code. The second element in the list can be the ID of the reporting element (as illustrated in Table 8). In the case of a macro, this is a string of the format macro:report-port.

TABLE 8

| Report Event Format | |
| --- | --- |
| Non-macro reports | ( [reportcode], id) |
| Macro reports | ( [reportcode], macro reference id[:report-port id]) |

If there is no report code, that part of the two-element list will be empty. The second part of the two-element list will always be populated. In the case where a canonical resource is generating the report event, the ID of that resource will be the second element of the list. In the case where the reporting element is contained within a macro, the top-level macro ID will be the second element of the list. And if the reporting resource is connected to a report port, the macro ID will be followed by a semicolon, followed by the report port ID.

If there are reporting resources that are related to each other, they can all connect to the same report port. Therefore, the report port can aggregate together a set of reporting resources, and if any of them report, the report event will be associated with the containing macro reference and the port to which they are connected.

One pathological case is possible: Different reporting elements within a macro could be assigned different report codes, but they could all be tied to the same report port of that macro. (For instance, they all recognized the same input symbol, and that symbol was presented in the input stream.) All of these reporting elements would match the input symbol, and that would trigger the creation of a report event where the macro reference ID and the report-port were known, but the report code could legitimately be any one of the different report codes assigned to the different resources. In this case, the actual report code presented is undefined. This type of inconsistency should be avoided. However, having distinct report codes implies the designer wants to distinguish these report events separate from each other. But the designer has also tied all of the elements to the same report port in the macro, implying the reports should be grouped together.

Figure 68:
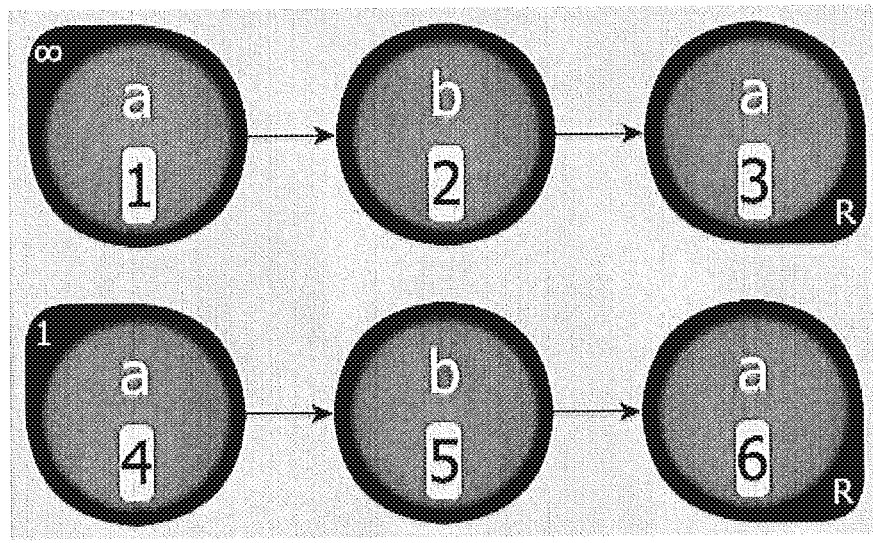
FIG. 68 illustrates an example of a single input automata network, according to various embodiments.

The following example shows two similarly constructed single input automata networks: one with the all-input attribute and the other with the start-of-data attribute. The first STE in the first automaton receives all input symbols. If, at the start of data the input sequences baba is seen, the automaton will generate an output signal from STE 3 on the last symbol. The second automaton will not generate an output signal if the input sequence baba is seen because STE 4 remains deactivated after failing to match the first symbol b. An example of the single input automata networks is illustrated below (in both text and graphical form in FIG. 68).

```
<state-transition-element id="1" symbol-set="a" start="all-input">
    <activate-on-match element="2"/>
</state-transition-element>
<state-transition-element id="2" symbol-set="b">
    <activate-on-match element="3"/>
</state-transition-element>
<state-transition-element id="3" symbol-set="a">
    <report-on-match/>
</state-transition-element>
<state-transition-element id="4" symbol-set="a" start="start-of-data">
    <activate-on-match element="5"/>
</state-transition-element>
<state-transition-element id="5" symbol-set="b">
    <activate-on-match element="6"/>
</state-transition-element>
<state-transition-element id="6" symbol-set="a">
    <report-on-match/> <
/state-transition-element>
```

Any STE may be designated to respond to input, whether continuously (all-input) or on the first input symbol (start-of-data). This may be a substantial design convenience compared to formal finite automata, which only permits a single state to be designated as the start state.

Figure 69:
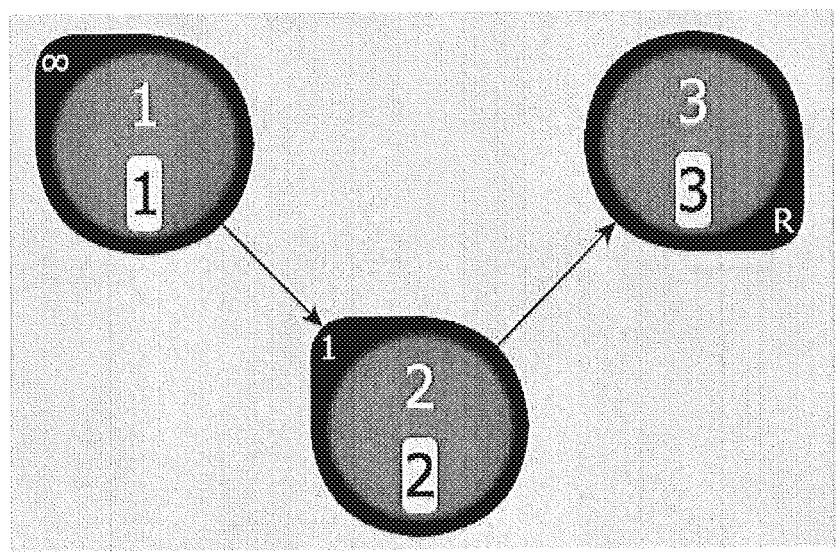
FIG. 69 illustrates an example of a multiple input automata network, according to various embodiments.

In the following example, STE 1 examines all input and STE 2 is activated on the first input symbol; STE 2 can also be activated by STE 1 when it recognizes a symbol. Any input stream containing 123 will generate an output signal from STE 3 and the sequence 23, where the 2 seen at start-of-data will also generate an output report from STE 3. An example of a multiple input automaton network is illustrated below (in both text and graphical form in FIG. 69).

```
<state-transition-element id="1" symbol-set="1" start="all-input">
    <activate-on-match element="2"/>
</state-transition-element>
<state-transition-element id="2" symbol-set="2" start="start-of-data">
    <activate-on-match element="3"/>
</state-transition-element>
<state-transition-element id="3" symbol-set="3">
    <report-on-match/>
</state-transition-element>
```

Figure 70:
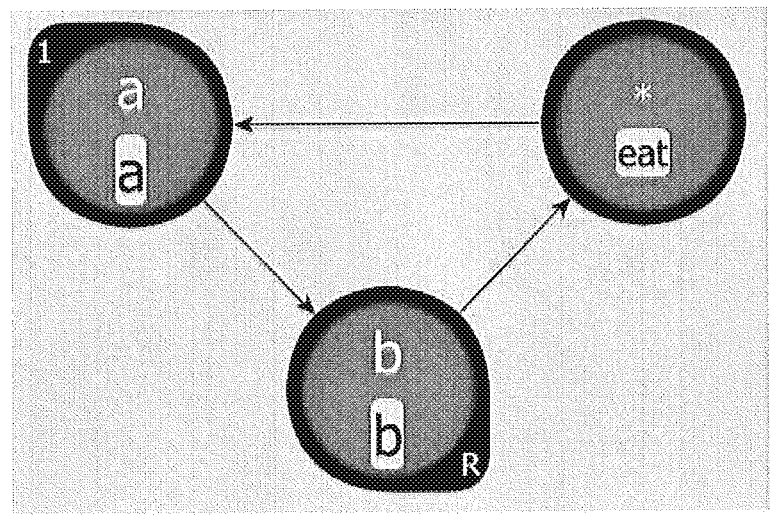
FIG. 70 illustrates an example of a single reporting automaton, according to various embodiments.

In the following example, STE a is automatically activated at start-of-data, and if an a followed by a b is seen, an output report will be generated by STE b. In this automaton, STE b not only reports, but it also activates STE eat. STE eat will match any character (wildcard) as long as there is still data in the input stream, and will activate STE a. This automaton reports match output when it sees an ab after start-of-data and will continue to report match output as long as it continues to see ab starting at every third input symbol. An example of a single reporting automaton is illustrated below (in both text and graphical form in FIG. 70).

```
<state-transition-element id="a" symbol-set="a" start="start-of-data">
    <activate-on-match element="b"/>
</state-transition-element>
<state-transition-element id="b" symbol-set="b">
    <report-on-match/>
    <activate-on-match element="eat"/>
</state-transition-element>
<state-transition-element id="eat" symbol-set="*">
    <activate-on-match element="a"/>
</state-transition-element>
```

Figure 71:
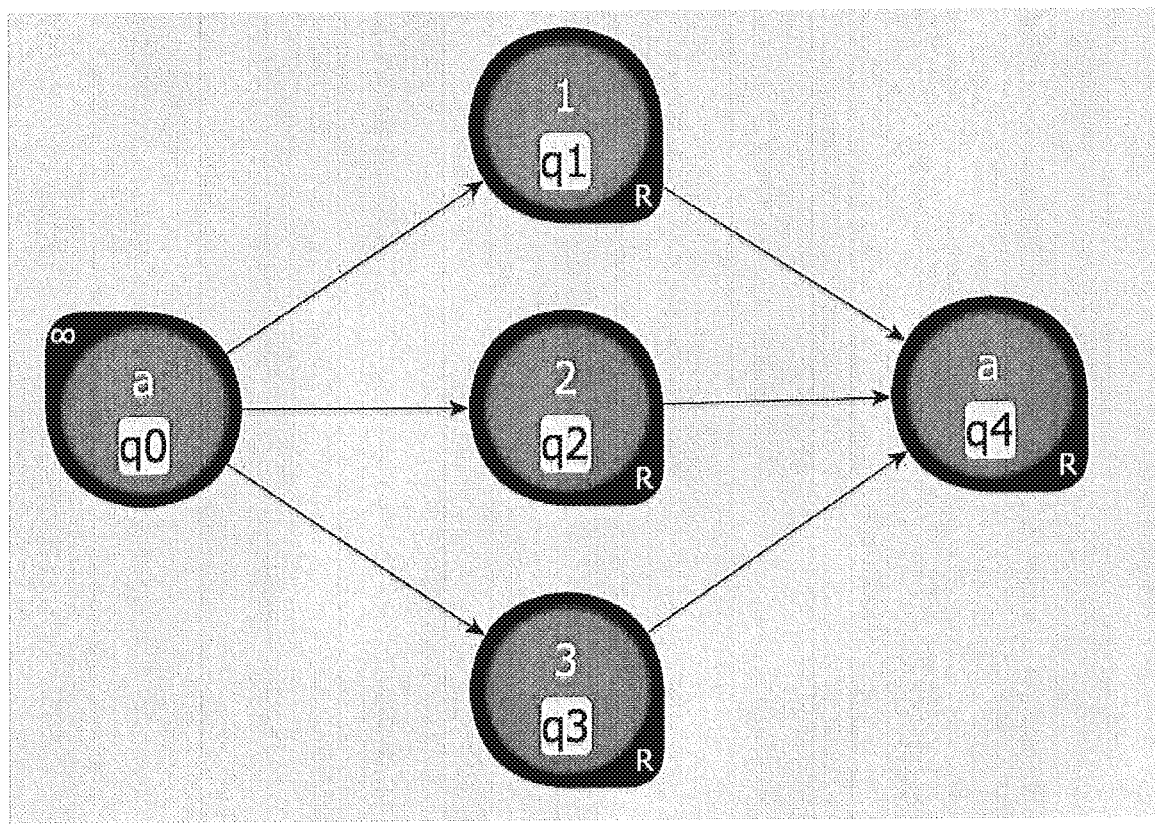
FIG. 71 illustrates an example of a multiple reporting automaton, according to various embodiments.

The following automaton recognizes a sequence containing an a followed by either a 1, 2, or 3 followed by an a, generating reports on both the second and final matching symbol of the sequence. A typical use for this kind of configuration is to provide path information. In the example, there are three possible paths to arrive at STE q4. A straightforward path is to generate a report within each possible path segment. STEs q1, q2, and q3 all generate a report on the same symbol/input cycle, so when a match at STE q4 occurs, the preceding input cycle will have produced a match from one and only of q1, q2 or q3. An example of a multiple reporting automaton is illustrated below (in both text and graphical form in FIG. 71).

```
<state-transition-element id="q0" symbol-set="a" start="all-input">
    <activate-on-match automaton="q1"/>
    <activate-on-match automaton="q2"/>
    <activate-on-match automaton="q3"/>
</state-transition-element>
<state-transition-element id="q1" symbol-set="1">
    <report-on-match/>
    <activate-on-match element="q4"/>
</state-transition-element>
<state-transition-element id="q2" symbol-set="2">
    <report-on-match/>
    <activate-on-match element="q4"/>
</state-transition-element>
<state-transition-element id="q3" symbol-set="3">
    <report-on-match/>
    <activate-on-match element="q4"/>
</state-transition-element>
<state-transition-element id="q4" symbol-set="a">
    <report-on-match/>
</state-transition-element>
```

Figure 72:
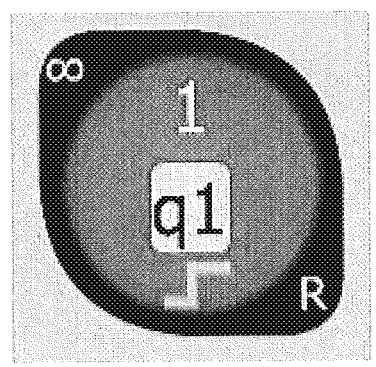
FIG. 72 illustrates an example of a latched report output, according to various embodiments.

Any STE may generate an output report, and any number of STEs in an automaton can be enabled for reporting. A semiconductor device implementing ANML may have restrictions either in the total number of or distribution of report-enabled STEs, but these potential restrictions are not an intrinsic part of ANML. A latched STE, after it matches a symbol set, may continue to assert external signals—output or activate—until it is reset. Three practical scenarios are a latched report output, a latched activate-on-match, and a latched report output and activate-on-match. In the following example (in both text and graphical form in FIG. 72), STE q1 reports on each symbol cycle after a 1 is seen in the input stream (e.g., illustrating a latched report output).

```
<state-transition-element id="q1" symbol-set="1" start="all-input"
    latch="true">
    <report-on-match/>
</state-transition-element>
```

Latched-report-output STEs continue to assert the report signal that causes a match report after they match a symbol set until reset. By contrast, an unlatched-report-output STE asserts the report signal only on the symbol cycle on which the symbol set is matched. Latched report output STEs may be useful in automata that need to simultaneously assert—at the end of a processing run—that some set of conditions has been satisfied at some point in the course of processing. A potential disadvantage of the latched STE is that report output information, after the reporting of output is latched, is generated at each symbol cycle, increasing the quantity of data that goes to match processing.

Figure 73:
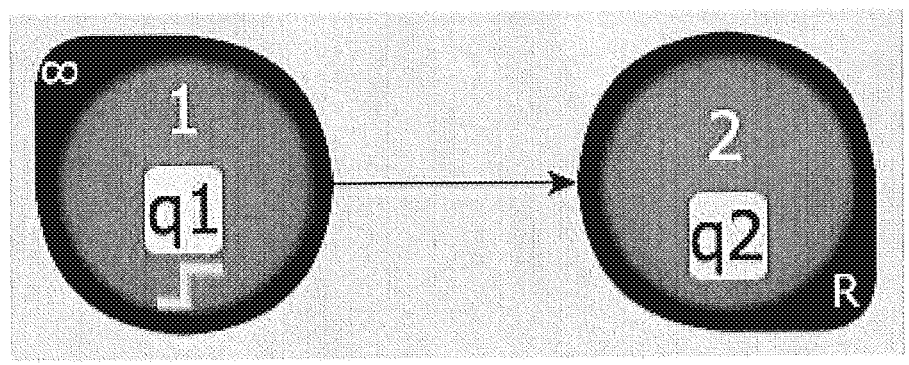
FIG. 73 illustrates an example of a latched STE with activate-on-match, according to various embodiments.

In the following example (in both text and graphical form in FIG. 73), STE q1 activates STE q2 after a 1 is seen in the input stream and STE q2 will report if a 2 subsequently appears in the input stream (e.g., to illustrate a latched STE with activate-on-match). In effect, there is a "Don't Care" condition for the input stream between an appearance of a 1 and subsequent appearance of a 2.

```
<state-transition-element id="q1" symbol-set="1" start="all-input" latch="true">
    <activate-on-match element="q2"/>
</state-transition-element>
<state-transition-element id="q2" symbol-set="2">
    <report-on-match/>
</state-transition-element>
```

Latched STEs with activate-on match continue to assert the activation signal after they match a symbol set until reset. By contrast, an unlatched STE with activate-on-match only activates connected STEs on the symbol cycle on which the symbol set is matched. Latched STEs with activate-on-match may be convenient to use in automata networks with "Don't Care" conditions between STEs.

Figure 74:
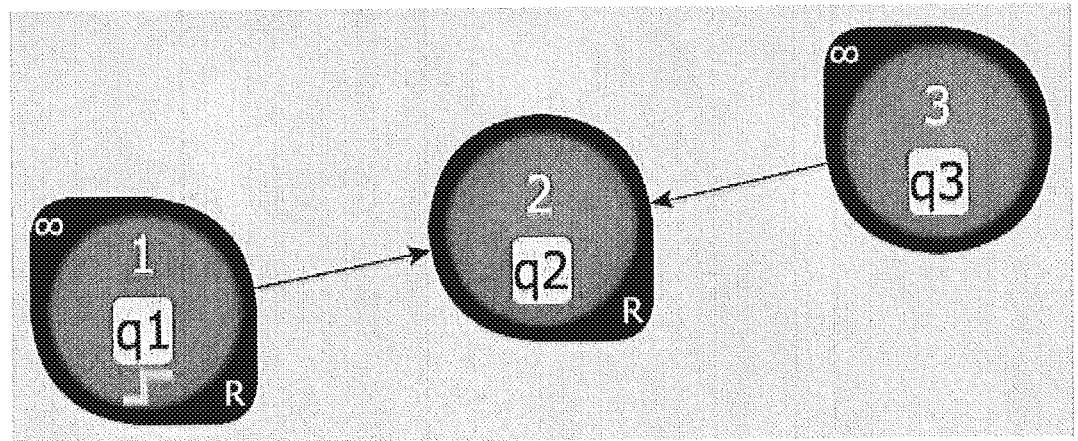
FIG. 74 illustrates an example of an STE with an activate-on-match and reporting latched, according to various embodiments.

In the following example (in both text and graphical form in FIG. 74), a report is generated if STE q2 activates STE q1, but not if q2 is activated through other paths such as that from q3 (e.g., a latched-report-output STE with activate-on-match). Latched-report-output STEs with activate-on-match continue to assert the report signal and activate connected STEs after they match a symbol set until reset. By contrast, a report-output STE with activate-on-match asserts the report signal and activates connected STEs only on the symbol cycle on which the symbol set is matched. An STE with both an activate-on-match and reporting latched may be useful in some complex automata networks.

```
<state-transition-element id="q1" symbol-set="1" start="all-input" latch="true">
    <report-on-match/>
    <activate-on-match element="q2"/>
</state-transition-element>
<state-transition-element id="q2" symbol-set="2">
    <report-on-match/>
</state-transition-element>
<state-transition-element id="q3" symbol-set="3" start="all-input">
    <activate-on-match-element="q2"/>
</state-transition-element>
```

Figure 75:
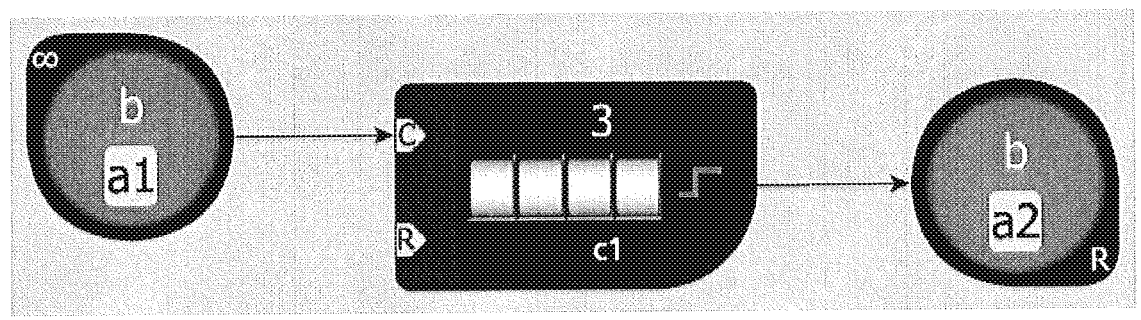
FIG. 75 illustrates an example of a network to count occurrences, according to various embodiments.

The automaton in the following example (in both text and graphical form in FIG. 75), uses a counter to recognize four bs in an input stream whereby the bs do not need to be in a consecutive sequence (e.g., to count occurrences). According to one or more embodiments, a counter does not examine the input symbols and does not match patterns; therefore, it is used in conjunction with STEs. The first STE, a1, should recognize a b and cause the counter to count, and the final STE, a2, generates output.

```
<state-transition-element id="a1" symbol-set="b" start="all-input">
    <activate-on-match-automaton="c1"/>
</state-transition-element>
```

```
<counter countone="c1" reset="r1" target="3" at_target="latch">
    <activate-on-target element="a2"/>
</counter>
<state-transition-element id="a2" symbol-set="b">
    <report-on-match/>
</state-transition-element>
```

The counter receives input from the elements connected to it, modifies its internal state, and has its output latched all within the same cycle used by the input STEs to evaluate the input against its symbol set. It may be helpful to think of a counter and all the STEs that input to it as a single device. The operation of this automaton is provided in detail, cycle-per-cycle, in the table below. The input stream is bbbb. STE a1 is always activated, as indicated with the all-input start attribute. Table 9 illustrates examples of counting automata network behavior.

TABLE 9

Counting Automata Network Behavior

| Symbol Cycle | Input Symbol | Actions |
|---|---|---|
| | | Input stream: bbbb |
| 1 | b | 1. a1 is active. |
| | | 2. a1 matches the b input symbol, driving an activation signal to c1. |
| | | 3. c1 count advances. |
| 2 | b | 1. a1 is active. |
| | | 2. a1 matches the b input symbol, driving an activation signal to c1. |
| | | 3. c1 count advances. |
| 3 | b | 1. a1 is active. |
| | | 2. a1 matches the b input symbol, driving an activation signal to c1. |
| | | 3. c1 count advances to target, driving an activation signal to a2. |
| 4 | b | 1. a1 is active. |
| | | 2. a1 matches the b input symbol, driving an activation signal to c1. |
| | | 3. c1 count remains at target (no reset). |
| | | 4. a2 is reactivated because of c1 latch setting. c1 drives an activation signal to a2, causing output. |

Figure 76:
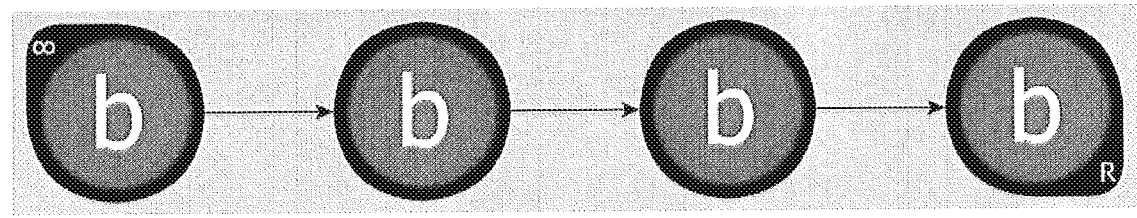
FIG. 76 illustrates an example of a counting automata network, according to various embodiments.

This example could also be constructed using STEs only. Given the low target value, an STE-only implementation might be a better use of resources on a semiconductor implementation. However, the equivalent STE-only design is likely more complicated. FIG. 76 demonstrates a design that implements this example with STEs only: one that does not follow a very simple automaton.

Figure 77:
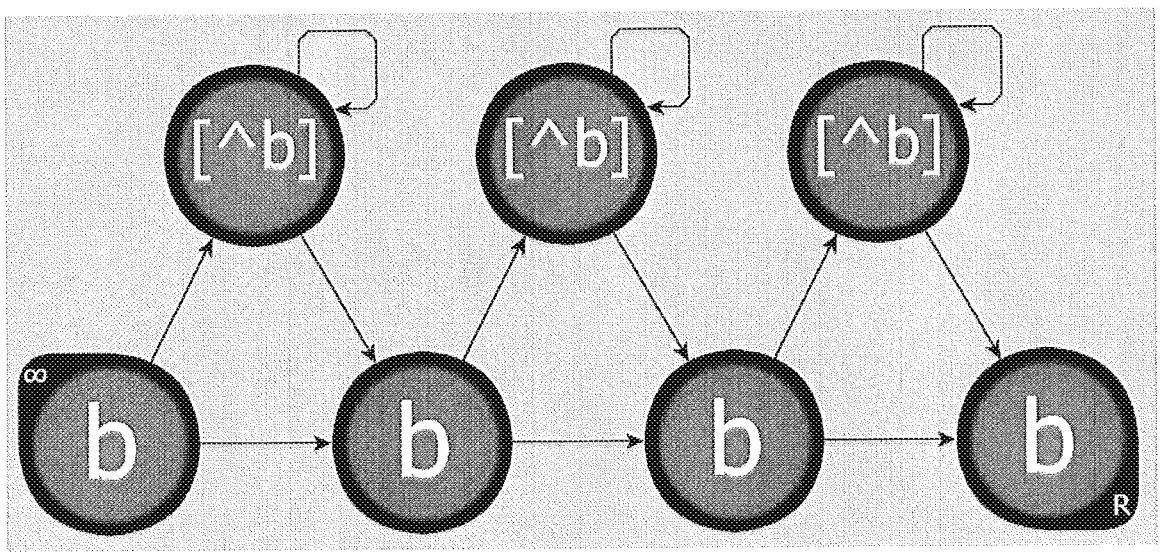
FIG. 77 illustrates a second embodiment of a counting automata network, according to various embodiments.
Figure 78:
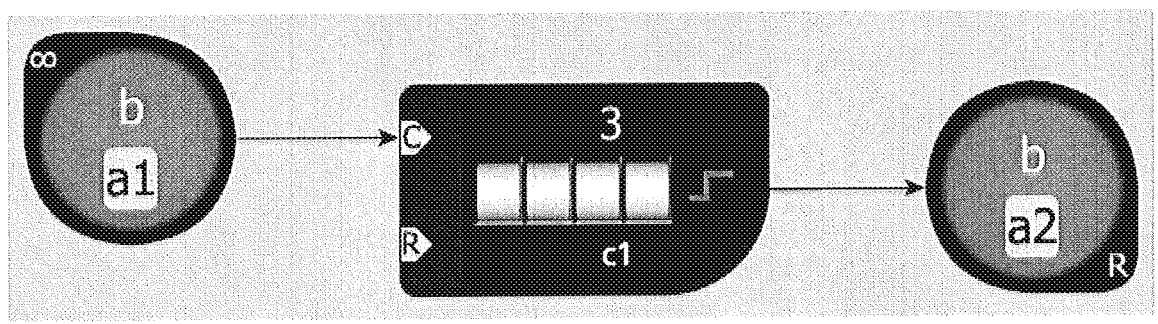
FIG. 78 illustrates a third embodiment of a counting automata network, according to various embodiments.

FIG. 77 illustrates the operation of the example counter machine on a input stream with a mixture of bs and non-bs. FIG. 78 illustrates a sample counting automata network as another example of the original automaton, this time with input bxxbbbxb:

TABLE 10

Sample Counting Automata Network Behavior

| Symbol Cycle | Input Symbol | Actions |
|---|---|---|
| | | Input stream: bxxbbbxb |
| 1 | b | 1. a1 is active. |
| | | 2. a1 matches the b input symbol, driving an activation signal to c1. |
| | | 3. c1 count advances. |

TABLE 10-continued

Sample Counting Automata Network Behavior

| Symbol Cycle | Input Symbol | Actions |
|---|---|---|
| | | Input stream: bxxbbbxb |
| 2 | x | |
| 3 | x | |
| 4 | b | 1. a1 is active.<br>2. a1 matches the b input symbol, driving an activation signal to c1.<br>3. c1 count advances. |
| 5 | b | 1. a1 is active.<br>2. a1 matches the b input symbol, driving an activation signal to c1.<br>3. c1 count advances to target, driving an activation signal to a2. |
| 6 | b | 1. a1 is active.<br>2. a1 matches the b input symbol, driving an activation signal to c1.<br>3. c1 count remains at target (no reset).<br>4. a2 is reactivated because of c1 latch setting.<br>5. c1 drives an activation signal to a2, causing output. |
| 7 | x | 1. c1 count remains at target (no reset).<br>2. a2 is reactivated because of c1 latch setting. |
| 8 | b | 1. a1 is active.<br>2. a1 matches the b input symbol, driving an activation signal to c1.<br>3. c1 count remains at target (no reset).<br>4. a2 is reactivated because of c1 latch setting.<br>5. c1 drives an activation signal to a2, causing output. |

Figure 79:
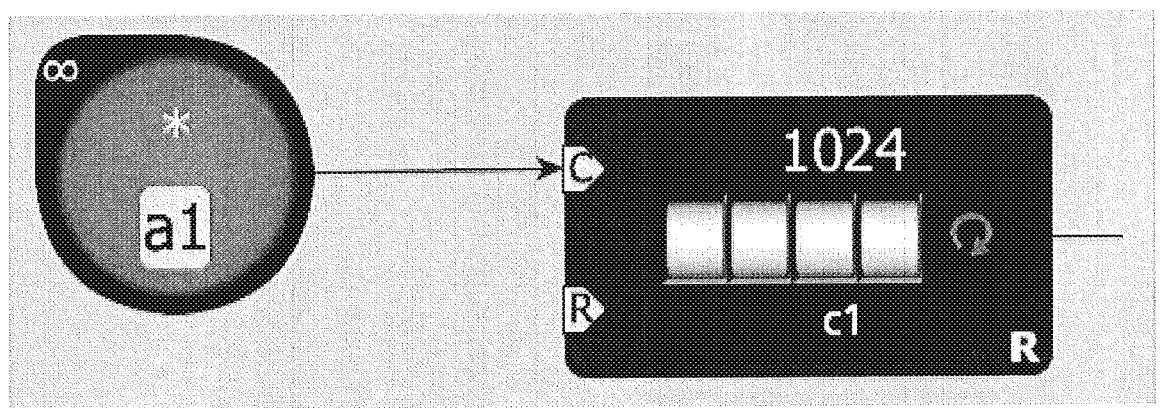
FIG. 79 illustrates an example of a counting report as constructed in AP Workbench, according to various embodiments.

The following is a simple automaton (FIG. 79) of a counter report for a report that is generated on every 1024th input symbol. The report is associated with the counter countone id c1.

```
<state-transition-element id="a1" symbol-set="*" start="all-input">
    <activate-on-match-element="c1"/>
</state-transition-element>
<counter countone="c1" reset="r1" target="1024" at_target="rollover">
    <report-on-target/>
</counter>
```

Figure 80:
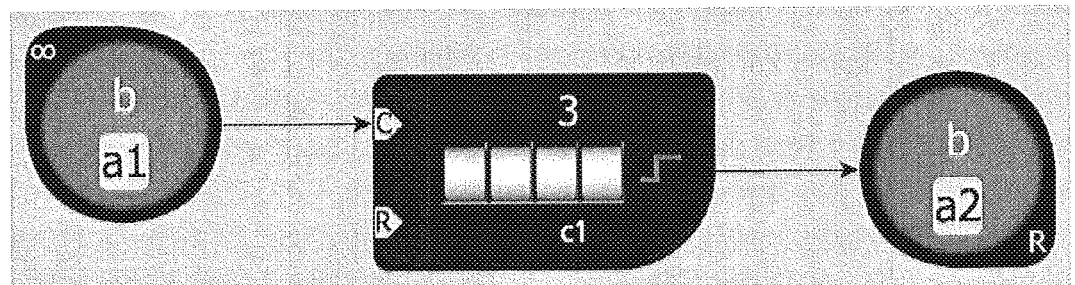
FIG. 80 illustrates an example of a counter latch mode as constructed in AP Workbench, according to various embodiments.

In the example below, the following stream of input symbols is submitted against each STE:
bxxbbbxbbbbb The automaton (FIG. 80) of a counter latch mode generates a match report from STE a2 on receipt of the fourth, fifth, sixth, seventh, eighth, and ninth b.

```
<state-transition-element id="a1" symbol-set="b" start="all-input">
    <activate-on-match-element="c1"/>
</state-transition-element>
<counter countone="c1" reset="r1" target="3" at_target="latch">
    <activate-on-target element="a2"/>
</counter>
<state-transition-element id="a2" symbol-set="b">
    <report-on-match/>
</state-transition-element>
```

TABLE 11

Cycle-by-Cycle Analysis: Counter Latch Mode

| Symbol Cycle | Input Symbol | Actions |
|---|---|---|
| 1 | b | 1. a1 is active.<br>2. a1 matches the b input symbol, driving an activation signal to c1.<br>3. c1 count advances. |
| 2 | x | |
| 3 | x | |
| 4 | b | 1. a1 is active.<br>2. a1 matches the b input symbol, driving an activation signal to c1.<br>3. c1 count advances. |
| 5 | b | 1. a1 is active.<br>2. a1 matches the b input symbol, driving an activation signal to c1.<br>3. c1 count advances to target, driving an activation signal to a2. |
| 6 | b | 1. a1 is active.<br>2. a1 matches the b input symbol, driving an activation signal to c1.<br>3. c1 count remains at target (no reset).<br>4. a2 is activated because of the latch setting. |
| 7 | x | 1. c1 count remains at target (no reset).<br>2. a2 is activated because of the latch setting. |
| 8 | b | 1. a1 is active.<br>2. a1 matches the b input symbol, driving an activation signal to c1.<br>3. a2 causing output c1 count remains at target (no reset).<br>4. a2 is activated because of the latch setting. |
| 9 | b | 1. a1 is active.<br>2. a1 matches the b input symbol, driving an activation signal to c1.<br>3. a2 causing output c1 count remains at target (no reset).<br>4. a2 is activated because of the latch setting. |
| 10 | b | 1. a1 is active.<br>2. a1 matches the b input symbol, driving an activation signal to c1.<br>3. a2 causing output c1 count remains at target (no reset).<br>4. a2 is activated because of the latch setting. |
| 11 | b | 1. a1 is active.<br>2. a1 matches the b input symbol, driving an activation signal to c1.<br>3. a2 causing output c1 count remains at target (no reset).<br>4. a2 is activated because of the latch setting. |
| 12 | b | 1. a1 is active.<br>2. a1 matches the b input symbol, driving an activation signal to c1.<br>3. a2 causing output c1 count remains at target (no reset).<br>4. a2 is activated because of the latch setting. |

Figure 81:
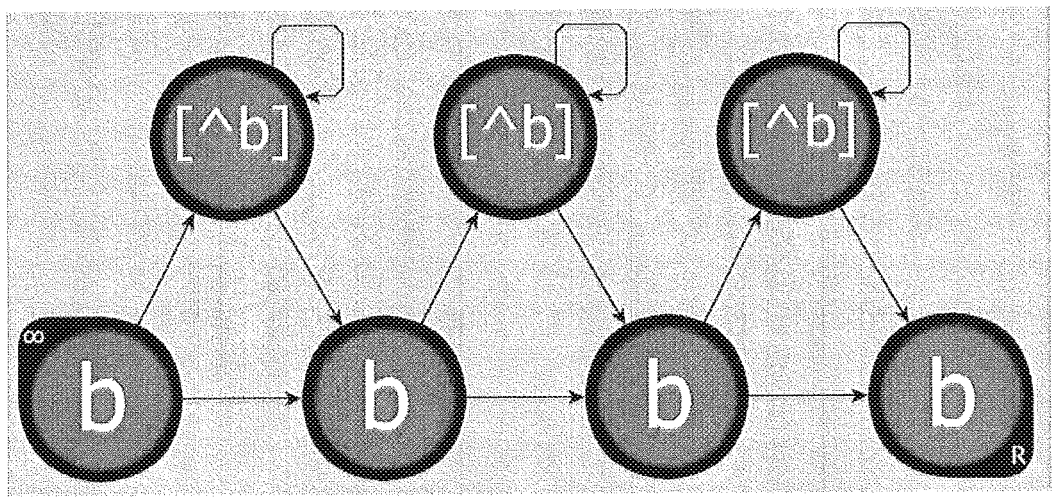
FIG. 81 illustrates an example of an STE-Only counter latch mode, according to various embodiments.

FIG. 81 as a STE-Only Equivalent: counter latch mode demonstrates a design that implements this example with STEs only.

Figure 82:
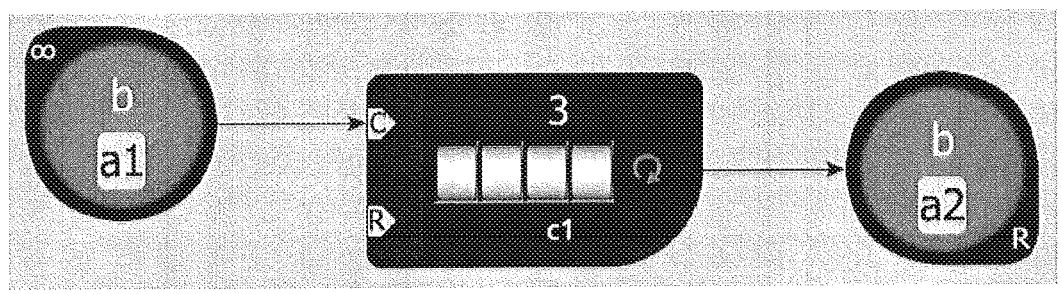
FIG. 82 illustrates an example of a counter pulse mode as constructed in AP Workbench, according to various embodiments.

In the following example, the automaton in FIG. 82 as a counter pulse mode generates a match report only on the fourth b, essentially shutting off after the first time the counter activates STE a2. This automaton uses the start-of-data attribute instead of the all-input attribute because it will not recognize subsequent sequences after the counter reaches the target the first time, and additional input should not be propagated through the automaton after that occurs.

An STE with a [^b] character class with a start-of-data attribute is also added to enable the automaton to work in the case where the first symbol is not b. This automaton is only language-equivalent instead of simply equivalent to the version using a counter because, in the counter version, the first STE is continually activated because of the all-input start while in the STE-only version, the STE (which recognizes the first b) can only be activated once. The two automata do, however, generate output on the same set of input sequences. The input stream may be:
bxxbbbxbbbbb

```
<state-transition-element id="a1" symbol-set="b" start="all-input">
    <activate-on-match-element="c1"/>
</state-transition-element>
<counter countone="c1" reset="r1" target="3" at_target="pulse">
    <activate-on-target element="a2"/>
</counter>
<state-transition-element id="a2" symbol-set="b">
    <report-on-match/>
</state-transition-element>
```

TABLE 12

Cycle-by-Cycle Analysis: Pulse Mode

| Cycle | Input Symbol | Actions |
|---|---|---|
| 1 | b | 1. a1 is active.<br>2. a1 matches the b input symbol, driving an activation signal to c1.<br>3. c1 count advances. |
| 2 | x | |
| 3 | x | |
| 4 | b | 1. a1 is active.<br>2. a1 matches the b input symbol, driving an activation signal to c1.<br>3. c1 count advances. |
| 5 | b | 1. a1 is active.<br>2. a1 matches the b input symbol, driving an activation signal to c1.<br>3. c1 count advances to target, driving an activation signal to a2. |
| 6 | b | 1. a1 is active.<br>2. a1 matches the b input symbol, driving an activation signal to c1.<br>3. a2 causing output c1 count remains at target (no reset).<br>4. a2 is not activated because of the pulse setting. |
| 7 | x | 1. c1 count remains at target (no reset).<br>2. a2 is not activated because of the pulse setting. |
| 8 | b | 1. a1 is active.<br>2. a1 matches the b input symbol, driving an activation signal to c1.<br>3. c1 count remains at target (no reset).<br>4. No output from a2 because it was not activated. |
| 9 | b | 1. a1 is active.<br>2. a1 matches the b input symbol, driving an activation signal to c1.<br>3. c1 count remains at target (no reset).<br>4. No output from a2 because it was not activated. |
| 10 | b | 1. a1 is active.<br>2. a1 matches the b input symbol, driving an activation signal to c1.<br>3. c1 count remains at target (no reset).<br>4. No output from a2 because it was not activated. |
| 11 | b | 1. a1 is active.<br>2. a1 matches the b input symbol, driving an activation signal to c1.<br>3. c1 count remains at target (no reset).<br>4. No output from a2 because it was not activated. |
| 12 | b | 1. a1 is active.<br>2. a1 matches the b input symbol, driving an activation signal to c1.<br>3. c1 count remains at target (no reset).<br>4. No output from a2 because it was not activated. |

Figure 83:
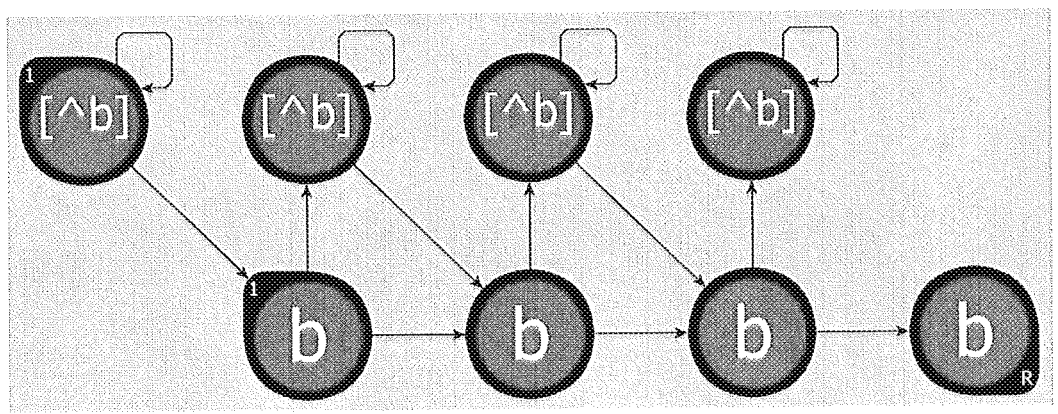
FIG. 83 illustrates an example of an STE-Only counter pulse mode, according to various embodiments.

FIG. 83 as a STE-Only Equivalent: counter pulse mode demonstrates a design that implements this example with STEs only.

Figure 84:
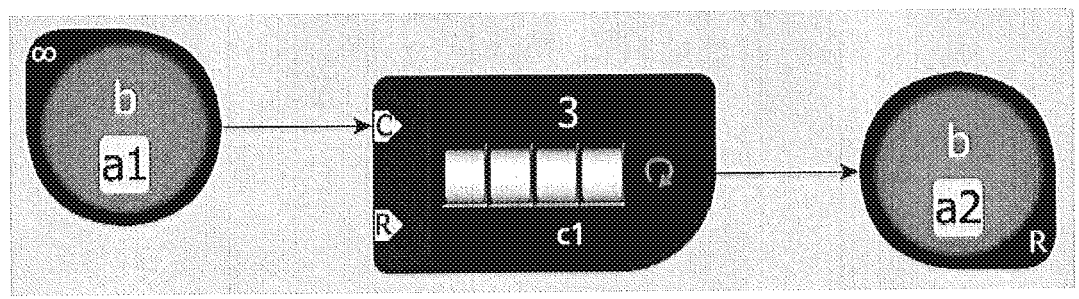
FIG. 84 illustrates an example of a counter roll mode as constructed in AP Workbench, according to various embodiments.

In the following example, the automaton in FIG. 84 as a counter roll mode generates a match report from STE a2 on receipt of the fourth b and seventh b in the symbol cycle. Four bs are needed to generate the first match report; however, only three are needed for the second report because the fourth b is both the last of the first sequence and the first of next sequence.

Similar to the pulse counter example, this automaton uses the start-of-data attribute instead of the all-input attribute to avoid having bs cascade into STE a2 after the first pass through the counter. However, because of the roll mode, the automaton should restart the count sequence after the first b is seen after the count reset.

An STE with a [^b] character class with the start-of-data attribute is also added to enable the automaton to work in the case where the first symbol is not b. This automaton is language-equivalent only instead of simply equivalent to the version using a counter because in the counter version, the first STE is continually activated because of the all-input start. In the STE-only version, the STE that recognizes the first b can be activated only once. The two automata do, however, generate output on the same set of input sequences. The input stream may be:
bxxbbbxbbbbb

```
<state-transition-element id="a1" symbol-set="b" start="all-input">
    <activate-on-match-element="c1"/>
</state-transition-element>
<state-transition-element id="a2" symbol-set="b">
    <report-on-match/>
</state-transition-element>
```

TABLE 13

Cycle-by-Cycle Analysis: Roll Mode

| Cycle | Input Symbol | Actions |
|---|---|---|
| 1 | b | 1. a1 is active.<br>2. a1 matches the b input symbol, driving an activation signal to c1.<br>3. c1 count advances. |
| 2 | x | |
| 3 | x | |
| 4 | b | 1. a1 is active.<br>2. a1 matches the b input symbol, driving an activation signal to c1.<br>3. c1 count advances. |
| 5 | b | 1. a1 is active.<br>2. a1 matches the b input symbol, driving an activation signal to c1.<br>3. c1 count advances to target, driving an activation signal to a2.<br>4. c1 count resets. |
| 6 | b | 1. a1 is active.<br>2. a1 matches the b input symbol, driving an activation signal to c1.<br>3. c1 count advances to target.<br>4. a2 is not activated because of the roll mode.<br>5. a2 causes output. |
| 7 | x | |
| 8 | b | 1. a1 is active.<br>2. a1 matches the b input symbol, driving an activation signal to c1.<br>3. c1 count advances to target.<br>4. No output from a2 because it was not activated. |
| 9 | b | 1. a1 is active.<br>2. a1 matches the b input symbol, driving an activation signal to c1.<br>3. c1 count advances to target, driving an activation signal to a2.<br>4. C1 count resets. |
| 10 | b | 1. a1 is active.<br>2. a1 matches the b input symbol, driving an activation signal to c1.<br>3. c1 count advances to target. |

TABLE 13-continued

Cycle-by-Cycle Analysis: Roll Mode

| Cycle | Input Symbol | Actions |
|---|---|---|
| | | 4. a2 is not activated because of the roll mode. |
| | | 5. a2 causes output. |
| 11 | b | 1. a1 is active. |
| | | 2. a1 matches the b input symbol, driving an activation signal to c1. |
| | | 3. c1 count advances. |
| 12 | b | 1. a1 is active. |
| | | 2. a1 matches the b input symbol, driving an activation signal to c1. |
| | | 3. c1 count advances to target, driving an activation signal to a2. |
| | | 4. c1 count resets. |

Figure 85:
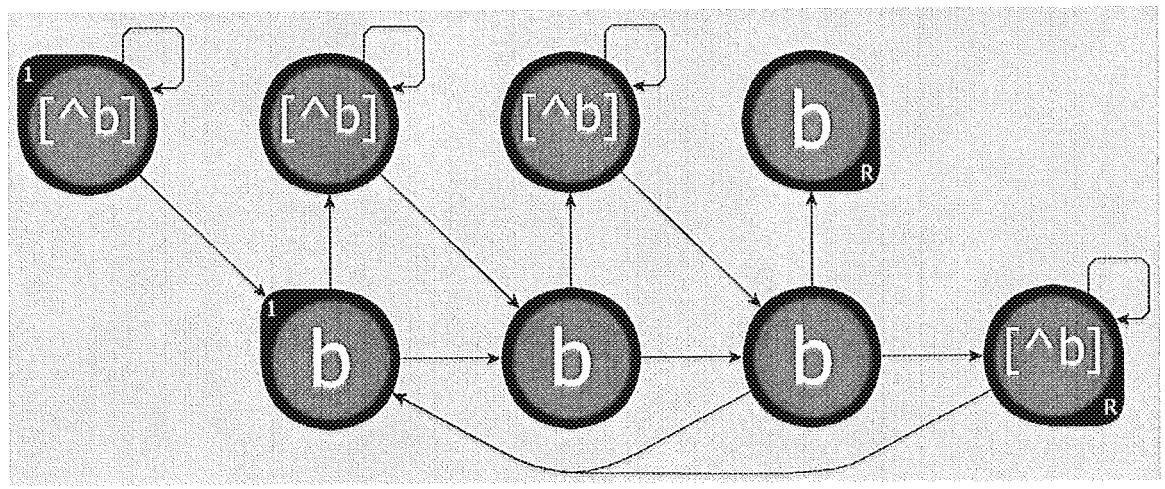
FIG. 85 illustrates an example of an STE-Only counter roll mode, according to various embodiments.

FIG. 85 as a STE-Only Equivalent: counter roll mode demonstrates a design that implements this example with STEs only.

Figure 86:
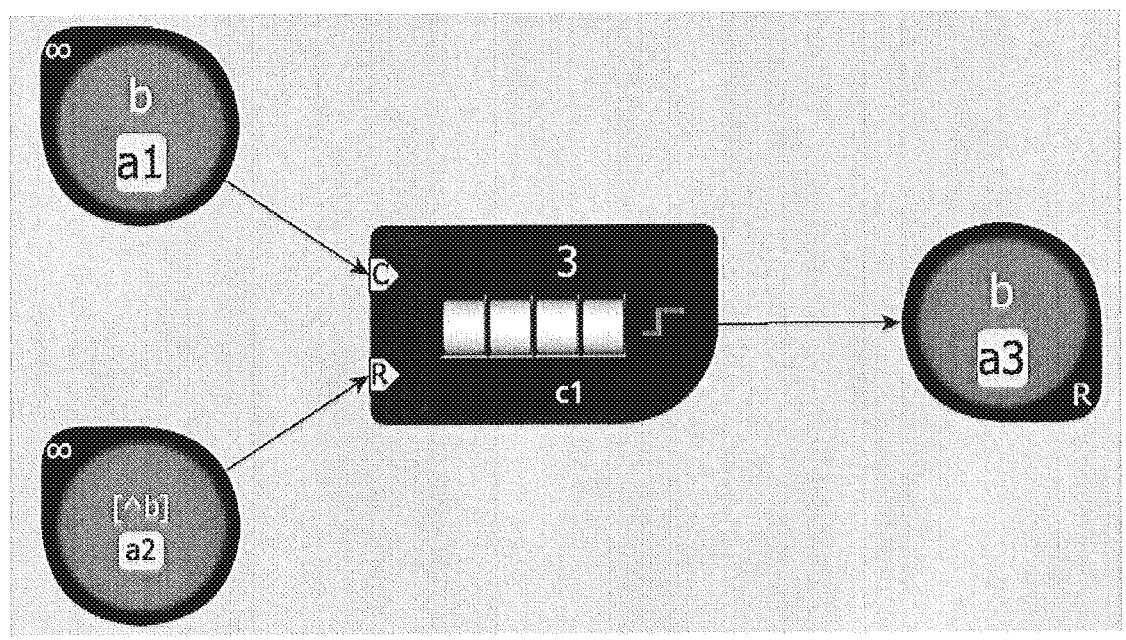
FIG. 86 illustrates an example of a reset and counting in sequence, according to various embodiments.

In a previous example, an automaton was constructed to count four bs but allowed non-b symbols to be interspersed between bs. FIG. 86 shows an automaton that counts only sequences of four consecutive bs using the counter reset. STE a2 examines each input symbol and resets the counter if a symbol which is not a b is seen. Reset causes the counter value to be restored to the initial value, restarting the count. The equivalent STE-only implementation follows with an input stream of:
bbbbbxbbbbxb

```
<state-transition-element id="a1" symbol-set="b" start="all-input">
    <activate-on-match element="c1"/>
</state-transition-element>
<state-transition-element id="a2" symbol-set="[^b]" start="all-input">
    <activate-on-match element="r1"/>
</state-transition-element>
<counter countone="c1" reset="r1" target="3" at_target="latch">
    <activate-on-target element="a3"/>
</counter>
<state-transition-element id="a3" symbol-set="b">
    <report-on-match/>
</state-transition-element>
```

TABLE 14

Cycle-by-Cycle Analysis: Reset and Counting in Sequence

| Cycle | Input Symbol | Actions |
|---|---|---|
| 1 | b | 1. a1 is active. |
| | | 2. a1 matches the b input symbol, driving an activation signal to c1. |
| | | 3. c1 count advances. |
| 2 | b | 1. a1 is active. |
| | | 2. a1 matches the b input symbol, driving an activation signal to c1. |
| | | 3. c1 count advances. |
| 3 | b | 1. a1 is active. |
| | | 2. a1 matches the b input symbol, driving an activation signal to c1. |
| | | 3. c1 count advances to target, driving an activation signal to a3. |
| | | 4. c1 count resets. |
| 4 | b | 1. a1 is active. |
| | | 2. a1 matches the b input symbol, driving an activation signal to c1. |
| | | 3. a3 causes output c1 count remains at target (no reset). |
| | | 4. a3 is activated. |

TABLE 14-continued

Cycle-by-Cycle Analysis: Reset and Counting in Sequence

| Cycle | Input Symbol | Actions |
|---|---|---|
| 5 | b | 1. a1 is active. |
| | | 2. a1 matches the b input symbol, driving an activation signal to c1. |
| | | 3. a3 causes output c1 count remains at target (no reset). |
| | | 4. a3 is activated. |
| 6 | x | 1. a2 matches the x input symbol, driving an activation signal to r1. |
| | | 2. c1 count resets. |
| | | 3. a3 is deactivated. |
| 7 | b | 1. a1 is active. |
| | | 2. a1 matches the b input symbol, driving an activation signal to c1. |
| | | 3. c1 count advances. |
| 8 | b | 1. a1 is active. |
| | | 2. a1 matches the b input symbol, driving an activation signal to c1. |
| | | 3. c1 count advances. |
| 9 | b | 1. a1 is active. |
| | | 2. a1 matches the b input symbol, driving an activation signal to c1. |
| | | 3. c1 count advances to target, driving an activation signal to a3. |
| | | 4. c1 count remains at target (no reset). |
| 10 | b | 1. a1 is active. |
| | | 2. a1 matches the b input symbol, driving an activation signal to c1. |
| | | 3. a3 matches the b input symbol, causing output. |
| | | 4. c1 count remains at target (no reset). |
| | | 5. a3 is active. |
| 11 | x | 1. a2 matches the x input symbol, driving an activation signal to r1. |
| | | 2. c1 count resets. |
| | | 3. a3 is deactivated. |
| 12 | b | 1. a1 matches the b input symbol, driving an activation signal to c1. |
| | | 2. c1 count advances. |

Figure 87:
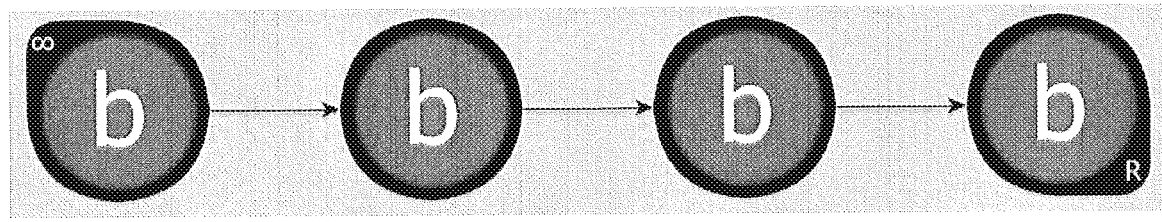
FIG. 87 illustrates an example of an STE-Only reset and counting in sequence, according to various embodiments.

FIG. 87 demonstrates a design that implements this example with STEs only as an STE-Only equivalent: reset and counting sequence.

Figure 88:
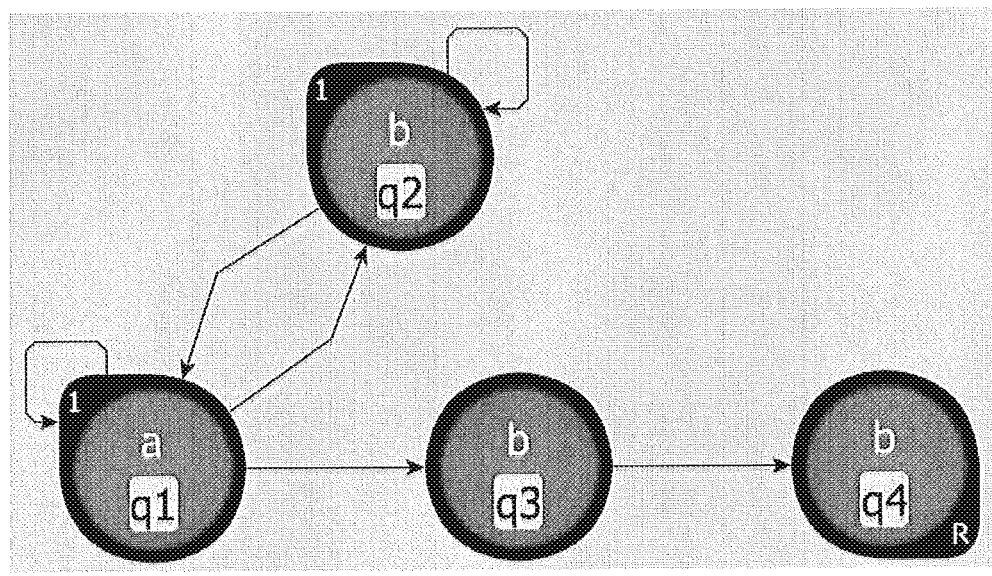
FIG. 88 illustrates an example of an automaton network as constructed in AP Workbench, according to various embodiments.
Figure 89:
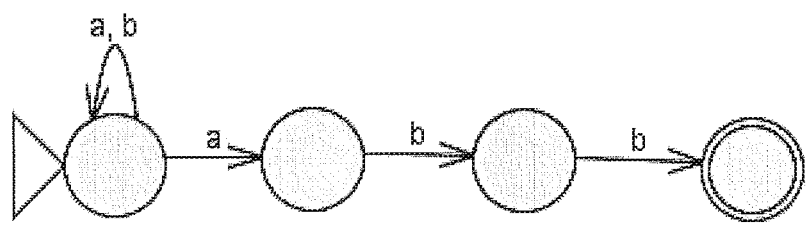
FIG. 89 illustrates an example of the network of FIG. 88 as non-deterministic automata (NFA), according to various embodiments.
Figure 90:
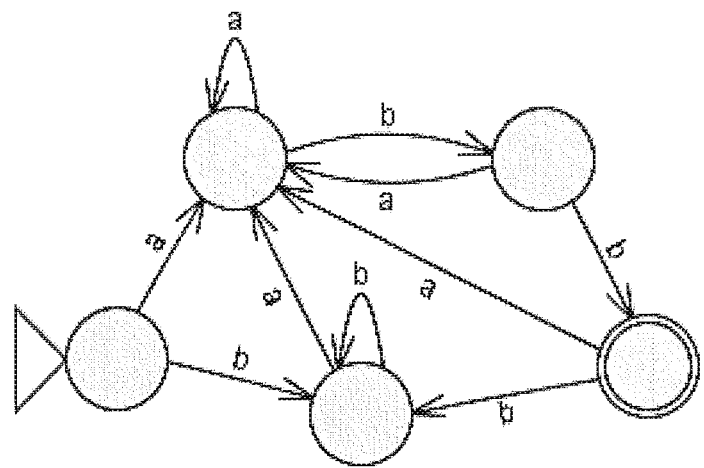
FIG. 90 illustrates an example of the network of FIG. 88 as deterministic automata (DFA), according to various embodiments.

As discussed earlier, automata can be non-deterministic, meaning multiple states can be active at the same time. To illustrate this principle, FIGS. 88-90 in this section compare an automaton network (ANML built in the AP workbench) (FIG. 88) with a classical non-deterministic automata (NFA) (FIG. 89), and a deterministic automata (DFA) (FIG. 90). The example automata identify words I, ice, it, in, and to.

Converting from NFA to ANML

In classical NFA, each edge transition, write all transitions in the following form f(source_state, input_symbol)!destination_state.

If source_state is a start state enclose it in parentheses, (source_state). If destination_state is an accept state enclose it in parentheses, destination_state)

Combine all transition statements where f(source_state, input_symbol) is identical and destination_states are of the same type (either not accept state or accept state) into a single statement with multiple destination_states. If f(source_state, input_symbol) is identical but one transition statement points to an accept state and another to a not accept state, the transitions statements should not be combined and an additional source_state will be added in the next step. For example, the following three statements are combined into a single statement:

f(source_state, input_symbol)→destination_state1
f(source_state, input_symbol)→destination_state2
f(source_state, input_symbol)→destination_state3
f(source_state, input_symbol)→destination_state1, destination_state2, destination_state3

For all transition statements where source_state is identical and the input_symbol is different, the source_state in each statement should be postponed by an incrementing count value in each successive transition statement. If the source_state was enclosed in parentheses, each rewritten source_state should also be enclosed in parentheses.

f(source_state, input_symbol1)→destination_state
f(source_state, input_symbol2)→destination_state The statements would be modified into two new transition statements:

f(source_state_0, input_symbol1)→destination_state
f(source_state_1, input_symbol2)→destination_state The destination_states with value equal to the source_states modified in the prior step should be changed to match the value of the new source_states, creating multiple destination_states for those transition statements which are modified. For example:

source_statex=destination_statey
and source_statex was changed in two transition statements to source_statex_0 and source_statex_1

Therefore, everywhere that destination_statey occurs should be changed to the two destinations with the values of source_statex_0 and source_statex_1

If a destination_state is also never a start_state, it does not match an input_symbol and can be removed from the transition expression. If such a destination_state is also an accept state the destination_state value should be removed but the empty parentheses retained.

Each transition statement will now become one ANML state transition element where the symbol-set attribute value is the input_symbol containing one activate-on-match element for each destination_state. The id attribute of the statetransition-element should be the source_state value, and if the source_state is in parentheses, the attribute and attribute value start="start-of-data" should be included in the state transition element.

Figure 91:
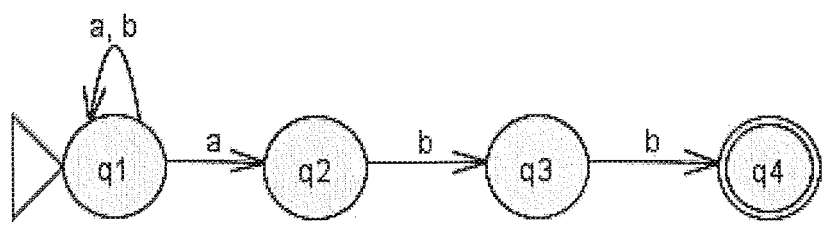
FIG. 91 illustrates an example of NFA to ANML conversion, according to various embodiments.

If the destination_state of the transition statement is enclosed in parentheses, the attribute and attribute value output="enabled" should be included in its state transition element, including empty destination_states created on the prior step. If, after removal of destination_states in the prior step there are no destination_states in a particular transition expression, there will be no activate-on-match elements nested in the state transition element. FIG. 91 illustrates an example of an NFA-to-ANML conversion.

NFA:
1. Write the NFA as transition expressions:
    f((q1), a)→q1f((q1), a)→q2 f((q1), b)→q1f(q2, b)→q3f(q3, b)→(q4)
2. Combine transition expressions with the same source_state, input_symbol:
    f((q1), a)→q1, q2f((q1), b)→q1f(q2, b)→q3f(q3, b)→(q4)
3. Rewrite source_state names to uniquely identify by input_symbol processed:
    f((q1-0), a)→q1, q2 f((q1-1), b)→q1f(q2, b)→q3f(q3, b)→(q4)
4. Rewrite destination_state names corresponding to the changes made to source_state:
    f((q1-0), a)→q1-0, q1-1, q2f((q1-1), b)→q1-0, q1-1f(q2, b)→q3f(q3, b)→(q4)
5. Remove destination_states that are never start_states:
    f((q1-0), a)→q1-0, q1-1, q2f((q1-1), b)→q1-0, q1-1f(q2, b)→q3f(q3, b)→( )
6. Each transition expression now describes an ANML state transition element:

```
<state-transition-element aid="q1-0" symbol-set="a" start="start-of-data">
<activate-on-match element="q1-0"/>
<activate-on-match element="q1-1"/>
<activate-on-match element="q2"/>
</state-transition-element>
<state-transition-element aid="q1-1" symbol-set="b" start="start-of-data">
<activate-on-match element="q1-0"/>
```

Figure 92:
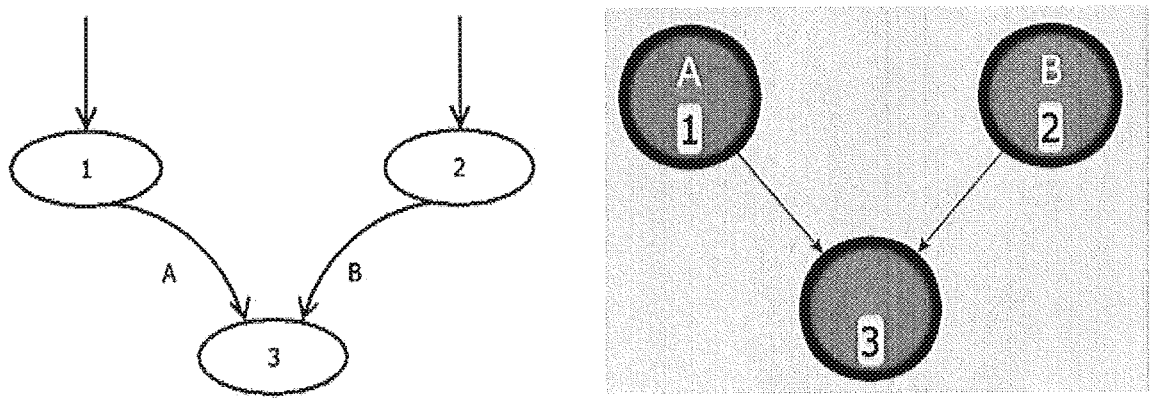
FIG. 92 illustrates an example of STE character recognition, according to various embodiments.

According to one or more embodiments, an STE can be programmed with only one distinct character set. This has subtle implications when working with complex state machines. For example, consider a traditional state machine with three states labeled 1, 2, and 3. State 1 transitions to state 3 with the input A, and state 2 transitions to state 3 with the input B, illustrated as STE character recognition in FIG. 92.

Figure 93:
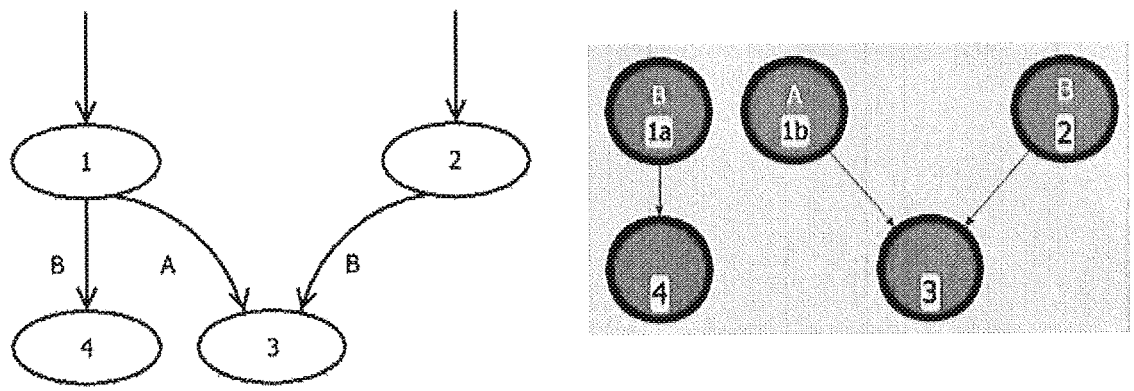
FIG. 93 illustrates another example of STE character recognition, according to various embodiments.

When a fourth state and associated transition is added, illustrated as STE character recognition in FIG. 93, state 1 is split into two STEs (one that responds to the input character B and activates the STE corresponding to state 4, and one that responds to the input character A and activates the STE corresponding to state 3).

State 1 now transitions to state 4 on input B and to state 3 on input A. Any activation connections to STE 1 in the original design now need to connect to both 1a and 1b in the automata design.

There are times when modifications like this might need to occur when converting a traditional state machine into an automaton. It may, however, be easier to construct the original design in automaton form. It is possible to convert a complex state machine into an automaton, but it may not be easy.

This section outlines factors that influence how automata networks run on the Micron D480 Automata Processor. ANML-based automata networks can be compiled for the D480 Automata Processor using the Automata Processor (AP) SDK. ANML has few capacity limitations; however, networks compiled to an actual processor such as the D480 are subject to certain limitations, and the performance of the applications can be impacted by the design of the chip, the nature of the graph, characteristics of the input data, and data transfers and communication managed by the device driver and runtime software of the AP SDK.

Figure 94:
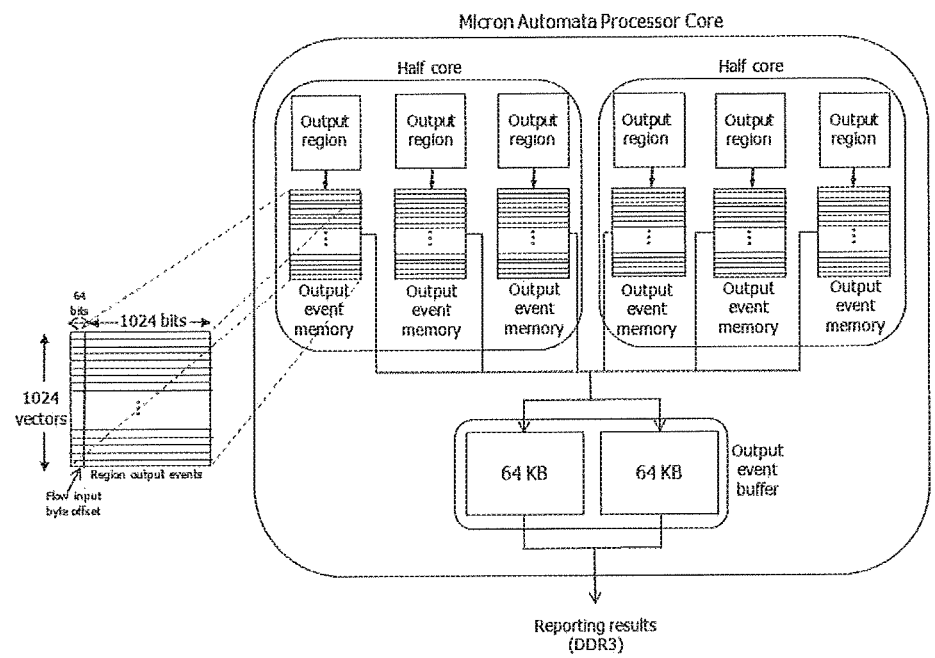
FIG. 94 illustrates an automata processor core such as FSM 30 of FIG. 2, according to various embodiments.

ANML automata networks are, however, independent of any specific silicon technology and it is therefore entirely possible to create ANML automata networks which cannot be realized by an existing ANML compiler. Numerous considerations therefore exist that an ANML developer should consider when creating automata networks intended for actual silicon. These implementation considerations are discussed throughout this section and may also be embedded as optional constraints in ANML design tools as implementation profiles for use in conjunction with the Automata Processor Core (e.g., FSM 30) of FIG. 94.

TABLE 15

ANML Elements Implemented in a Micron D480 Automata Processor.

| Element | Standard (Full Clock) In Activation Options | Out Activation Options | Output Type | Report Option | D480 Availability | Notes |
|---|---|---|---|---|---|---|
| STE | Self: start-of-data or all-input Can be activated by STE, counter, Booleans | STE, counter, Booleans | latch = true, false | Yes | 49152 in two cores with 96 blocks per core, 16 rows per block (24576 per core, 256 per block, 16 per row). 6144 can report. (3072 per core, 32 per block, 2 per row) | 1 |
| Counter | STE | STE, counter reset | at-target = pulse, latch, roll | Yes | 768 in two cores (384 per core, 4 per block, 1 every 4 rows) | 2 |
| Boolean | STE | STE | | Yes | 2304 in two cores (1152 per core, 12 per block, 3 every 4 rows) | 3 |

Notes may not be applicable to ANML designers.
Note:
STEs cannot activate other STEs across cores; each core operates synchronously, but independently, on the input.
Note:
Can connect to elements within a block only. At full clock a counter element cannot activate another counter's countone input or Boolean elements but can reset another counter.
Note:
Can connect to elements within a block only. At full clock a Boolean element cannot activate another counter or Boolean element.

The D480 processor has six output (match) regions, each containing 1024 output lines capable of reporting output events from automata elements on a single symbol cycle, for a total of 6144 output lines on the entire processor. Each output region produces an output event vector with at least 64 bits, up to as many as 1024 bits (plus 64 bits of metadata containing the byte offset in the flow where the output event occurred) on each symbol cycle on which there is output in that region. The reduction of the size of the event vector is known as event vector division. The event vector size can be reduced by a fixed divisor with possible divisor values of: 1 (no reduction), 1.33, 2, 4, 8, and 16. The event vector divisor will be the same for all regions.

With the D480 processor, a direct relationship exists between the size of the event vector and the number of symbol cycles needed to transfer it between the chip core and event buffer. When the output rate is high, much better performance should be obtainable with smaller event vectors. The size of the event vector can be set at compilation time and be based on the number of automata elements that have been configured for output and the level of the success of the place and route algorithm in positioning output elements on the chip, such that the smallest possible reduced event vector size may be used.

It may occur that even though the number of output elements is less than a possible event vector size, the output elements cannot be positioned within the physical constraints of a smaller event vector, and a larger vector used to ease placement. An automata processor developer might improve the overall situation simply by creating ANML designs with as few outputting elements as possible. Through experience, the designer may learn that some designs route better than other designs and result in greater reduction of the event vector.

If there is a single outputting automata element in a region on a symbol cycle, the entire vector, with just a single bit set, may be written to the output event memory of the D480 processor. If the width of the event vector is 1024, 1023 extraneous bits can be written; if the width is 64, only 63 are written. If there are multiple outputting automata elements in a region on a single cycle, only one vector will be written to the output event memory but more output event bits in that vector will be set. An ANML designer might improve the efficiency of output operations by getting more output information into the event vector with higher utilization of the available bits. If there is no output event in an output region, an output event vector is not written to output event memory.

Each output region of the D480 processor can hold up to 1024 vectors. Although capacity exists for 1024 vectors, if compression is not enabled, the number of vectors that should actually be stored in the output region memory is 481, the limit of the output buffer to which vectors are transferred for output off the chip.

To report output events, the output event vectors are transferred to an event buffer so they can be read off of the D480 processor. The transfer time for each uncompressed output event vector is between 40 symbol cycles (for a 1024-bit vector) to 2.5 symbol cycles (for a 64-bit vector). Reading the first output event vector involves start-up overhead and takes an additional 15 symbol cycles.

Determining that an output region has no output event vectors when a request to transfer the region has been made takes two symbol cycles in the D480 processor. The instruction set allows any combination of output regions to be selected for a transfer, including a single region, so it is possible to avoid the two-symbol cycle overhead for transfer of empty regions if supported by the runtime software layer.

The compiler (place and route and loading) determines where in the six possible regions of the D480 processor the automata elements that are output-enabled will be placed. Significant differences in performance may be obtained depending on where the output automata elements are placed, not with respect to event vector division but to region placement. For example, if there are six output events at a single symbol cycle and the automata elements associated with those output events are placed into the six different regions, transferring an event vector of 1024 bits will take 255 cycles (6×40+15). If those six automata elements were in the same region, and the event vector was only 64 bits, that time could potentially be reduced to 17.5 cycles, 2.5 for the cost of transferring the one region with matches and 15 cycles overhead. When many event vectors are buffered and transferred in a single operation to the event memory, the overhead is amortized over many vectors and the ratio between best and worst cases becomes about 100 to 1-240 cycles per set of six vectors versus 2.5 cycles for a single region 64-bit event vector.

The D480 Automata Processor is divided into two half-cores that operate synchronously on the input but also independently. Automata elements in one half-core cannot activate automata elements in the other half-core. With respect to output processing, this means that it is not possible to reduce the number of output regions to 1 and use both half-cores unless it possible to have independent processing on one half-core without generating any output.

A more common situation would be that the number of output regions would be limited to two, with each independent circuit on each half-core having output automata elements in one region each. In the least-optimized case, the minimum output processing cost should be calculated using two output regions. Additional optimizations, however, are possible. The output over a range of input symbol cycles may be limited to one region in one core. Output events may be triggered in one region and not in the other region in the other half-core. If the software enables such an operation, the populated region in this case might be the only region for which output is requested. If the software does not enable specification of the output region, the cost for transfer of an unpopulated region would only be two symbol cycles; therefore, two regions in two half-cores could be transferred in 42 symbol cycles for a 1024-bit vector or 4.5 symbol cycles for a 64-bit vector. The key item is to have control over when output is transferred so that at any transfer, only one region contains data. (The API functions critical to this are: AP_ScanFlows and AP_GetMatches).

All of the output vectors in the D480's match memory for whatever regions are specified are transferred in one burst. The 15-symbol cycle overhead cost is incurred for each burst. The following table shows the number of output elements available by number of regions for each possible value of the event vector divisor, and the transfer times in symbol cycles by number of regions for each possible value of the event vector divisor.

TABLE 16

Output Vector, Number of Elements, Transfer Time in Symbol Cycles by Number of Regions and EV Divisor

| | Maximum Out | | | | | | Vector T | | | | | |
|---|---|---|---|---|---|---|---|---|---|---|---|---|
| Regions | 1 | 1.33 | 2 | 4 | 8 | 16 | 1 | 1.33 | 2 | 4 | 8 | 16 | Overhead |
| 1 | 1024 | 768 | 512 | 256 | 128 | 64 | 40 | 30 | 20 | 10 | 5 | 2.5 | 15 |
| 2 | 2048 | 1536 | 1024 | 512 | 256 | 128 | 80 | 60 | 40 | 20 | 10 | 5.0 | 15 |
| 3 | 3072 | 2304 | 1536 | 768 | 384 | 192 | 120 | 90 | 60 | 30 | 15 | 7.5 | 15 |
| 4 | 4096 | 3072 | 2048 | 1024 | 512 | 256 | 160 | 120 | 80 | 40 | 20 | 15.0 | 15 |
| 5 | 5120 | 3840 | 2560 | 1280 | 640 | 320 | 200 | 150 | 100 | 50 | 25 | 17.5 | 15 |
| 6 | 6144 | 4608 | 3072 | 1792 | 768 | 384 | 240 | 180 | 120 | 60 | 30 | 20.0 | 15 |

TABLE 17

Minimum Output Vector Transfer Time.

| Populated Regions | Empty Regions | Populated Vectors | Overhead | Vector Transfer | Empty Region Processing | Total |
|---|---|---|---|---|---|---|
| 1 | 5 | 1 | 15 | 2.5 | 2 × 5 = 10 | 27.5 |

Note:
Transfer times shown in symbol cycles without region selection; one 64-bit vector in one region; all regions output including empty ones.

TABLE 18

Maximum Output Vector Transfer Time.

| Regions | Total Vectors | Overhead | Vector Transfer | Total Symbol Cycles | Total Time (@ 7.45 ns per symbol cycle) |
|---|---|---|---|---|---|
| 1 | 1024 | 15 | 140960 | 40975 | 0.3 ms |
| 2 | 2048 | 15 | 81920 | 81935 | 0.6 ms |
| 3 | 3072 | 15 | 122880 | 122895 | 0.9 ms |
| 4 | 4096 | 15 | 163840 | 163855 | 1.2 ms |
| 5 | 5120 | 15 | 204800 | 204815 | 1.5 ms |
| 6 | 6144 | 15 | 245760 | 1245775 | 1.8 ms |

Note:
1024 1024-bit output vectors per region for full event memory.

Output Processing Examples

Example 1

Output of All Six Regions is Requested

1. Region 0 has 1 output event vector.
2. Region 1 has no output event vectors.
3. Region 2 has no output event vectors.
4. Region 3 has no output event vectors.
5. Region 4 has no output event vectors.
6. Region 5 has no output event vectors.

TABLE 19

Output of Six Regions

| Event Vector Divisor | Transfer Time in Symbol Cycles |
|---|---|
| 1 | 15 (overhead) + 40 (region 0: transfer 1 output ev) + 2*5 (region 1, 2, 3, 4, 5: NULL transfer) = 65 |
| 1.33 | 15 (overhead) + 30 (region 0: transfer 1 output ev) + 2*5 (region 1, 2, 3, 4, 5: NULL transfer) = 55 |
| 2 | 15 (overhead) + 20 (region 0: transfer 1 output ev) + 2*5 (region 1, 2, 3, 4, 5: NULL transfer) = 45 |
| 4 | 15 (overhead) + 10 (region 0: transfer 1 output ev) + 2*5 (region 1, 2, 3, 4, 5: NULL transfer) = 35 |
| 8 | 15 (overhead) + 5 (region 0: transfer 1 output ev) + 2*5 (region 1, 2, 3, 4, 5: NULL transfer) = 30 |
| 16 | 15 (overhead) + 2.5 (region 0: transfer 1 output ev) + 2*5 (region 1, 2, 3, 4, 5: NULL transfer) = 27.5 |

Example 2

Output of All Six Regions is Requested

1) Region 0 has 1 output event vector.
2) Region 1 has no output event vectors.
3) Region 2 has 4 output event vectors.
4) Region 3 has no output event vectors.
5) Region 4 has no output event vectors.
6) Region 5 has no output event vectors.

The transfer time would be: 15 (overhead)+40 (region 0: transfer 1 output event)+2 (region 1: NULL transfer)+4*40 (region 2: transfer 4 output events)+2*3 (region 3,4,5: NULL transfer)=223 cycles

TABLE 20

Output of Six Regions

| Event Vector Divisor | Transfer Time in Symbol Cycles |
|---|---|
| 1 | 15 (overhead) + 40 (region 0: transfer 1 output ev) + 2*5 (region 1, 2, 3, 4, 5: NULL transfer) = 65 |
| 1.33 | 15 (overhead) + 30 (region 0: transfer 1 output ev) + 2*5 (region 1, 2, 3, 4, 5: NULL transfer) = 55 |
| 2 | 15 (overhead) + 20 (region 0: transfer 1 output ev) + 2*5 (region 1, 2, 3, 4, 5: NULL transfer) = 45 |
| 4 | 15 (overhead) + 10 (region 0: transfer 1 output ev) + 2*5 (region 1, 2, 3, 4, 5: NULL transfer) = 35 |
| 8 | 15 (overhead) + 5 (region 0: transfer 1 output ev) + 2*5 (region 1, 2, 3, 4, 5: NULL transfer) = 30 |
| 16 | 15 (overhead) + 2.5 (region 0: transfer 1 output ev) + 2*5 (region 1, 2, 3, 4, 5: NULL transfer) = 27.5 |

Output event vectors can be compressed. Transfers from the output event memory of the D480 processor to the user-accessible output event buffer are concurrent with other chip operations. This may hide some of the cost of the transfer from event memory to the event buffer but, in any case, the overall time will not be less than the total time consumed by event vector transfer.

Processor performance might be throttled by transfer time between output event memory and the output event buffer if more than one output event vector is generated every 40/event-vector-divisor symbol cycles (that is, 40, 30, 20, 10, 5 or 2.5, depending on what divisor the compiler is able to use). Because there are six regions in the D480 processor, it is possible to generate as much as six output vectors per input symbol cycle, giving a worst-case degradation performance of 240/event-vector-divisor times the input rate.

One way to mitigate this problem in high output scenarios can be to aggregate output events; that is, to reduce the number of output vectors by combining events over many symbol cycles into fewer vectors. If there is one output event per input symbol in a region, a 1088-bit vector is written, which can take as many as 40 symbol cycles, depending on the event vector divisor, to transfer on every symbol just to convey one bit of information. If events of 40 symbol cycles can be aggregated, writing still just one vector but using 40 out of the 1024 available bits, we can run at the input symbol cycle rate. The ANML Cookbook guide shows many examples of output aggregation with techniques using timing STEs, counters, and the end-of-data signal enabling a Boolean gate.

The Automata Processor API interprets the output buffer containing output vectors and reports an ID that can be mapped to the ANML ID associated with each output event and the byte offset in the input flow which triggered the output event. There may be instances where it could be more efficient for the application to handle the output buffer directly. At present, however, it may not be possible for the user application to detect region boundaries, although this may addressed in the future with the addition of a region header, for example.

Each region section consists of populated output vectors for that region. The output vector has a 64-bit metadata field consisting of a 32-bit byte offset in the flow to the symbol that caused the output event and 1024 bits representing the output state of each possible output event in the region. The position of each event bit in the output vector is associated with a physical address on the chip. It is necessary to have results from compilation of the ANML description giving the correlation between these physical addresses on the chip at the ANML elements associated with output events to interpret the event settings in the output vector. Additional functionality in the Automata Processor SDK may be necessary to enable a developer to obtain this information from the compilation step. It is also possible for multiple flows to be represented in the output buffer; however, there is no information in the output vector about the identity of the source flow. This information is added to match results by the Automata Processor software.

Uncompressed, the size of a NULL region is 64 bits and a populated region is (64+1024 bits) multiplied by the number of output vectors. In the first example above with one vector in one region and five empty regions, the total buffer size would be 1088 (region 0) 64×5 (region 1, 2, 3, 4, 5)=1408 bits or 176 bytes. The second example with one vector in one region, four vectors in another region, and four empty regions would have a total buffer size of 1088 (region 0)+64 (region 1)+4352 (region 2) 64×3 (region 3, 4, 5)=5696 bits or 712 bytes.

The output buffer consists of two ping-pong half-buffers of 64 KB each. Uncompressed, each half-buffer can hold 481 output vectors. Without using compression the number of state vectors that can reside in a region's match memory is effectively reduced to 481, less than the match memory capacity of 1024 event vectors.

The output buffer may also be compressed, depending on the configuration, potentially controllable by the user through a setting in the Automata Processor Runtime API. The output buffer will be automatically uncompressed by the Automata Processor API. If a designer does not use the API to interpret the output buffer, it will be necessary to manually uncompress it. This functionality may not be available as an independent operation in the API.

The Automata Processor state vector contains the current state of the AP elements. The Automata Processor on-chip state vector cache allows storage of up to 512 state vectors. If there is a need to save more than 512, the state vectors can be moved to system memory and retrieved when required. Every flow being processed has an associated state vector. A single state vector constitutes of 59,936 bits [(256 enable bits per block+56 counter bits per block)×192 blocks+32 count]. It takes 1668 symbol cycles to transfer state vector from the state vector cache to the save buffer. Even though the state vector and event vector are independent of each other, AP uses the same internal bus and compressor (if enabled) for transferring the state vector and the event vector to the respective buffers. That is, only of one of them can be transferred at a time.

This section contains additional information on eXtensible Markup Language (XML) to help developers who may be unfamiliar with the programming language understand the basic topics discussed in this application. More detailed information on XML can be found at, for example, the W3C web site (http://www.w3.org/TR/2008/REC-xml-20081126/).

The basic component of XML is the element. An element is a thing, action, or object (anything that could be referred to as an entity in the system you are building). In ANML, elements include one of the many types of automaton elements (STE, counters, Booleans). An element starts with a start tag, beginning with an angle bracket followed by the name of element:

```
<state-transition-element
``` followed by space-separated attribute-value pairs that provide more details about the XML element:

```
<state-transition-element id="a12"
``` which specifies that this example element has an ID of a12.

After the attribute-value pairs, the start tag is terminated either by an end bracket > or a slash and end bracket /> depending on whether the element has or does not have content. The content is elements nested (children) in the element (parent) or text. According to one or more embodiments, ANML has only one element with text content, the <regex> element in macros. An STE can have children; therefore, after the start tag, children elements can be inserted followed by the STE's end tag (the element name preceded by </ and followed by >):

```
<state-transition-element id="a12"> ... children elements ...
</state-transition-element>
```

One matter of an element with children as a container that "holds" its children elements, although sometimes it literally is a larger thing containing smaller things and sometimes the children are more like actions or concepts related to the parent element. The former situation is the case when there are automaton elements in cells:

```
<macro ... >
    <state-transition-element ...> ... </state-transition-element>
    <state-transition-element ...> ... </state-transition-element>
</macro>
```

Elements can be indented to make nesting clearer:

```
<state-transition-element ...>
    <activate-on-match element="a12"/>
    <activate-on-match element="a44"/>
</state-transition-element>
```

The activate-on-match child element (which is an element type that does not contain content) of the STE is not a thing inside the STE but is an action associated with the parent STE.

One way in XML to express relationships between elements is through the parent-child hierarchy just presented. Sometimes, however, elements are connected in some way but do not have a parent-child hierarchical relationship. There are a number of ways to express these relationships in XML; ANML uses a very simple mechanism of linking through IDs. Everything in ANML has some type of ID and any other thing that wants to connect to it uses its ID to express the relationship.

In the previous example, a connection to two STEs is expressed (the STE having the IDs a12 and a44). Because activate-on-match is an action and not a thing, the connections are actually between the parent STE and the STEs indicated by the IDs. Activate-on-match, as an action, expresses the type of connection between the STEs.

In XML, you can specify how many of each type of element is required in various contexts. For example, an optional element could have an occurrence of 0 or 1, an element for which at least one is required would have an occurrence of 1 or more.

XML does have datatypes. In ANML, datatypes are used to create different ID types for each automaton element type. However, most values in ANML are simply strings, and the ANML schema makes use of enumerations and Booleans. The following is an example showing the hierarchical view of ANML elements.

TABLE 21

ANML XML Schema automata-network
macro
port-definition
element-reference
macro
state-transition-element, counter, inverter, and, nand, or, nor,
sum-of-products, - product-of-sums
state-transition-element, counter, inverter, and, nand, or, nor,
sum-of-products, - product-of-sums
state-transition-element
report-on-match
activate-on-match
counter
report-on-target
activate-on-target
inverter, and, nand, or, nor
report-on-high
activate-on-high
sum-of-products
product-term
report-on-high
activate-on-high
product-of-sums
sum-term
report-on-high
activate-on-high ANML networks operate on symbols, with a primary operation being the recognition of a symbol against a set of symbols stored in the STE.

symbol-set="character | character-class | bits-enabled | multiple"

The definition of a symbol is a characteristic of the implementation. In this section, it is assumed that a symbol is a byte (8-bit) value. Therefore, assuming the input stream consists of 8-bit values, each STE will be programmable with a 256 position symbol-set value which will be used to determine if connected activate-on-match and report-on-match STEs should be activated and generate match report output, if enabled. Any combination of those 256 positions can be set.

Figure 95:
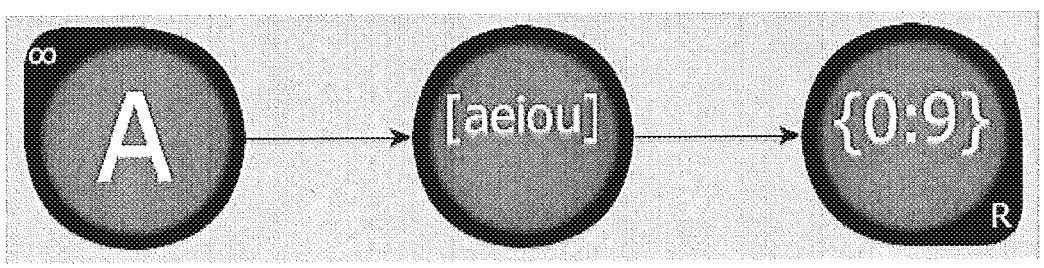
FIG. 95 illustrates an example of programming a symbol set (AP Workbench as constructed in AP Workbench, according to various embodiments.

Byte values input into an activated STE will be tested against the symbol-set, and if the input value matches any set position, a match is recognized and activations and report output will be triggered, as illustrated in the programming of a symbol set in FIG. 95.

```
<state-transition-element id="q0" symbol-set="A"
start="all-input"><activate-on-match
automaton="q1"/></state-transition-element>
<state-transition-element id="q1"
symbol-set="[aeiou]"><activate-on-match
automaton="q2"/></state-transition-element>
<state-transition-element id="q2"
symbol-set="{0:9}"><report-on-match/></state-transition-
element>
```

Initial settings of the symbol-set state used to store symbol values for each STE are set by the STE element attribute symbol-set. In the image above, the example automaton recognizes an input sequence beginning with an upper-case A followed by one of the following lower-case letters: a, e, i, o, u, followed by a symbol with a value between 0 and 9. The example above shows an automaton that uses the three methods permitted for expressing symbol_sets:

Character

Character-class

Bits-enabled

The STE has a Boolean attribute (case-insensitive) that can affect the interpretation of the symbol-set. The case-insensitive attribute has a default value of false so when it does not appear in the STE, symbol-sets are case-sensitive. Case-insensitivity is equivalent to the Perl Compatible Regular Expression (PCRE) modifier /i. It works on character, character-class, and multiple values, but not on bits-enabled.

Character

ANML characters are based on a subset of admissible characters in PCRE. Most characters stand for themselves in a pattern and will match the corresponding input character. For example, a will match the ASCII byte value for the lower case letter a. A number of pattern meta-characters, described below, are not interpreted as literals.

Differences from PCRE include lack of support for case-insensitivity (to match either the lower or upper case character, a character class is used that specifies both) and the use of an asterisk (*) as a meta-character representing any character including newline. To prevent a character from being interpreted as a pattern meta-character, quote it.

TABLE 22

Symbol-Set Characters.

| Character | Description |
|---|---|
| \. | A literal |
|  | CHARACTERS-How to specify characters, non-printable or programmatically. |
| \a | Alarm; that is, the BEL character (hex 07) |
| \cx | Control-x, where x is any character |
| \e | Escape (hex 1B) |
| \f | Formfeed (hex 0C) |
| \n | New line (hex 0A) |
| \r | Carriage return (hex 0D) |
| \t | Tab (hex 09) |
| \ddd | Character with octal code ddd, or backreference |
| \xhh | Character with hex code hh |
| \x {hhh.} | Character with hex code hhh |
|  | Character Types (match based on type of character) |
| . | Any character except newline |
| * | Any character including newline |
|  | Note: This differs from PRCE |
| \C | One byte |
| \d | Decimal digit |
| \D | Character that is not a decimal digit |
| \h | Horizontal whitespace character (for example, space, tab, but not newline) |
| \H | Character that is not a horizontal whitespace character |
| \R | Newline sequence |
| \s | Whitespace character |
| \S | Character that is not a whitespace character |
| \v | Vertical whitespace character (for example, newline or CR) |
| \V | Character that is not a vertical whitespace character |
| \w | Word character |
| \W | Non-word character |
| \X | Extended unicode sequence |

Note:
In ANML as in PCRE, the following recognize ASCII characters only: \d, \D, \s, \S, \w, \W Character-Class ANML character classes are based on a subset of PCRE character classes. An opening square bracket introduces a character class, terminated by a closing square bracket. A closing square bracket on its own is not special. If a closing square bracket is required as a member of the class, it should be the first data character in the class (after an initial circumflex, if present) or escaped with a backslash.

A character class matches a single character in the subject; the character should be in the set of characters defined by the class, unless the first character in the class is a circumflex (ˆ), in which case the subject character should not be in the set defined by the class. If a circumflex is actually required as a member of the class, ensure it is not the first character, or escape it with a backslash.

For example, the character class [aeiou] matches a set of lower case vowels, while [ˆaeiou] matches any character that is not one of these lower case vowels. Note that a circumflex is just a convenient notation for specifying the characters that are in the class by enumerating those that are not.

The minus (hyphen) character can be used to specify a range of characters in a character class. For example, [d-m] matches any letter between d and m, inclusive. If a minus character is required in a class, it should be escaped with a backslash or appear in a position where it cannot be interpreted as indicating a range, typically as the first or last character in the class.

In at least one embodiment, it is not possible to have the literal character "]" as the end character of a range. A pattern such as [W-]46] is interpreted as a class of two characters ("W" and "-") followed by a literal string "46]", so it would match "W46]" or "-46]". However, if the "]" is escaped with a backslash it is interpreted as the end of range; therefore, [W-\]46] is interpreted as a single class containing a range followed by two separate characters. The octal or hexadecimal representation of "]" can also be used to end a range.

Ranges operate in ASCII collating sequence. They can also be used for characters specified numerically, for example [\000-\037]. ANML character-classes, unlike PCRE, cannot be set for case-insensitivity. If case-insensitivity is desired, both the lower and upper case ranges should be specified.

The character types \d, \D, \s, \S, \w, and \W may also appear in a character class, and add the characters that they match to the class. For example, [\dABCDEF] matches any hexadecimal digit. A circumflex can conveniently be used with the upper-case character types to specify a more restricted set of characters than the matching lower case type. For example, the class [^\W_] matches any letter or digit, but not underscore.

All non-alphanumeric characters other than \, -, ^ (at the start) and the terminating] are non-special in character classes, but it does no harm if they are escaped. The pattern terminator is always special and should be escaped when used within an expression.

Bits-Enabled

The ability to specify a bit-level pattern is unique to ANML. An opening curly brace introduces a bit pattern and is terminated by a closing curly brace. All bit-level patterns can be expressed as either characters or character-classes. The bit-level pattern is provided as an alternative which may be easier to use for applications that are not character-oriented.

The bit-level pattern specifies any combination of bit positions from 0 to max_bit inclusive which are set and match-enabled. In an 8-bit byte implementation, max_bit will be 255. The bit position is specified by a highest-order bit pattern bit is set and that an input byte, after passing through the 8-to-256 decoder that has this bit set will match the pattern and cause the STE to execute match actions including activating connected elements, if specified, and generating output, if the pattern as the character "\xff".

The bit-level pattern can also specify multiple bit positions and ranges of bit positions. Multiple bit positions are comma-separated and ranges have a colon between the start bit position and the end bit position (inclusive).

For example, the following pattern specifies that pattern bits from position 0 to 9 and 250 to 255 as well as positions 20 and 40 are set and that an input byte, after passing through the 8-to-256 decoder that has any of these bits sets will match the pattern and cause the STE to execute match actions including activating connected elements, if specified, and generate the output.

"{0:9,20,40,250:255}"

The following bit-level pattern is equivalent to the specification of the pattern as the character-class:

"[\x00-\x09\x14\x28\xFA-\xFF]".

Additionally, ANML may be more formally described in XSD (XML Schema Definition). An example of ANML in XSD is set forth below:

```
<?xml version="1.0" encoding="UTF-8"?>
<xs:schema version="draft-9"
  xmlns:xs="http://www.w3.org/2001/XMLSchema">
<xs:simpleType name="AT_type">
<xs:restriction base="xs:string">
<xs:enumeration value="in"/>
<xs:enumeration value="out"/>
<xs:enumeration value="report"/>
</xs:restriction>
</xs:simpleType>
<xs:simpleType name="AT start">
<xs:restriction base="xs:string">
<xs:enumeration value="none"/>
<xs:enumeration value="start-of-data"/>
<xs:enumeration value="all-input"/>
</xs:restriction>
</xs:simpleType>
<xs:simpleType name="AT_countermodes">
<xs:restriction base="xs:string">
<xs:enumeration value="roll"/>
<xs:enumeration value="pulse"/>
<xs:enumeration value="latch"/>
</xs:restriction>
</xs: simpleType>
<xs:simpleType name="AT version">
<xs:restriction base="xs:string">
<xs:pattern value="[0-9]\.[0-9]"/>
</xs:restriction>
</xs: simpleType>
<xs:complexType name="T_layout">
<xs:attribute name="x" type="xs:integer" use="required"/>
<xs:attribute name="y" type="xs:integer" use="required"/>
</xs:complexType>
<xs:complexType name="T_layoutWH">
<xs:attribute name="w" type="xs:integer" use="required"/>
<xs:attribute name="h" type="xs:integer" use="required"/>
</xs:complexType>
<xs:complexType name="T_report-on-event">
<xs:attribute name="reportcode" type="xs:unsignedInt" use="optional"/>
</xs:complexType>
<xs:complexType name="T_activate-on-event">
<xs:attribute name="element" use="required" type="xs:string"/>
</xs:complexType>
<xs:complexType name="T_state-transition-element">
<xs:sequence minOccurs="0">
<!-- Layout position is relative to parent element. -->
<xs:element name="layout" type="T_layout" minOccurs="0"/>
<xs:element name="report-on-match" type="T_report-on-event" minOccurs="0"/>
<xs:element name="activate-on-match" type="T_activate-on-event" minOccurs="0" maxOccurs="unbounded"/>
</xs:sequence>
<xs:attribute name="id" type="xs:string" use="required"/>
<xs:attribute name="symbol-set" type="xs:string" use="required"/>
<xs:attribute name="start" type="AT start" default="none"/>
<xs:attribute name="latch" type="xs:boolean" default="false"/>
</xs:complexType>
<xs:complexType name="T_counter">
<xs:sequence>
<!-- Layout position is relative to parent element. -->
```

```xml
<xs:element name="layout" type="T_layout" minOccurs="0"/>
<xs:element name="report-on-target" type="T_report-on-event"
  minOccurs="0"/>
<xs:element name="activate-on-target"
  type="T_activate-on-event"
  minOccurs="0" maxOccurs="unbounded"/>
</xs:sequence>
<xs:attribute name="id" type="xs:string"
  use="required"/>
<xs:attribute name="target" type="xs:string"
  use="required"/>
<xs:attribute name="at-target" type="AT_countermodes"
  default="pulse"/>
<xs:attribute name="max-target" type="xs:integer"/>
</xs:complexType>
<xs:complexType name="T_or_and">
<xs:sequence>
<!-- Layout position is relative to parent element. -->
<xs:element name="layout" type="T_layout" minOccurs="0"/>
<xs:element name="report-on-high" type="T_report-on-event"
  minOccurs="0"/>
<xs:element name="activate-on-high" type="T_activate-on-event"
  minOccurs="0" maxOccurs="unbounded"/>
</xs:sequence>
<xs:attribute name="id" type="xs:string"
  use="required"/>
<xs:attribute name="high-only-on-eod" type="xs:boolean"
  default="false"/>
</xs:complexType>
<xs:complexType name="T_nor_nand_inverter">
<xs:sequence>
<!-- Layout position is relative to parent element. -->
<xs:element name="layout" type="T_layout" minOccurs="0"/>
<xs:element name="report-on-high" type="T_report-on-event"
  minOccurs="0"/>
<xs:element name="activate-on-high" type="T_activate-on-event"
  minOccurs="0" maxOccurs="unbounded"/>
</xs:sequence>
<xs:attribute name="id" type="xs:string"
  use="required"/>
<xs:attribute name="high-only-on-eod" type="xs:boolean"
  default="false"/>
</xs:complexType>
<xs:complexType name="T_sum-of-products">
<xs:sequence>
<!-- Layout position is relative to parent element. -->
<xs:element name="layout" type="T_layout" minOccurs="0"/>
<xs:element name="report-on-high" type="T_report-on-event"
  minOccurs="0"/>
<xs:element name="activate-on-high" type="T_activate-on-event"
  minOccurs="0" maxOccurs="unbounded"/>
</xs:sequence>
<xs:attribute name="id" type="xs:string"
  use="required"/>
<xs:attribute name="high-only-on-eod" type="xs:boolean"
  default="false"/>
</xs:complexType>
<xs:complexType name="T_product-of-sums">
<xs:sequence>
<!-- Layout position is relative to parent element. -->
<xs:element name="layout" type="T_layout" minOccurs="0"/>
<xs:element name="report-on-high" type="T_report-on-event"
  minOccurs="0"/>
<xs:element name="activate-on-high" type="T_activate-on-event"
  minOccurs="0" maxOccurs="unbounded"/>
</xs:sequence>
<xs:attribute name="id" type="xs:string"
  use="required"/>
<xs:attribute name="high-only-on-eod" type="xs:boolean"
  default="false"/>
</xs:complexType>
<xs:complexType name="T_port">
<xs:sequence>
<xs:element name="description" type="T_description"
  minOccurs="0"/>
<!-- This port layout is used by the macro-reference -->
<xs:element name="layout" type="T_layout" minOccurs="0"/>
</xs:sequence>
<xs:attribute name="type" use="required" type="AT_type"/>
<xs:attribute name="id" type="xs:string"
  use="required"/>
</xs:complexType>
<xs:complexType name="T_port-in">
<xs:sequence>
<xs:element name="description" type="T_description"
  minOccurs="0"/>
<!-- This port layout is used by the macro-definition -->
<xs:element name="layout" type="T_layout" minOccurs="0"/>
<xs:element name="activate-on-event"
  type="T_activate-on-event"
  minOccurs="0" maxOccurs="unbounded"/>
</xs:sequence>
<xs:attribute name="id" type="xs:string"
  use="required"/>
</xs:complexType>
<xs:complexType name="T_port-out">
<xs:sequence>
<xs:element name="description" type="T_description"
  minOccurs="0"/>
<!-- This port layout is used by the macro-definition -->
<xs:element name="layout" type="T_layout" minOccurs="0"/>
<xs:element name="activate-from-event"
  type="T_activate-onevent"
  minOccurs="0"/>
</xs:sequence>
<xs:attribute name="id" type="xs:string"
  use="required"/>
</xs:complexType>
<xs:complexType name="T_report-alias">
<xs:sequence>
<xs:element name="description" type="T_description"
  minOccurs="0"/>
</xs:sequence>
```

```xml
<xs:attribute name="id" type="xs:string" use="required"/>
<xs:attribute name="element" type="xs:string" use="required"/>
</xs:complexType>
<xs:complexType name="T_parameter">
<xs:sequence>
<xs:element name="description" type="T_description" minOccurs="0"/>
</xs:sequence>
<xs:attribute name="parameter-name" type="xs:string" use="required"/>
<xs:attribute name="default-value" type="xs:string" use="required"/>
</xs:complexType>
<xs:complexType name="T_parameter-declarations">
<xs:sequence>
<xs:element maxOccurs="unbounded" name="parameter" type="T_parameter"/>
</xs:sequence>
</xs:complexType>
<xs:complexType name="T_interface-declarations">
<xs:sequence>
<xs:element name="port" type="T_port" minOccurs="0" maxOccurs="unbounded"/>
</xs:sequence>
</xs:complexType>
<xs:complexType name="T_header">
<xs:sequence>
<!-- This is the W,H used by the macro reference object in the
workbench. -->
<xs:element name="layout-size" type="T_layoutWH" minOccurs="0"/>
<xs:element name="interface-declarations" type="T_interfacedeclarations" minOccurs="0"/>
<xs:element name="parameter-declarations" type="T_parameterdeclarations" minOccurs="0"/>
</xs:sequence>
</xs:complexType>
<xs:complexType name="T_activate-from-macro">
<xs:attribute name="source" type="xs:string" use="required"/>
<xs:attribute name="element" use="required" type="xs:string"/>
</xs:complexType>
<xs:complexType name="T_replace">
<xs:attribute name="parameter-name" type="xs:string" use="required"/>
<xs:attribute name="replace-with" type="xs:string" use="required"/>
</xs:complexType>
<xs:complexType name="T_activate-out">
<xs:sequence>
<xs:element maxOccurs="unbounded" name="activate-from-macro" type="T_activate-from-macro"/>
</xs:sequence>
</xs:complexType>
<xs:complexType name="T_substitutions">
<xs:sequence>
<xs:element maxOccurs="unbounded" name="replace" type="T_replace"/>
</xs:sequence>
</xs:complexType>
<xs:complexType name="T_macro-reference">
<xs:sequence>
<xs:element name="layout" type="T_layout" minOccurs="0"/>
<xs:element name="layout-size" type="T_layoutWH" minOccurs="0"/>
<xs:element name="activate-out" type="T_activate-out" minOccurs="0"/>
<xs:element name="substitutions" type="T_substitutions" minOccurs="0"/>
</xs:sequence>
<xs:attribute name="id" type="xs:string" use="required"/>
<xs:attribute name="use" type="xs:string" use="required"/>
</xs:complexType>
<xs:complexType name="T_port-definitions">
<xs:choice maxOccurs="unbounded">
<xs:element maxOccurs="unbounded" name="port-in" type="T_portin" minOccurs="0"/>
<xs:element name="port-out" type="T_port-out" minOccurs="0" maxOccurs="unbounded"/>
<xs:element name="report-alias" type="T_report-alias" minOccurs="0" maxOccurs="unbounded"/>
</xs:choice>
</xs:complexType>
<xs:complexType name="T_body">
<xs:sequence>
<xs:element name="port-definitions" type="Tport-definitions" minOccurs="0"/>
<xs:choice maxOccurs="unbounded">
<xs:element name="macro-reference" type="T_macro-reference" minOccurs="0" maxOccurs="unbounded"/>
<xs:element name="state-transition-element" type="T_statetransition-element" minOccurs="0" maxOccurs="unbounded"/>
<xs:element name="counter" type="T_counter" minOccurs="0" maxOccurs="unbounded"/>
<xs:element name="inverter" type="T_nor_nand_inverter" minOccurs="0" maxOccurs="unbounded"/>
<xs:element name="and" type="T_or_and" minOccurs="0" maxOccurs="unbounded"/>
<xs:element name="nand" type="T_nor_nand_inverter" minOccurs="0" maxOccurs="unbounded"/>
<xs:element name="or" type="T_or_and" minOccurs="0" maxOccurs="unbounded"/>
<xs:element name="nor" type="T_nor_nand_inverter" minOccurs="0" maxOccurs="unbounded"/>
<xs:element name="sum-of-products" type="T_sum-of-products" minOccurs="0" maxOccurs="unbounded"/>
<xs:element name="product-of-sums" type="T_product-of-sums" minOccurs="0" maxOccurs="unbounded"/>
<xs:element name="nsum-of-products" type="T_sum-of-products" minOccurs="0" maxOccurs="unbounded"/>
```

```
<xs:element name="nproduct-of-sums"
    type="T_product-of-sums"
minOccurs="0" maxOccurs="unbounded"/>
</xs:choice>
</xs:sequence>
</xs:complexType>
<xs:simpleType name="T_body-binary">
<xs:restriction base="xs:base64Binary"/>
</xs: simpleType>
<xs:simpleType name="T_description">
<xs:restriction base="xs:string"/>
</xs:simpleType>
<xs:complexType name="T_automata-network">
<xs:sequence>
<xs:element name="description" type="T_description"
minOccurs="0"/>
<xs:choice maxOccurs="unbounded">
<xs:element name="macro-reference" type="T_macro-
    reference"
minOccurs="0" maxOccurs="unbounded"/>
<xs:element name="state-transition-element"
    type="T_statetransition-
element" minOccurs="0" maxOccurs="unbounded"/>
<xs:element name="counter" type="T_counter" minOc-
    curs="0"
maxOccurs="unbounded"/>
<xs:element name="inverter"
    type="T_nor_nand_inverter"
minOccurs="0" maxOccurs="unbounded"/>
<xs:element name="and" type="T_or_and" minOc-
    curs="0"
maxOccurs="unbounded"/>
<xs:element name="nand" type="T_nor_nand_inverter"
minOccurs="0" maxOccurs="unbounded"/>
<xs:element name="or" type="T_or_and" minOc-
    curs="0"
maxOccurs="unbounded"/>
<xs:element name="nor" type="T_nor_nand_inverter"
minOccurs="0" maxOccurs="unbounded"/>
<xs:element name="sum-of-products" type="T_sum-of-
    products"
minOccurs="0" maxOccurs="unbounded"/>
<xs:element name="product-of-sums" type="T_product-
    of-sums"
minOccurs="0" maxOccurs="unbounded"/>
<xs:element name="nsum-of-products" type="T_sum-
    of-products"
minOccurs="0" maxOccurs="unbounded"/>
<xs:element name="nproduct-of-sums"
    type="T_product-of-sums"
minOccurs="0" maxOccurs="unbounded"/>
</xs:choice>
</xs:sequence>
<xs:attribute name="id" type="xs:string"
    use="required"/>
<xs:attribute name="name" type="xs:string"
    use="optionar>
</xs:complexType>
<xs:complexType name="T_include-library">
<xs:attribute name="ref" type="xs:anyURI"
    use="required"/>
<!--
Use id-alias to change the namespace of the library on
    include.
This
is useful if another library of the same id is in use.
-->
<xs:attribute name="id-alias" type="xs:string"
    use="optionar>
</xs:complexType>
<xs:complexType name="T_include-macro">
<xs:attribute name="ref" type="xs:anyURI"
    use="required"/>
</xs:complexType>
<xs:complexType name="T library-definition">
<xs:sequence>
<xs:element name="description" type="T_description"
minOccurs="0"/>
<xs:choice maxOccurs="unbounded">
<xs:element name="include-macro" type="T_include-
    macro"
minOccurs="0" maxOccurs="unbounded"/>
<xs:element name="macro-definition" type="T_macro-
    definition"
minOccurs="0" maxOccurs="unbounded"/>
</xs:choice>
</xs:sequence>
<xs:attribute name="id" type="xs:string"
    use="required"/>
</xs:complexType>
<xs:complexType name="T_anml">
<xs:sequence>
<xs:element name="description" type="T_description"
minOccurs="0"/>
<xs:element name="include-library" type="T_include-li-
    brary"
minOccurs="0" maxOccurs="unbounded"/>
<xs:element name="include-macro" type="T_include-
    macro"
minOccurs="0" maxOccurs="unbounded"/>
<xs:choice maxOccurs="unbounded">
<xs:element name="macro-definition" type="T_macro-
    definition"
minOccurs="0"/>
<xs:element name="automata-network"
    type="T_automata-network"
minOccurs="0"/>
</xs:choice>
</xs:sequence>
<xs:attribute name="version" type="AT version"
    use="required"/>
<!--
Units is measured in equivalent STE, where 1 unit is the
diameter of the STE.
All layout tags are in these units.
-->
<xs:attribute name="units" type="xs:decimal"
    use="optional"
default="0.25"/>
</xs:complexType>
<xs:complexType name="T_macro-definition">
<xs:sequence>
<xs:element name="description" type="T_description"
minOccurs="0"/>
<xs:element name="header" type="T_header" minOc-
    curs="0"/>
<xs:choice>
<xs:element name="body" type="T_body"/>
<xs:element name="body-binary" type="T_body-bi-
    nary"/>
</xs:choice>
</xs:sequence>
<xs:attribute name="id" type="xs:string"
    use="required"/>
```

```
<xs:attribute  name="name"  type="xs:string"
    use="optional"/>
<xs:attribute  name="units"  type="xs:decimal"
    use="optional"
    default="0.25"/>
</xs:complexType>
<xs:complexType name="T_anml-library">
<xs:sequence>
<xs:element name="include-library" type="T_include-li-
    brary"
    minOccurs="0" maxOccurs="unbounded"/>
<xs:element  name="library-definition"
    type="T_librarydefinition"/>
</xs:sequence>
</xs:complexType>
<xs:element name="anml" type="T_anml"/>
<xs:element name="macro-definition" type="T_macro-
    definition"/>
<xs:element  name="anml-library"  type="T_anml-li-
    brary"/>
</xs:schema>
```

While the various modifications and alternative forms are envisioned, specific embodiments have been shown by way of example in the drawings and have been described in detail herein. However, it should be understood that the embodiments are not intended to be limited to the particular forms disclosed. Rather, the embodiments are to cover all modifications, equivalents, and alternatives falling within the spirit and scope of the following appended claims.

What is claimed is:

1. A tangible, non-transitory machine readable medium, comprising:
    a markup language to describe composition of automata networks, wherein the markup language uses a plurality of foundational elements that represent automata processing resources, wherein a first element of the plurality of foundational elements comprises a state transition element, wherein a second element of the plurality of foundational elements comprises a counter element, wherein a third element of the plurality of foundational elements comprises a Boolean element, wherein the markup language additionally uses a container element, wherein the container element comprises an automata network element as a top-level root element of a hierarchy and comprising a complete design of an automata network, wherein the markup language is utilized to generate a binary file used to program at least a portion of an automata processor.

2. The tangible, non-transitory machine readable medium of claim 1, wherein the markup language uses an identification attribute and a symbol set attribute in conjunction with the state transition element.

3. The tangible, non-transitory machine readable medium of claim 1, wherein the markup language uses an identification attribute and a target attribute in conjunction with the counter element.

4. The tangible, non-transitory machine readable medium of claim 1, wherein the markup language uses an identification attribute in conjunction with the Boolean element.

5. The tangible, non-transitory machine readable medium of claim 4, wherein the markup language supports the Boolean element as comprising an inverter having a single input terminal accepting a single activation signal.

6. The tangible, non-transitory machine readable medium of claim 4, wherein the markup language supports the Boolean element as comprising at least one of an OR element, an AND element, a NAND element, and a NOR element each having single input terminals accepting multiple activation signals.

7. The tangible, non-transitory machine readable medium of claim 4, wherein the markup language supports the Boolean element as comprising at least one of a sum-of-product (SOP) element, a product-of-sums (POS) element, a nsum-of-products (NSOP) element, and a nproduct-of-sums (NPOS) element each having multiple input terminals accepting multiple activation signals.

8. The tangible, non-transitory machine readable medium of claim 1, wherein the markup language uses a second container element.

9. The tangible, non-transitory machine readable medium of claim 8, wherein the second container element represents a macro element.

10. The tangible, non-transitory machine readable medium of claim 9, wherein the macro element encapsulates a certain set of predefined behavior as a modular element of the automata network.

11. The tangible, non-transitory machine readable medium of claim 10, wherein macro element comprises at least one of a second macro element or at least one of a state transition element, a counter element, or a Boolean element.

12. A method, comprising:
    utilizing a markup language to describe composition of automata networks, wherein the markup language uses a plurality of foundational elements that represent automata processing resources, wherein a first element of the plurality of foundational elements comprises a state transition element, wherein a second element of the plurality of foundational elements comprises a counter element, wherein a third element of the plurality of foundational elements comprises a Boolean element, wherein the markup language additionally uses a container element, wherein the container element comprises an automata network element as a top-level root element of a hierarchy and comprising a complete design of an automata network; and
    transmitting the container element to a compiler to be directly compiled into a loadable binary object.

13. The method of claim 12, comprising reading the loadable binary object machine by at least a portion of an automata processor.

14. A method, comprising:
    utilizing an automaton construction language to:
        implement features of an automata design using a plurality of foundational elements that represent automata processing resources, wherein a first element of the plurality of foundational elements comprises a state transition element, wherein a second element of the plurality of foundational elements comprises a counter element, wherein a third element of the plurality of foundational elements comprises a Boolean element;
        implement features that extend conventional automata designs through special elements of an automata processor; and
        represent an automata network comprising at least one special purpose element of the special purpose elements of the automata processor via an automata network element as a top-level root element of a hierarchy and comprising a complete design of the automata network; and
    utilizing a compiler to directly compile a received source code generated using the automaton construction language into a loadable binary object.

15. The method of claim 14, comprising extending the conventional automata designs through programmable quantification cells as the special elements.

16. The method of claim 14, comprising extending the conventional automata designs through programmable Boolean cells as the special elements.

\* \* \* \* \*